(12) United States Patent
Jung et al.

(10) Patent No.: US 9,774,360 B2
(45) Date of Patent: Sep. 26, 2017

(54) MOBILE TERMINAL AND METHOD FOR CONTROLLING THE SAME

(71) Applicant: LG ELECTRONICS INC., Seoul (KR)

(72) Inventors: Heonjae Jung, Seoul (KR); Hyemi Jung, Seoul (KR); Arim Kwon, Seoul (KR); Yunmi Kwon, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/713,762

(22) Filed: May 15, 2015

(65) Prior Publication Data
US 2016/0191680 A1    Jun. 30, 2016

(30) Foreign Application Priority Data

Dec. 30, 2014 (KR) .................. 10-2014-0194181

(51) Int. Cl.
| | | |
|---|---|---|
| *H04M 1/00* | (2006.01) | |
| *H04B 1/38* | (2015.01) | |
| *H04B 1/3827* | (2015.01) | |
| *G06F 3/041* | (2006.01) | |
| *H04M 1/02* | (2006.01) | |
| *G09G 3/20* | (2006.01) | |
| *G06F 3/0488* | (2013.01) | |
| *G06F 3/0481* | (2013.01) | |
| *G06F 3/0482* | (2013.01) | |
| *G06F 3/0484* | (2013.01) | |
| *G06F 3/147* | (2006.01) | |
| *H04M 1/725* | (2006.01) | |

(52) U.S. Cl.
CPC ........... *H04B 1/3827* (2013.01); *G06F 3/041* (2013.01); *G06F 3/0481* (2013.01); *G06F 3/0482* (2013.01); *G06F 3/0488* (2013.01); *G06F 3/04842* (2013.01); *G06F 3/04847* (2013.01); *G06F 3/147* (2013.01); *G09G 3/20* (2013.01); *H04M 1/0241* (2013.01); *G06F 2203/04102* (2013.01); *G09G 2300/026* (2013.01); *G09G 2354/00* (2013.01); *G09G 2370/10* (2013.01); *G09G 2370/16* (2013.01); *G09G 2380/02* (2013.01); *H04M 1/0268* (2013.01); *H04M 1/72569* (2013.01)

(58) Field of Classification Search
CPC .......... H04M 1/72519; H04M 1/72591; G09G 3/2092; G09G 5/005; G06F 3/017
USPC .......................................... 455/566
See application file for complete search history.

(56) References Cited

U.S. PATENT DOCUMENTS

| | | | |
|---|---|---|---|
| 2012/0313862 A1* | 12/2012 | Ko ........... | G09G 3/3433 345/173 |
| 2014/0078047 A1* | 3/2014 | Seo ........... | G06F 3/0487 345/156 |

(Continued)

*Primary Examiner* — Simon Nguyen
(74) *Attorney, Agent, or Firm* — Lee, Hong, Degerman, Kang & Waimey

(57) ABSTRACT

The present disclosure relates to a mobile terminal allowing at least part of a display unit to be bent or flexed. A mobile terminal according to an embodiment of the present disclosure may include a display unit configured to operate in either a first configuration or a second configuration having different radii of curvature, and a controller configured to switch the display unit from the first configuration to the second configuration based on a call being connected in the first configuration.

20 Claims, 39 Drawing Sheets

(56) References Cited

U.S. PATENT DOCUMENTS

| | | | |
|---|---|---|---|
| 2014/0098095 A1* | 4/2014 | Lee .................. | G06F 3/041 345/420 |
| 2014/0320393 A1* | 10/2014 | Modarres ............ | G06F 3/017 345/156 |
| 2015/0222880 A1* | 8/2015 | Choi .................. | G03B 37/04 348/43 |
| 2015/0277854 A1* | 10/2015 | Zhang ................ | G06F 1/1652 345/156 |

* cited by examiner

FIG. 8A
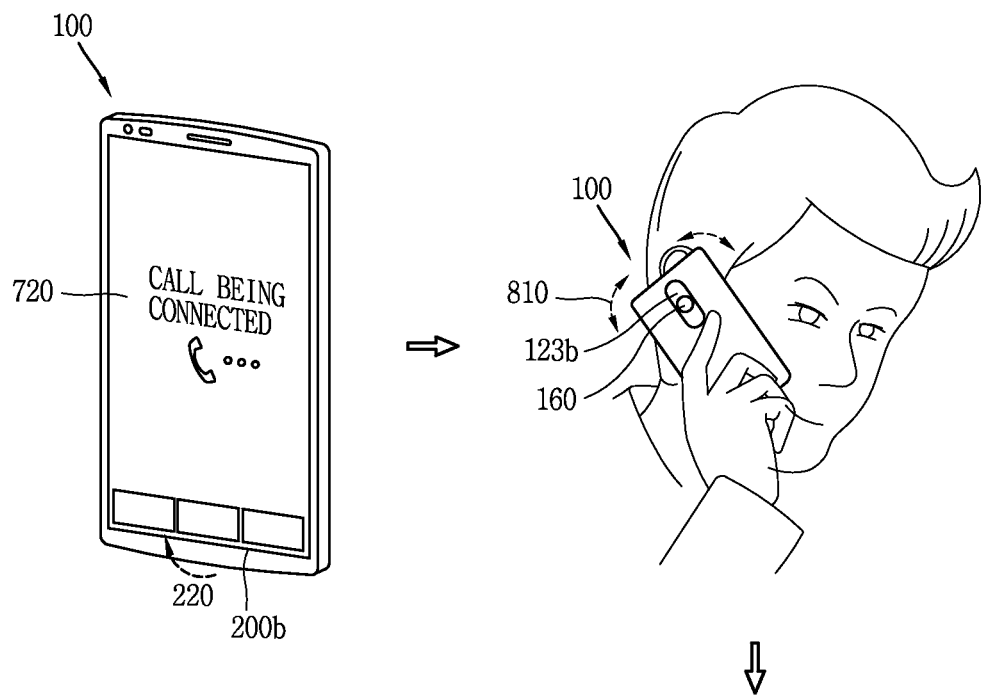
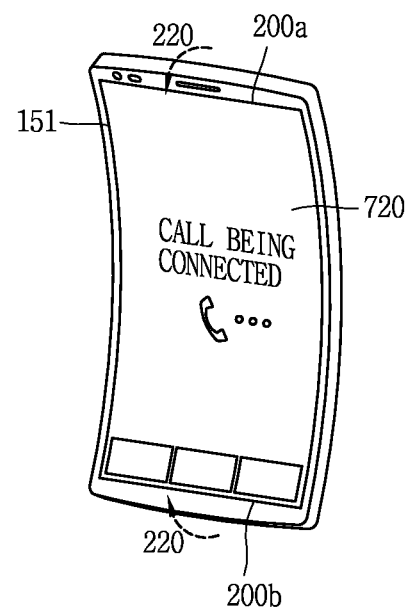

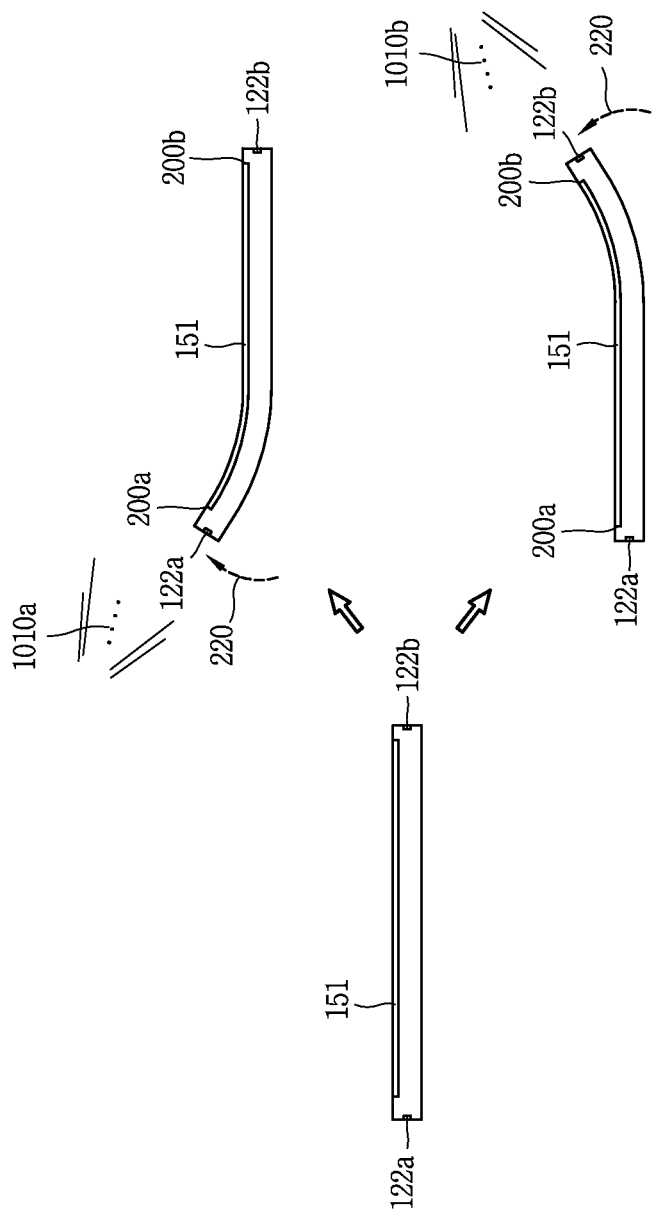

FIG. 12B
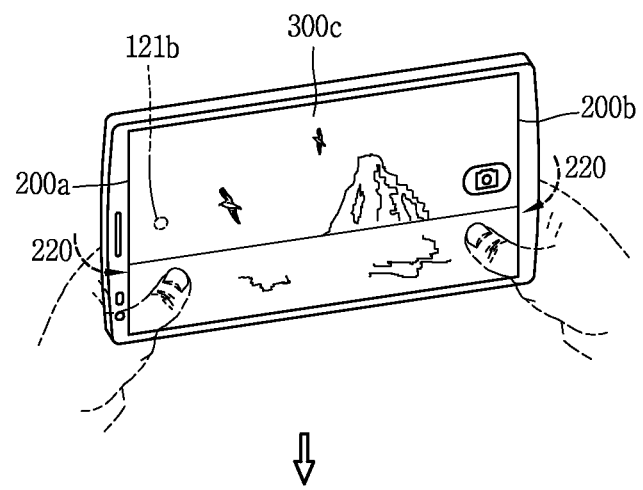
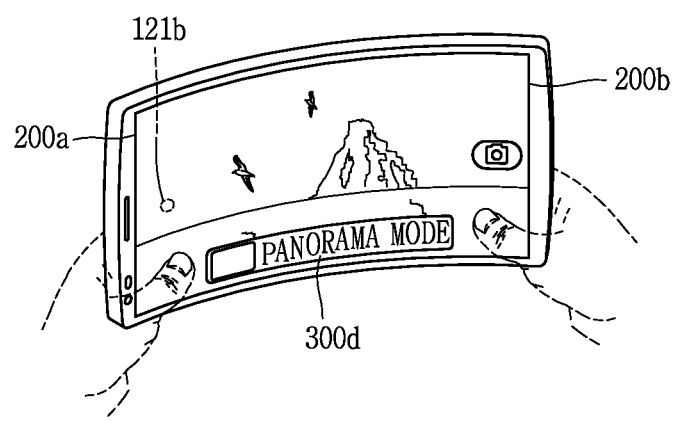

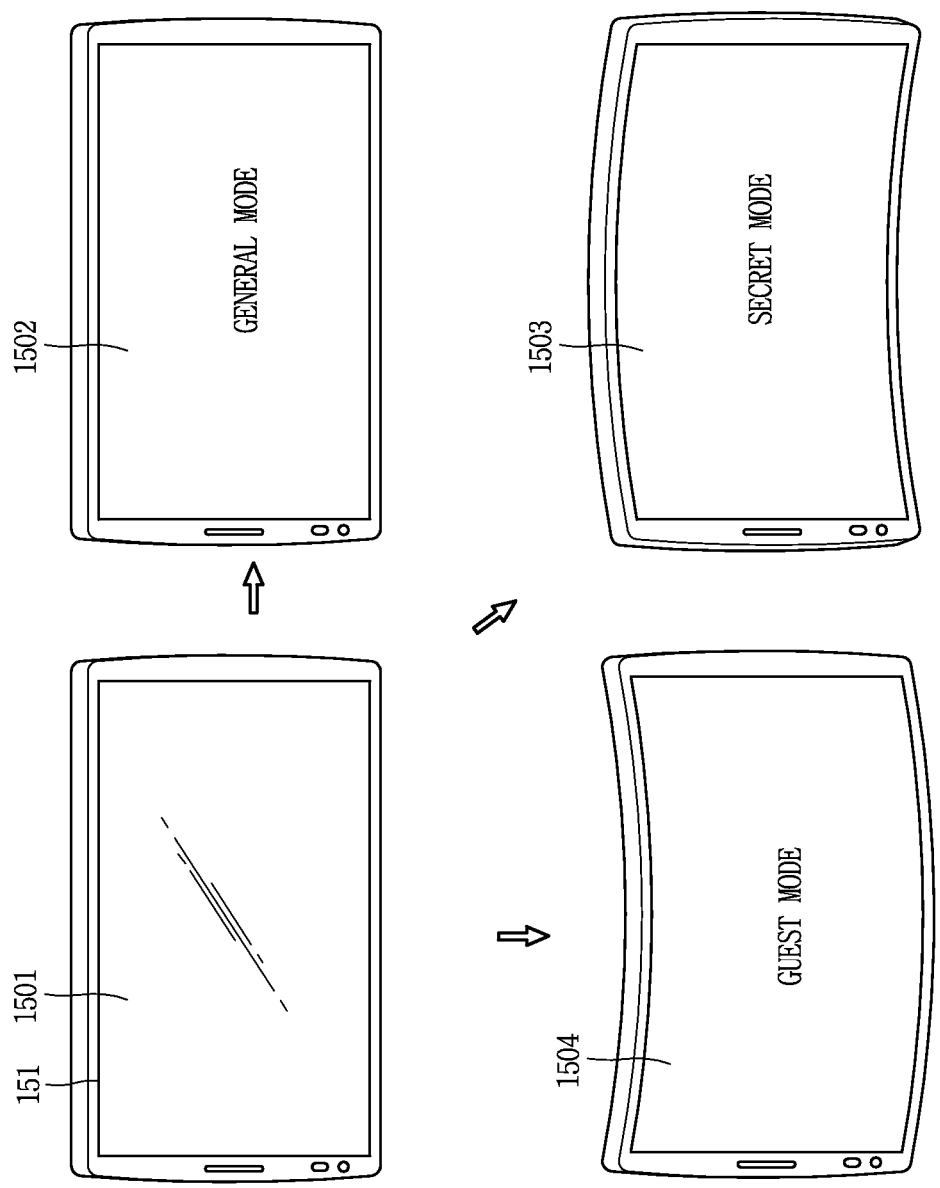

MOBILE TERMINAL AND METHOD FOR CONTROLLING THE SAME

CROSS-REFERENCE TO RELATED APPLICATION

Pursuant to 35 U.S.C. §119(a), this application claims the benefit of earlier filing date and right of priority to Korean Application No. 10-2014-0194181, filed on Dec. 30, 2014, the contents of which are all hereby incorporated by reference herein in its entirety.

BACKGROUND OF THE INVENTION

1. Field of the Invention

The present disclosure relates to a mobile terminal allowing at least part of a display unit to be bent or flexed.

2. Description of the Related Art

A mobile terminal may include all devices having a battery and a display unit configured to display information on the display unit using power supplied from the battery, and formed to be carried by a user. The mobile terminal may include a device for recording and playing a video and a device for displaying a graphic user interface (GUI), and may include glasses, a watch, and a game machine, and the like.

As it becomes multifunctional, a mobile terminal can be allowed to capture still images or moving images, play music or video files, play games, receive broadcast and the like, so as to be implemented as an integrated multimedia player. Efforts are ongoing to support and increase the functionality of mobile terminals. Such efforts include software and hardware improvements, as well as changes and improvements in the structural components.

Such a mobile terminal has been evolved into various types of designs, and the efforts for developing the mobile terminal in a more novel form have been carried out to meet the needs of a user who wants to have more novel various designs. The new form may include structural changes and improvements for allowing the user to use the mobile terminal in a more convenient manner. For one of the structural changes and improvements, studies on a mobile terminal allowing at least part of the display unit to be bent or flexed have been carried out.

SUMMARY OF THE INVENTION

An aspect of the present disclosure is to provide a method of controlling a display unit to be bent based on a function carried out in a mobile terminal.

Another aspect of the present disclosure is to provide a method of controlling various functions that can be carried out in a mobile terminal according to the bending characteristics of a display unit.

Still another aspect of the present disclosure is to provide a method of controlling a display unit that can be bent to perform a function associated with a call in an optimized state.

In order to accomplish the foregoing objectives, a mobile terminal according to an embodiment of the present disclosure may include a display unit configured to operate in either a first configuration or a second configuration having different radii of curvature, and a controller configured to switch the display unit from the first configuration to the second configuration based on a call being connected in the first configuration, and restore the display unit in the second configuration to the first configuration when the connected call is ended in the second configuration.

According to an embodiment, the first configuration may be a flat configuration in which the display unit has an infinite radius of curvature, and the second configuration may be a bent configuration in which the display unit has a finite radius of curvature.

According to an embodiment, the second configuration may be a configuration in which at least one of ends of the display unit is bent in a direction of covering a front surface of the display unit.

According to an embodiment, the controller may be configured to maintain the display unit in the first configuration when the call is connected in the first configuration, and switch the display unit from the first configuration to the second configuration based on an input corresponding to a preset condition being received during the call connection.

According to an embodiment, the mobile terminal may further include a sensing unit configured to sense a movement of the mobile terminal, and a manipulation unit configured to receive an input for audio volume adjustment, wherein the controller may be configured to switch the display unit from the first configuration to the second configuration during the call connection based on at least one of the movement of the mobile terminal sensed by the sensing unit or an input to increase an audio volume received by the manipulation unit.

According to an embodiment, the mobile terminal may further include a microphone disposed around either an end of the display unit, and a sensing unit configured to sense an object approaching the proximity of the microphone, wherein the controller may be configured to switch the display unit from the first configuration to the second configuration during the call connection based on the sensed object approaching the proximity of the microphone and an increase of a volume received through the microphone According to an embodiment, the mobile terminal may further include a sensing unit configured to sense a movement of the mobile terminal, wherein the controller may be configured to control the display unit to be bent on the basis of a different reference region based on the movement of the mobile terminal.

According to an embodiment, the controller may be configured to bend the display unit on the basis of a first reference region based on the mobile terminal being rotated in a first direction after the call connection, and bend the display unit on the basis of a second reference region different from the first reference region based on the mobile terminal being rotated in a second direction different from the first direction.

According to an embodiment, the controller may be configured to switch the display unit from the second configuration to a third configuration based on an input corresponding to a preset condition being received during the call connection in the second configuration, wherein the third configuration is further bent than the second configuration.

According to an embodiment, the preset condition may be at least one of a case where a volume of a sound corresponding to a noise received from the microphone is higher than a reference volume, a case where a preset voice is received at at least one of the microphone or speaker, a case where an input for increasing an audio volume is received while the audio volume is in the maximum state, and a case where an object approaches the proximity of the microphone and a volume received through the microphone increases.

According to an embodiment, the mobile terminal may further include a microphone disposed around an end of the display unit, wherein in a state that the end of the display unit are bent in the direction of covering a front surface of the display unit, the controller may be unfold a region adjacent to the end of the display unit from a bent configuration to a flat configuration based on at least one of a case where a preset voice is received through the speaker or a case where a volume of a sound corresponding to a breath received through the microphone is higher than a reference volume.

According to an embodiment, the mobile terminal may further include a sensing unit configured to sense the bending of the display unit, wherein the controller may be configured to perform a function associated with a call based on the bending of the display unit.

According to an embodiment, the controller may be configured to connect the call when the display unit in the first configuration is bent to the second configuration in a state that the call is received, and end the connected call when the display unit in the second configuration is restored to the first configuration.

According to an embodiment, the controller may be configured to perform a different function based on a bending degree of the display unit.

According to an embodiment, the controller may be configured to activate a first function associated with a phone call when the display unit is bent to have a first radius of curvature, and activate a second function associated with a phone call different from the first function associated with the phone call when the display unit is bent to have a second radius of curvature shorter than the first radius of curvature.

According to an embodiment, the display unit may be provided on a front surface of a body of the mobile terminal, and may include a front camera disposed on a front surface of the body, a rear camera disposed on a rear surface of the body, and a sensing unit configured to sense the bending of the display unit, wherein the controller may be configured to perform a function associated with a camera based on the display unit being switched between the first configuration and the second configuration in a state that the call is not received.

According to an embodiment, when the display unit in the first configuration is changed from an inactive state to the second configuration and then switched to an active state, the controller may be configured to activate the front camera, and display a preview image received through the front camera on the display unit.

According to an embodiment, when the display unit is switched from the second configuration to the first configuration, the controller may be configured to display a preview image received through the rear camera on the display unit.

According to an embodiment, the sensing unit may sense a posture of the body, and the controller may be configured to execute a first mode associated with the rear camera when the display unit is in the first configuration in a state that the body is placed in a horizontal position, and execute a second mode associated with the rear camera when the display unit in the first configuration is changed to the second configuration in a state that the body is in the horizontal position.

A control method of a mobile terminal according to an embodiment of the present disclosure may include switching a display unit from a first configuration to a second configuration based on a call being connected, wherein the first configuration and the second configuration have different radii of curvature, and restoring the display unit in the second configuration to the first configuration when the connected call is ended in the second configuration.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIGS. 8A, 8B, 8C and 8D are conceptual view for explaining a method of switching a display unit according to an embodiment of the present disclosure from a flat configuration to a bent configuration based on a control command that satisfies a preset condition being received during call connection;

FIGS. 10A and 10B are conceptual views for explaining a method of controlling only part of the display unit to be bent during call connection;

FIGS. 12A, 12B and 12C are conceptual views for explaining a method of performing a function associated with a camera based on the bending of the display unit due to an external force; and FIGS. 13, 14A, 14B, 15, 16, 17A, 17B, 17C, 18, 19 and 20 are conceptual views for explaining a method of performing various functions when the display unit according to an embodiment of the present disclosure is bent according to various functions carried out in the mobile terminal or the display unit is bent due to an external force.

DETAILED DESCRIPTION OF THE INVENTION

Description will now be given in detail according to the exemplary embodiments disclosed herein, with reference to the accompanying drawings. For the sake of brief description with reference to the drawings, the same or equivalent components will be provided with the same reference numbers, and description thereof will not be repeated. A suffix "module" and "unit" used for constituent elements disclosed in the following description is merely intended for easy description of the specification, and the suffix itself does not give any special meaning or function. In describing the present disclosure, if a detailed explanation for a related known function or construction is considered to unnecessarily divert the gist of the present disclosure, such explanation has been omitted but would be understood by those skilled in the art. The accompanying drawings are used to help easily understand the technical idea of the present disclosure and it should be understood that the idea of the present disclosure is not limited by the accompanying drawings. The idea of the present disclosure should be construed to extend to any alterations, equivalents and substitutes besides the accompanying drawings.

It will be understood that, although the terms first, second, etc. may be used herein to describe various elements, these elements should not be limited by these terms. These terms are only used to distinguish one element from another.

It will be understood that when an element is referred to as being "connected with" another element, the element can be directly connected with the other element or intervening elements may also be present. In contrast, when an element is referred to as being "directly connected with" another element, there are no intervening elements present.

A singular representation may include a plural representation as far as it represents a definitely different meaning from the context.

Terms 'include' or 'has' used herein should be understood that they are intended to indicate an existence of several components or several steps, disclosed in the specification, and it may also be understood that part of the components or steps may not be included or additional components or steps may further be included.

Mobile terminals described herein may include cellular phones, smart phones, laptop computers, digital broadcasting terminals, personal digital assistants (PDAs), portable multimedia players (PMPs), navigators, slate PCs, tablet PCs, ultra books, wearable devices (for example, smart watches, smart glasses, head mounted displays (HMDs)), and the like.

However, it may be easily understood by those skilled in the art that the configuration according to the exemplary embodiments of this specification can also be applied to stationary terminals such as digital TV, desktop computers and the like, excluding a case of being applicable only to the mobile terminals.

Figure 1A:
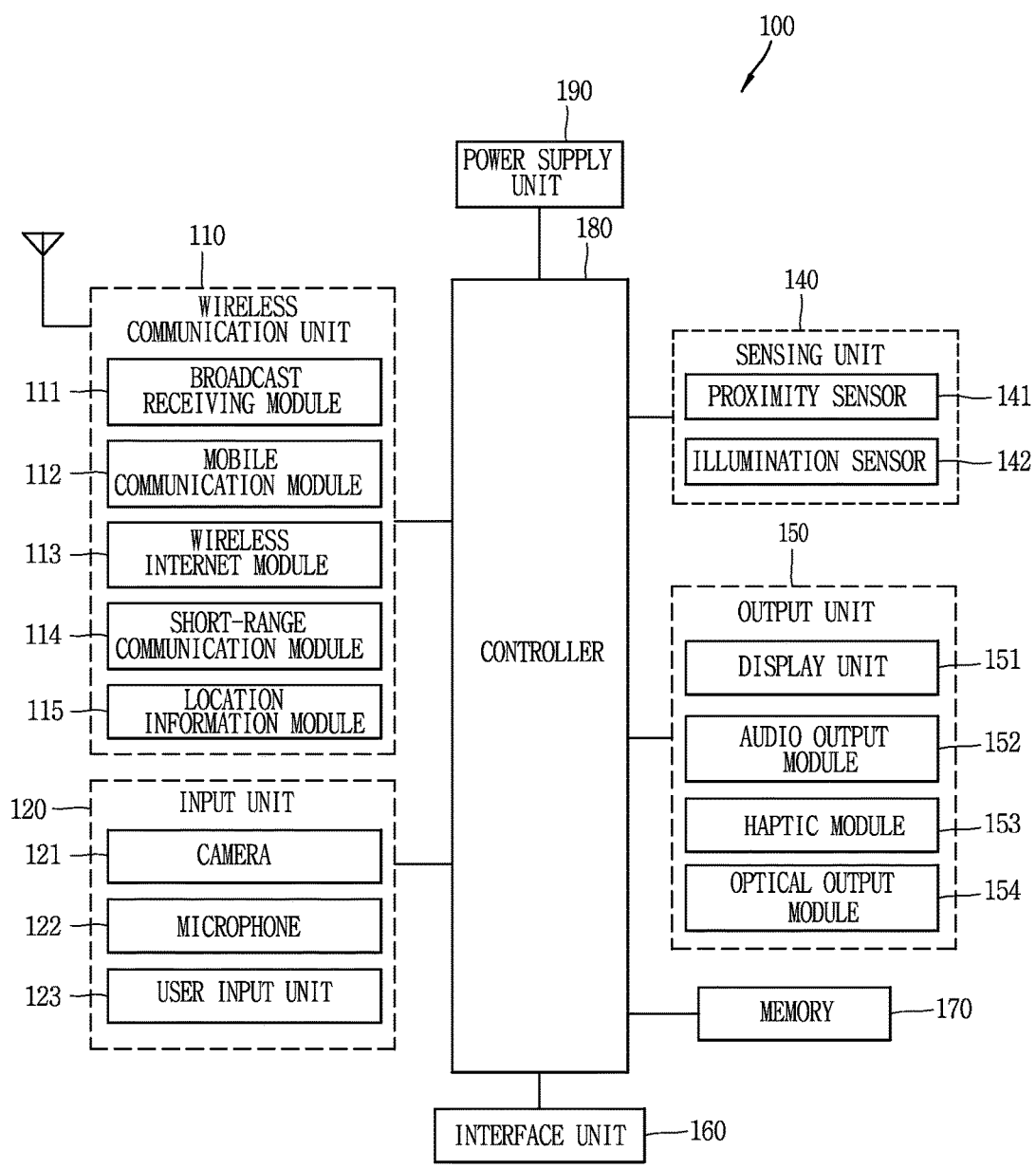
FIG. 1A is a block diagram for explaining a mobile terminal associated with the present disclosure.
Figure 1B:
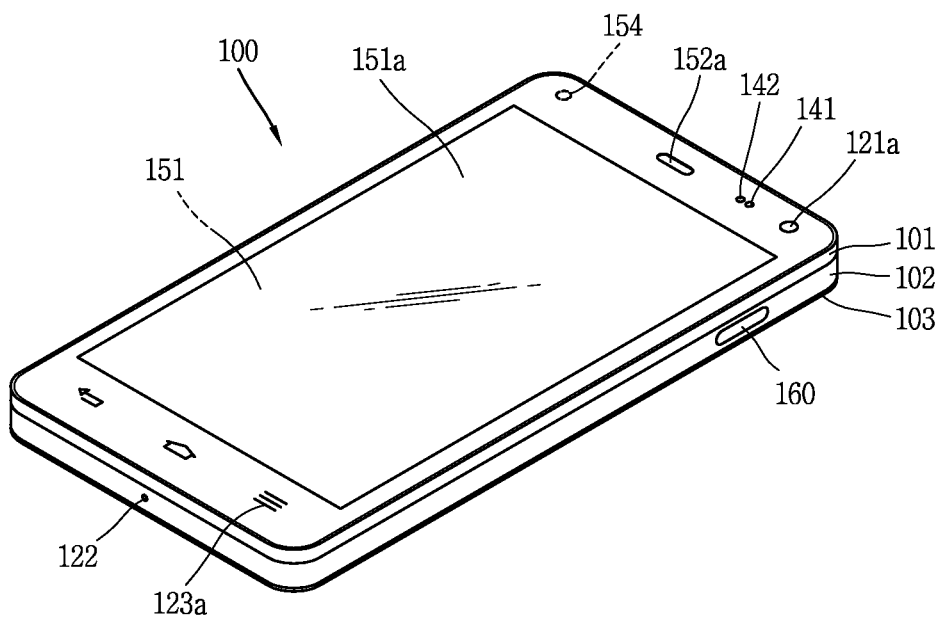
FIGS. 1B and 1C are conceptual views in which an example of a mobile terminal associated with the present disclosure is seen from different directions.
Figure 1C:
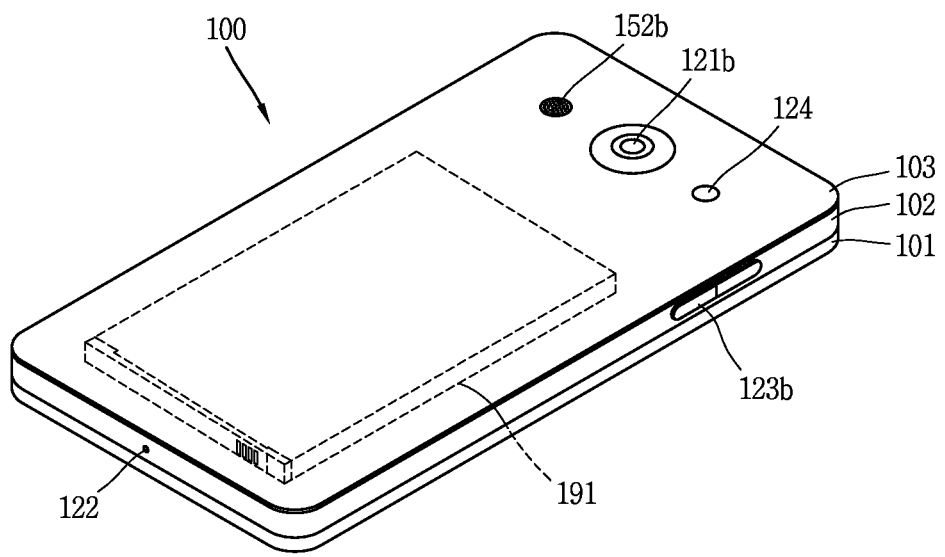

Referring to FIGS. 1A through 1C, FIG. 1A is a block diagram of a mobile terminal in accordance with the present disclosure, FIGS. 1B and 1C are conceptual views of one example of the mobile terminal, viewed from different directions.

The mobile terminal 100 may include components, such as a wireless communication unit 110, an input unit 120, a sensing unit 140, an output unit 150, an interface unit 160, a memory 170, a controller 180, a power supply unit 190 and the like. FIG. 1A illustrates the mobile terminal having various components, but it may be understood that implementing all of the illustrated components is not a requirement. Greater or fewer components may alternatively be implemented.

In more detail, the wireless communication unit 110 of those components may typically include one or more modules which permit wireless communications between the mobile terminal 100 and a wireless communication system, between the mobile terminal 100 and another mobile terminal 100, or between the mobile terminal 100 and a network within which another mobile terminal 100 (or an external server) is located.

For example, the wireless communication unit 110 may include at least one of a broadcast receiving module 111, a mobile communication module 112, a wireless Internet module 113, a short-range communication module 114, a location information module 115 and the like.

The input unit 120 may include a camera 121 for inputting an image signal, a microphone 122 or an audio input module for inputting an audio signal, or a user input unit 123 (for example, a touch key, a push key (or a mechanical key), etc.) for allowing a user to input information. Audio data or image data collected by the input unit 120 may be analyzed and processed by a user's control command.

The sensing unit 140 may include at least one sensor which senses at least one of internal information of the mobile terminal, a surrounding environment of the mobile terminal and user information. For example, the sensing unit 140 may include a proximity sensor 141, an illumination sensor 142, a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, refer to the camera 121), a microphone 122, a battery gage, an environment sensor (for example, a barometer, a hygrometer, a thermometer, a radiation detection sensor, a thermal sensor, a gas sensor, etc.), and a chemical sensor (for example, an electronic nose, a health care sensor, a biometric sensor, etc.). On the other hand, the mobile terminal disclosed herein may utilize information in such a manner of combining information sensed by at least two sensors of those sensors.

The output unit 150 may be configured to output an audio signal, a video signal or a tactile signal. The output unit 150 may include a display unit 151, an audio output module 152, a haptic module 153, an optical output module 154 and the like. The display unit 151 may have an inter-layered structure or an integrated structure with a touch sensor so as to implement a touch screen. The touch screen may provide an output interface between the mobile terminal 100 and a user, as well as functioning as the user input unit 123 which provides an input interface between the mobile terminal 100 and the user.

The interface unit 160 may serve as an interface with various types of external devices connected with the mobile terminal 100. The interface unit 160, for example, may include wired or wireless headset ports, external power supply ports, wired or wireless data ports, memory card ports, ports for connecting a device having an identification module, audio input/output (I/O) ports, video I/O ports, earphone ports, or the like. The mobile terminal 100 may execute an appropriate control associated with a connected external device, in response to the external device being connected to the interface unit 160.

Furthermore, the memory unit 170 may store data for supporting various functions of the mobile terminal 100. The memory 170 may store a plurality of application programs (or applications) executed in the mobile terminal 100, data for operations of the mobile terminal 100, instruction words, and the like. At least some of those application programs may be downloaded from an external server via wireless communication. Some others of those application programs may be installed within the mobile terminal 100 at the time of being shipped for basic functions of the mobile terminal 100 (for example, receiving a call, placing a call, receiving a message, sending a message, etc.). On the other hand, the application programs may be stored in the memory 170, installed in the mobile terminal 100, and executed by the controller 180 to perform an operation (or a function) of the mobile terminal 100.

The controller 180 may typically control an overall operation of the mobile terminal 100 in addition to the operations associated with the application programs. The controller 180 may provide or process information or functions appropriate for a user in a manner of processing signals, data, information and the like, which are input or output by the aforementioned components, or activating the application programs stored in the memory 170.

The controller 180 may control at least part of the components illustrated in FIG. 1A, in order to drive the application programs stored in the memory 170. In addition, the controller 180 may drive the application programs by combining at least two of the components included in the mobile terminal 100 for operation.

The power supply unit 190 may receive external power or internal power and supply appropriate power required for operating respective elements and components included in the mobile terminal 100 under the control of the controller 180. The power supply unit 190 may include a battery, and the battery may be an embedded battery or a replaceable battery.

At least part of those elements and components may be combined to implement operation and control of the mobile terminal or a control method of the mobile terminal according to various exemplary embodiments described herein. Also, the operation and control or the control method of the mobile terminal may be implemented in the mobile terminal in such a manner of activating at least one application program stored in the memory 170.

Hereinafter, each aforementioned component will be described in more detail with reference to FIG. 1A, prior to explaining various exemplary embodiments implemented by the mobile terminal 100 having the configuration.

First, the wireless communication unit 110 will be described. The broadcast receiving module 111 of the wireless communication unit 110 may receive a broadcast signal and/or broadcast associated information from an external broadcast managing entity via a broadcast channel. The broadcast channel may include a satellite channel and a terrestrial channel. At least two broadcast receiving modules 111 may be provided in the mobile terminal 100 to simultaneously receive at least two broadcast channels or switch the broadcast channels.

The mobile communication module 112 may transmit/receive wireless signals to/from at least one of network entities, for example, a base station, an external mobile terminal, a server, and the like, on a mobile communication network, which is constructed according to technical standards or transmission methods for mobile communications (for example, Global System for Mobile Communication (GSM), Code Division Multi Access (CDMA), Wideband CDMA (WCDMA), High Speed Downlink Packet access (HSDPA), Long Term Evolution (LTE), etc.)

The wireless signals may include audio call signal, video (telephony) call signal, or various formats of data according to transmission/reception of text/multimedia messages.

The wireless Internet module 113 denotes a module for wireless Internet access. This module may be internally or externally coupled to the mobile terminal 100. The wireless Internet module 113 may transmit/receive wireless signals via communication networks according to wireless Internet technologies.

Examples of such wireless Internet access may include Wireless LAN (WLAN), Wireless Fidelity (Wi-Fi) Direct, Digital Living Network Alliance (DLNA), Wireless Broadband (Wibro), Worldwide Interoperability for Microwave Access (Wimax), High Speed Downlink Packet Access (HSDPA), High Speed Uplink Packet Access (HSUPA), Long Term Evolution (LTE), Long Term Evolution-Advanced (LTE-A) and the like. The wireless Internet module 113 may transmit/receive data according to at least one wireless Internet technology within a range including even Internet technologies which are not aforementioned.

From the perspective that the wireless Internet accesses according to Wibro, HSDPA, GSM, CDMA, WCDMA, LTE, LTE-A and the like are executed via a mobile communication network, the wireless Internet module 113 which performs the wireless Internet access via the mobile communication network may be understood as a type of the mobile communication module 112.

The short-range communication module 114 denotes a module for short-range communications. Suitable technologies for implementing the short-range communications may include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless Universal Serial Bus (Wireless USB) and the like. The short-range communication module 114 may support wireless communications between the mobile terminal 100 and a wireless communication system, between the mobile terminal 100 and another mobile terminal 100, or between the mobile terminal and a network where another mobile terminal 100 (or an external server) is located, via wireless personal area networks.

Here, the another mobile terminal 100 may be a wearable device, for example, a smart watch, a smart glass or a head mounted display (HMD), which is able to exchange data with the mobile terminal 100 (or to cooperate with the mobile terminal 100). The short-range communication module 114 may sense (recognize) a wearable device, which is able to communicate with the mobile terminal), near the mobile terminal 100. In addition, when the sensed wearable device is a device which is authenticated to communicate with the mobile terminal 100 according to the present disclosure, the controller 180 may transmit at least part of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user may check the received message using the wearable device.

The location information module 115 denotes a module for detecting or calculating a position of the mobile terminal. An example of the location information module 115 may include a Global Position System (GPS) module or a Wireless Fidelity (Wi-Fi) module. For example, when the mobile terminal uses the GPS module, a position of the mobile terminal may be acquired using a signal sent from a GPS satellite. As another example, when the mobile terminal uses the Wi-Fi module, a position of the mobile terminal may be acquired based on information related to a wireless access point (AP) which transmits or receives a wireless signal to or from the Wi-Fi module. As needed, the location information module 115 may perform any function of another module of the wireless communication unit 110 to obtain data for the location of the mobile terminal in a substituted or additional manner. The location information module 115, as a module used to acquire the location (or current location) of the mobile terminal, may not be necessarily limited to a module for directly calculating or acquiring the location of the mobile terminal.

Next, the input unit 120 may be configured to provide an audio or video signal (or information) input to the mobile terminal or information input by a user to the mobile terminal. For the input of the audio information, the mobile terminal 100 may include one or a plurality of cameras 121. The camera 121 may process image frames of still pictures or video obtained by image sensors in a video call mode or a capture mode. The processed image frames may be displayed on the display unit 151. On the other hand, the plurality of cameras 121 disposed in the mobile terminal 100 may be arranged in a matrix configuration. By use of the cameras 121 having the matrix configuration, a plurality of image information having various angles or focal points may be input into the mobile terminal 100. Also, the plurality of cameras 121 may be arranged in a stereoscopic structure to acquire a left image and a right image for implementing a stereoscopic image.

The microphone 122 may process an external audio signal into electric audio data. The processed audio data may be utilized in various manners according to a function being executed in the mobile terminal 100 (or an application program being executed). On the other hand, the microphone 122 may include assorted noise removing algorithms to remove noise generated in the course of receiving the external audio signal.

The user input unit 123 may receive information input by a user. When information is input through the user input unit 123, the controller 180 may control an operation of the mobile terminal 100 to correspond to the input information. The user input unit 123 may include a mechanical input element (or a mechanical key, for example, a button located on a front/rear surface or a side surface of the mobile terminal 100, a dome switch, a jog wheel, a jog switch, etc.), and a touch-sensitive input means. As one example, the touch-sensitive input means may be a virtual key, a soft key or a visual key, which is displayed on a touch screen through software processing, or a touch key which is disposed on a portion except for the touch screen. On the other hand, the virtual key or the visual key may be displayable on the touch screen in various shapes, for example, graphic, text, icon, video or a combination thereof.

The sensing unit 140 may sense at least one of internal information of the mobile terminal, surrounding environment information of the mobile terminal and user information, and generate a sensing signal corresponding to it. The controller 180 may control an operation of the mobile terminal 100 or execute data processing, a function or an operation associated with an application program installed in the mobile terminal based on the sensing signal. Hereinafter, description will be given in more detail of representative sensors of various sensors which may be included in the sensing unit 140.

First, a proximity sensor 141 refers to a sensor to sense presence or absence of an object approaching to a surface to be sensed, or an object disposed near a surface to be sensed, by using an electromagnetic field or infrared rays without a mechanical contact. The proximity sensor 141 may be arranged at an inner region of the mobile terminal covered by the touch screen, or near the touch screen. The proximity sensor 141 may have a longer lifespan and a more enhanced utility than a contact sensor.

The proximity sensor 141, for example, may include a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and so on. When the touch screen is implemented as a capacitance type, the proximity sensor 141 may sense proximity of a pointer to the touch screen by changes of an electromagnetic field, which is responsive to an approach of an object with conductivity. In this case, the touch screen (touch sensor) may be categorized into a proximity sensor.

Hereinafter, for the sake of brief explanation, a status that the pointer is positioned to be proximate onto the touch screen without contact will be referred to as 'proximity touch,' whereas a status that the pointer substantially comes in contact with the touch screen will be referred to as 'contact touch.' For the position corresponding to the proximity touch of the pointer on the touch screen, such position will correspond to a position where the pointer faces perpendicular to the touch screen upon the proximity touch of the pointer. The proximity sensor 141 may sense proximity touch, and proximity touch patterns (e.g., distance, direction, speed, time, position, moving status, etc.). On the other hand, the controller 180 may process data (or information) corresponding to the proximity touches and the proximity touch patterns sensed by the proximity sensor 141, and output visual information corresponding to the process data on the touch screen. In addition, the controller 180 may control the mobile terminal 100 to execute different operations or process different data (or information) according to whether a touch with respect to the same point on the touch screen is either a proximity touch or a contact touch.

A touch sensor may sense a touch (or touch input) applied onto the touch screen (or the display unit 151) using at least one of various types of touch methods, such as a resistive type, a capacitive type, an infrared type, a magnetic field type, and the like.

As one example, the touch sensor may be configured to convert changes of pressure applied to a specific part of the display unit 151 or a capacitance occurring from a specific part of the display unit 151, into electric input signals. Also, the touch sensor may be configured to sense not only a touched position and a touched area, but also touch pressure. Here, a touch object is an object to apply a touch input onto the touch sensor. Examples of the touch object may include a finger, a touch pen, a stylus pen, a pointer or the like.

When touch inputs are sensed by the touch sensors, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180 or the controller 180 itself.

On the other hand, the controller 180 may execute a different control or the same control according to a type of an object which touches the touch screen (or a touch key provided in addition to the touch screen). Whether to execute the different control or the same control according to the object which gives a touch input may be decided based on a current operating state of the mobile terminal 100 or a currently executed application program.

Meanwhile, the touch sensor and the proximity sensor may be executed individually or in combination, to sense various types of touches, such as a short (or tap) touch, a long touch, a multi-touch, a drag touch, a flick touch, a pinch-in touch, a pinch-out touch, a swipe touch, a hovering touch, and the like.

An ultrasonic sensor may be configured to recognize position information relating to a sensing object by using ultrasonic waves. The controller 180 may calculate a position of a wave generation source based on information sensed by an illumination sensor and a plurality of ultrasonic sensors. Since light is much faster than ultrasonic waves, a time for which the light reaches the optical sensor may be much shorter than a time for which the ultrasonic wave reaches the ultrasonic sensor. The position of the wave generation source may be calculated using the fact. In more detail, the position of the wave generation source may be calculated by using a time difference from the time that the ultrasonic wave reaches based on the light as a reference signal.

The camera 121 constructing the input unit 120 may be a type of camera sensor. The camera sensor may include at least one of a photo sensor and a laser sensor.

The camera 121 and the laser sensor may be combined to detect a touch of the sensing object with respect to a 3D stereoscopic image. The photo sensor may be laminated on the display device. The photo sensor may be configured to scan a movement of the sensing object in proximity to the touch screen. In more detail, the photo sensor may include photo diodes and transistors at rows and columns to scan content placed on the photo sensor by using an electrical signal which changes according to the quantity of applied light. Namely, the photo sensor may calculate the coordinates of the sensing object according to variation of light to thus obtain position information of the sensing object.

The display unit 151 may output information processed in the mobile terminal 100. For example, the display unit 151 may display execution screen information of an application program driven in the mobile terminal 100 or user interface (UI) and graphic user interface (GUI) information in response to the execution screen information.

The display unit 151 may also be implemented as a stereoscopic display unit for displaying stereoscopic images.

The stereoscopic display unit 152 may employ a stereoscopic display scheme such as stereoscopic scheme (a glass scheme), an auto-stereoscopic scheme (glassless scheme), a projection scheme (holographic scheme), or the like.

The audio output module 152 may output audio data received from the wireless communication unit 110 or stored in the memory 160 in a call signal reception mode, a call mode, a record mode, a voice recognition mode, a broadcast reception mode, and the like. Also, the audio output module 152 may also provide audible output signals related to a particular function (e.g., a call signal reception sound, a message reception sound, etc.) performed by the mobile terminal 100. The audio output module 152 may include a receiver, a speaker, a buzzer or the like.

A haptic module 153 may generate various tactile effects the that user may feel. A typical example of the tactile effect generated by the haptic module 153 may be vibration. Strength, pattern and the like of the vibration generated by the haptic module 153 may be controllable by a user selection or setting of the controller. For example, the haptic module 153 may output different vibrations in a as combining manner or a sequential manner.

Besides vibration, the haptic module 153 may generate various other tactile effects, including an effect by stimulation such as a pin arrangement vertically moving with respect to a contact skin, a spray force or suction force of air through a jet orifice or a suction opening, a touch on the skin, a contact of an electrode, electrostatic force, etc., an effect by reproducing the sense of cold and warmth using an element that can absorb or generate heat, and the like.

The haptic module 153 may be implemented to allow the user to feel a tactile effect through a muscle sensation such as the user's fingers or arm, as well as transferring the tactile effect through a direct contact. Two or more haptic modules 153 may be provided according to the configuration of the mobile terminal 100.

An optical output module 154 may output a signal for indicating an event generation using light of a light source. Examples of events generated in the mobile terminal 100 may include a message reception, a call signal reception, a missed call, an alarm, a schedule notice, an email reception, an information reception through an application, and the like.

A signal output by the optical output module 154 may be implemented in such a manner that the mobile terminal emits monochromatic light or light with a plurality of colors. The signal output may be terminated as the mobile terminal senses a user's event checking.

The interface unit 160 may serve as an interface with every external device connected with the mobile terminal 100. For example, the interface unit 160 may receive data transmitted from an external device, receive power to transfer to each element within the mobile terminal 100, or transmit internal data of the mobile terminal 100 to an external device. For example, the interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (referred to as 'identifying device', hereinafter) may take the form of a smart card. Accordingly, the identifying device may be connected with the terminal 100 via the interface unit 160.

When the mobile terminal 100 is connected with an external cradle, the interface unit 160 may serve as a passage to allow power from the cradle to be supplied to the mobile terminal 100 therethrough or may serve as a passage to allow various command signals input by the user from the cradle to be transferred to the mobile terminal therethrough. Various command signals or power input from the cradle may operate as signals for recognizing that the mobile terminal is properly mounted on the cradle.

The memory 170 may store programs for operations of the controller 180 and temporarily store input/output data (for example, phonebook, messages, still images, videos, etc.). The memory 170 may store data related to various patterns of vibrations and audio which are output in response to touch inputs on the touch screen.

The memory 170 may include at least one type of storage medium including a Flash memory, a hard disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, and an optical disk. Also, the mobile terminal 100 may be operated in relation to a web storage device that performs the storage function of the memory 170 over the Internet.

As aforementioned, the controller 180 may typically control the general operations of the mobile terminal 100. For example, the controller 180 may set or release a lock state for restricting a user from inputting a control command with respect to applications when a status of the mobile terminal meets a preset condition.

The controller 180 may also perform controlling and processing associated with voice calls, data communications, video calls, and the like, or perform pattern recognition processing to recognize a handwriting input or a picture drawing input performed on the touch screen as characters or images, respectively. In addition, the controller 180 may control one or combination of those components in order to implement various exemplary embodiment disclosed herein on the mobile terminal 100.

The power supply unit 190 may receive external power or internal power and supply appropriate power required for operating respective elements and components included in the mobile terminal 100 under the control of the controller 180. The power supply unit 190 may include a battery. The battery may be an embedded battery which is rechargeable or be detachably coupled to the terminal body for charging.

The power supply unit 190 may include a connection port. The connection port may be configured as one example of the interface unit 160 to which an external (re)charger for supplying power to recharge the battery is electrically connected.

As another example, the power supply unit 190 may be configured to recharge the battery in a wireless manner without use of the connection port. Here, the power supply unit 190 may receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable or its similar medium using, for example, software, hardware, or any combination thereof.

Referring to FIGS. 1B and 1C, the mobile terminal 100 disclosed herein may be provided with a bar-type terminal body. However, the present disclosure may not be limited to this, but also may be applicable to various structures such as watch type, clip type, glasses type or folder type, flip type, slide type, swing type, swivel type, or the like, in which two and more bodies are combined with each other in a relatively movable manner. The present disclosure may be associated with a specific type of mobile terminal, but the description of the specific type of the mobile terminal may be typically applicable to another type of mobile terminal.

Here, the terminal body may be understood as a conception which indicates the mobile terminal 100 as at least one assembly.

The mobile terminal 100 may include a case (casing, housing, cover, etc.) forming the appearance of the terminal. In this embodiment, the case may be divided into a front case 101 and a rear case 102. Various electronic components may be incorporated into a space formed between the front case 101 and the rear case 102. At least one middle case may be additionally disposed between the front case 101 and the rear case 102.

A display unit 151 may be disposed on a front surface of the terminal body to output information. As illustrated, a window 151a of the display unit 151 may be mounted to the front case 101 so as to form the front surface of the terminal body together with the front case 101.

In some cases, electronic components may also be mounted to the rear case 102. Examples of those electronic components mounted to the rear case 102 may include a detachable battery, an identification module, a memory card and the like. Here, a rear cover 103 for covering the electronic components mounted may be detachably coupled to the rear case 102. Therefore, when the rear cover 103 is detached from the rear case 102, the electronic components mounted to the rear case 102 may be externally exposed.

As illustrated, when the rear cover 103 is coupled to the rear case 102, a side surface of the rear case 102 may be partially exposed. In some cases, upon the coupling, the rear case 102 may also be completely shielded by the rear cover 103. On the other hand, the rear cover 103 may include an opening for externally exposing a camera 121b or an audio output module 152b.

The cases 101, 102, 103 may be formed by injection-molding synthetic resin or may be formed of a metal, for example, stainless steel (STS), titanium (Ti), or the like.

Unlike the example which the plurality of cases form an inner space for accommodating such various components, the mobile terminal 100 may be configured such that one case forms the inner space. In this example, a mobile terminal 100 having a uni-body formed in such a manner that synthetic resin or metal extends from a side surface to a rear surface may also be implemented.

On the other hand, the mobile terminal 100 may include a waterproofing unit (not shown) for preventing an introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

The mobile terminal 100 may include a display unit 151, first and second audio output modules 152a and 152b, a proximity sensor 141, an illumination sensor 152, an optical output module 154, first and second cameras 121a and 121b, first and second manipulation units 123a and 123b, a microphone 122, an interface unit 160 and the like.

Hereinafter, description will be given of an exemplary mobile terminal 100 that the display unit 151, the first audio output module 152a, the proximity sensor 141, the illumination sensor 142, the optical output module 154, the first camera 121a and the first manipulation unit 123a are disposed on the front surface of the terminal body, the second manipulation unit 123b, the microphone 122 and the interface unit 160 are disposed on a side surface of the terminal body, and the second audio output module 152b and the second camera 121b are disposed on a rear surface of the terminal body, with reference to FIGS. 1B and 1C.

Here, those components may not be limited to the arrangement, but be excluded or arranged on another surface if necessary. For example, the first manipulation unit 123a may not be disposed on the front surface of the terminal body, and the second audio output module 152b may be disposed on the side surface other than the rear surface of the terminal body.

The display unit 151 may output information processed in the mobile terminal 100. For example, the display unit 151 may display execution screen information of an application program driven in the mobile terminal 100 or user interface (UI) and graphic user interface (GUI) information in response to the execution screen information.

The display unit 151 may include at least one of a liquid crystal display (LCD), a thin film transistor-liquid crystal display (TFT-LCD), an organic light emitting diode (OLED), a flexible display, a 3-dimensional (3D) display, and an e-ink display.

The display unit 151 may be implemented in two or more in number according to a configured aspect of the mobile terminal 100. For instance, a plurality of the display units 151 may be arranged on one surface to be spaced apart from or integrated with each other, or may be arranged on different surfaces.

The display unit 151 may include a touch sensor which senses a touch onto the display unit so as to receive a control command in a touching manner. When a touch is input to the display unit 151, the touch sensor may be configured to sense this touch and the controller 180 may generate a control command corresponding to the touch. The content which is input in the touching manner may be a text or numerical value, or a menu item which can be indicated or designated in various modes.

The touch sensor may be configured in a form of film having a touch pattern. The touch sensor may be a metal wire, which is disposed between the window 151a and a display (not shown) on a rear surface of the window 151a or patterned directly on the rear surface of the window 151a. Or, the touch sensor may be integrally formed with the display. For example, the touch sensor may be disposed on a substrate of the display or within the display.

The display unit 151 may form a touch screen together with the touch sensor. Here, the touch screen may serve as the user input unit 123 (see FIG. 1A). Therefore, the touch screen may replace at least some of functions of the first manipulation unit 123a.

The first audio output module 152a may be implemented in the form of a receiver for transferring voice sounds to the user's ear or a loud speaker for outputting various alarm sounds or multimedia reproduction sounds.

The window 151a of the display unit 151 may include a sound hole for emitting sounds generated from the first audio output module 152a. Here, the present disclosure may not be limited to this. It may also be configured such that the sounds are released along an assembly gap between the structural bodies (for example, a gap between the window 151a and the front case 101). In this case, a hole independently formed to output audio sounds may not be seen or hidden in terms of appearance, thereby further simplifying the appearance of the mobile terminal 100.

The optical output module 154 may output light for indicating an event generation. Examples of the event generated in the mobile terminal 100 may include a message reception, a call signal reception, a missed call, an alarm, a schedule notice, an email reception, information reception through an application, and the like. When a user's event checking is sensed, the controller may control the optical output unit 154 to stop the output of the light.

The first camera 121a may process video frames such as still or moving images obtained by the image sensor in a video call mode or a capture mode. The processed video frames may be displayed on the display unit 151 or stored in the memory 170.

The first and second manipulation units 123a and 123b are examples of the user input unit 123, which may be manipulated by a user to input a command for controlling the operation of the mobile terminal 100. The first and second manipulation units 123a and 123b may also be commonly referred to as a manipulating portion, and may employ any method if it is a tactile manner allowing the user to perform manipulation with a tactile feeling such as touch, push, scroll or the like.

The drawings are illustrated on the basis that the first manipulation unit 123a is a touch key, but the present disclosure may not be necessarily limited to this. For example, the first manipulation unit 123a may be configured with a mechanical key, or a combination of a touch key and a push key.

The content received by the first and second manipulation units 123a and 123b may be set in various ways. For example, the first manipulation unit 123a may be used by the user to input a command such as menu, home key, cancel, search, or the like, and the second manipulation unit 123b may be used by the user to input a command, such as controlling a volume level being output from the first or second audio output module 152a or 152b, switching into a touch recognition mode of the display unit 151, or the like.

On the other hand, as another example of the user input unit 123, a rear input unit (not shown) may be disposed on the rear surface of the terminal body. The rear input unit may be manipulated by a user to input a command for controlling an operation of the mobile terminal 100. The content input may be set in various ways. For example, the rear input unit may be used by the user to input a command, such as power on/off, start, end, scroll or the like, controlling a volume level being output from the first or second audio output module 152a or 152b, switching into a touch recognition mode of the display unit 151, or the like. The rear input unit may be implemented into a form allowing a touch input, a push input or a combination thereof.

The rear input unit may be disposed to overlap the display unit 151 of the front surface in a thickness direction of the terminal body. As one example, the rear input unit may be disposed on an upper end portion of the rear surface of the terminal body such that a user can easily manipulate it using a forefinger when the user grabs the terminal body with one hand. However, the present disclosure may not be limited to this, and the position of the rear input unit may be changeable.

When the rear input unit is disposed on the rear surface of the terminal body, a new user interface may be implemented using the rear input unit. Also, the aforementioned touch screen or the rear input unit may substitute for at least part of functions of the first manipulation unit 123a located on the front surface of the terminal body. Accordingly, when the first manipulation unit 123a is not disposed on the front surface of the terminal body, the display unit 151 may be implemented to have a larger screen.

On the other hand, the mobile terminal 100 may include a finger scan sensor which scans a user's fingerprint. The controller may use fingerprint information sensed by the finger scan sensor as an authentication means. The finger scan sensor may be installed in the display unit 151 or the user input unit 123.

The microphone 122 may be formed to receive the user's voice, other sounds, and the like. The microphone 122 may be provided at a plurality of places, and configured to receive stereo sounds.

The interface unit 160 may serve as a path allowing the mobile terminal 100 to exchange data with external devices. For example, the interface unit 160 may be at least one of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b may be further mounted to the rear surface of the terminal body. The second camera 121b may have an image capturing direction, which is substantially opposite to the direction of the first camera unit 121a.

The second camera 121b may include a plurality of lenses arranged along at least one line. The plurality of lenses may also be arranged in a matrix configuration. The cameras may be referred to as an 'array camera.' When the second camera 121b is implemented as the array camera, images may be captured in various manners using the plurality of lenses and images with better qualities may be obtained.

A flash 124 may be disposed adjacent to the second camera 121b. When an image of a subject is captured with the camera 121b, the flash 124 may illuminate the subject.

The second audio output module 152b may further be disposed on the terminal body. The second audio output module 152b may implement stereophonic sound functions in conjunction with the first audio output module 152a, and may be also used for implementing a speaker phone mode for call communication.

At least one antenna for wireless communication may be disposed on the terminal body. The antenna may be installed in the terminal body or formed on the case. For example, an antenna which configures a part of the broadcast receiving module 111 (see FIG. 1A) may be retractable into the terminal body. Alternatively, an antenna may be formed in a form of film to be attached onto an inner surface of the rear cover 103 or a case including a conductive material may serve as an antenna.

A power supply unit 190 (refer to FIG. 1A) for supplying power to the mobile terminal 100 may be disposed on the terminal body. The power supply unit 190 may include a batter 191 which is mounted in the terminal body or detachably coupled to an outside of the terminal body.

The battery 191 may receive power via a power source cable connected to the interface unit 160. Also, the battery 191 may be (re)chargeable in a wireless manner using a wireless charger. The wireless charging may be implemented by magnetic induction or electromagnetic resonance.

On the other hand, the drawing illustrates that the rear cover 103 is coupled to the rear case 102 for shielding the battery 191, so as to prevent separation of the battery 191 and protect the battery 191 from an external impact or foreign materials. When the battery 191 is detachable from the terminal body, the rear case 103 may be detachably coupled to the rear case 102.

An accessory for protecting an appearance or assisting or extending the functions of the mobile terminal 100 may further be provided on the mobile terminal 100. As one example of the accessory, a cover or pouch for covering or accommodating at least one surface of the mobile terminal 100 may be provided. The cover or pouch may cooperate with the display unit 151 to extend the function of the mobile terminal 100. Another example of the accessory may be a touch pen for assisting or extending a touch input onto a touch screen.

Meanwhile, the display unit 151 illustrated in FIGS. 1A through 1C may correspond to a flexible display that is deformable by an external force or the control of the controller. Specifically, the present disclosure may display information processed in the mobile terminal using a flexible display. Hereinafter, the mobile terminal 100 including a flexible display 151 will be described in detail with reference to the accompanying drawings.

Figure 2:
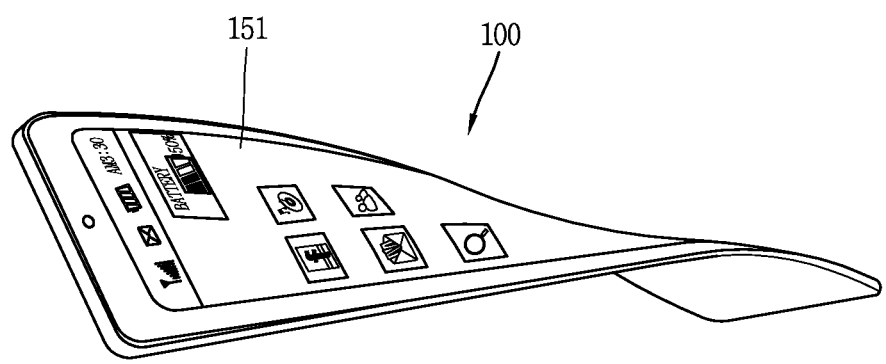
FIG. 2 is a conceptual view for explaining another example of a modified mobile terminal according to the present disclosure.

FIG. 2 is a conceptual view illustrating another example of a deformable mobile terminal 100 according to the present disclosure.

As illustrated in the drawing, a display unit 151 may be deformable by an external force. The deformation may be at least one of curving, bending, folding, twisting and rolling of the display unit 151. The deformable display unit 151 may be referred to as a "flexible display unit." Here, the flexible display unit 151 may include a general flexible display, an e-paper and a combination thereof. In general, the mobile terminal 100 may include the features of the mobile terminal 100 in FIGS. 1A through 1C or similar features thereof.

The general flexible display denotes a light, non-fragile display, which still exhibits characteristics of the conventional flat panel display and is fabricated on a flexible substrate which can be curved, bent, folded, twisted or rolled.

Also, the e-paper is a display technology employing the characteristic of a general ink, and is different from the conventional flat panel display in view of using reflected light. The e-paper may change information by using a twist ball or an electrophoresis using a capsule.

In a state that the flexible display unit 151 is not deformed (for example, in a state with an infinite radius of curvature, hereinafter, referred to as a first state), a display region of the flexible display unit 151 may become a flat surface. In a state that the flexible display unit 151 is deformed from the first state by an external force (for example, a state with a finite radius of curvature, hereinafter, referred to as a second state), the display region may become a curved surface (or a bent surface). As illustrated, information displayed in the second state, may be visual information output on the curved surface. The visual information may be realized in such a manner that a light emission of each unit pixel (sub-pixel) arranged in a matrix configuration is controlled independently. The unit pixel denotes an elementary unit for representing one color.

The flexible display unit 151 may be placed in a curved state (for example, a state of being curved from up to down or from right to left), other than a flat state, in the first state. In this case, when an external force is applied to the flexible display unit 151, the flexible display unit 151 may be deformed back into the flat state or into a more curved state.

On the other hand, the flexible display unit 151 may implement a flexible touch screen by a combination with a touch sensor. When a touch is input onto the flexible touch screen, the controller 180 (see FIG. 1A) may execute a control corresponding to the touch input. The flexible touch screen may be configured to sense a touch input even in the second state as well as in the first state.

The mobile terminal 100 according to the exemplary variation may include a deformation sensor which senses the deformation of the flexible display unit 151. The deformation sensor may be included in the sensing unit 140 (see FIG. 1A).

The deformation sensor may be disposed in the flexible display unit 151 or a case to sense information related to the deformation of the flexible display unit 151. Here, the information related to the deformation of the flexible display unit 151 may be a deformed direction, a deformed degree, a deformed position, a deformed time, an acceleration that the deformed flexible display unit 151 is restored, and the like.

In addition to those, such information may be various information which is sensible in response to curving of the flexible display unit 151.

Also, the controller 180 may change information displayed on the flexible display unit 151 or generate a control signal for controlling a function of the mobile terminal 100, based on the information related to the deformation of the flexible display unit 151 sensed by the deformation sensor.

The mobile terminal 100 according to the exemplary embodiment may include a case for accommodating the flexible display unit 151. The case may be deformable together with the flexible display unit 151, taking into account the characteristic of the flexible display unit 151.

A rear case portion (not shown) disposed in the mobile terminal 100 may also be deformable together with the flexible display unit 151 due to an external force by taking the characteristic of the flexible display unit 151 into account. In order to implement the rear case portion, a stack and folding method of stacking battery cells may be applied.

The configuration deformation of the flexible display unit 151 may not be necessarily limited to deformation due to an external force. For example, when the flexible display unit 151 is in a first configuration, it may be deformed to a second configuration by a user or application command.

Hereinafter, the flexible display unit 151 illustrated in FIG. 2 will be referred to as a display unit 151.

Furthermore, embodiments associated with a control method that can be carried out in a mobile terminal having the foregoing configuration will be described below with reference to the accompanying drawings. It should be understood by those skilled in the art that the present invention can be embodied in other specific forms without departing from the concept and essential characteristics thereof.

Furthermore, when at least two images are illustrated in a 2 by 2 format in a drawing in describing the present disclosure with reference to the accompanying drawings, images shown at an upper left end thereof, an upper right end thereof, a lower right end thereof and a lower left end thereof are referred to as a first drawing, a second drawing, a third drawing and a fourth drawing, respectively.

On the other hand, when at least two images are illustrated in a column in the top-to-bottom direction in a drawing, they are sequentially referred to as "a first drawing, a second drawing, . . . " from the uppermost image. Furthermore, when at least two images are illustrated in a column in the left-to-right direction in a drawing, they are sequentially referred to as "a first drawing, a second drawing, . . . " from the most left image.

Hereinafter, a shape in which a mobile terminal (or display unit) according to an embodiment of the present disclosure is deformed will be described in more detail with reference to the accompanying drawings. Furthermore, the deformation of the display unit 151 will be mainly described below. Here, the deformation of the display unit 151 may include (denote) the deformation of the mobile terminal body (body portion, case, rear case, etc.) including the display unit 151.

Figure 3A:
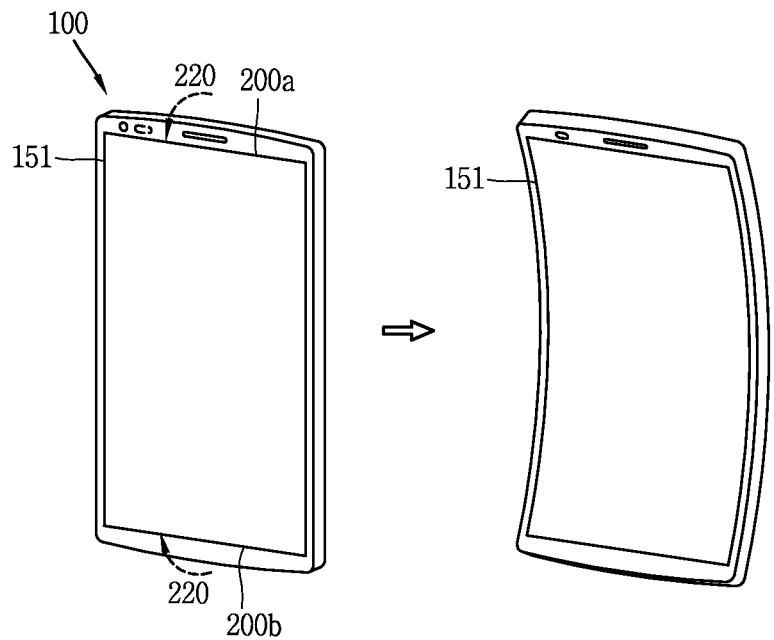
FIGS. 3A, 3B and 4 are conceptual views for explaining a modified form of a mobile terminal according to an embodiment of the present disclosure.
Figure 3B:
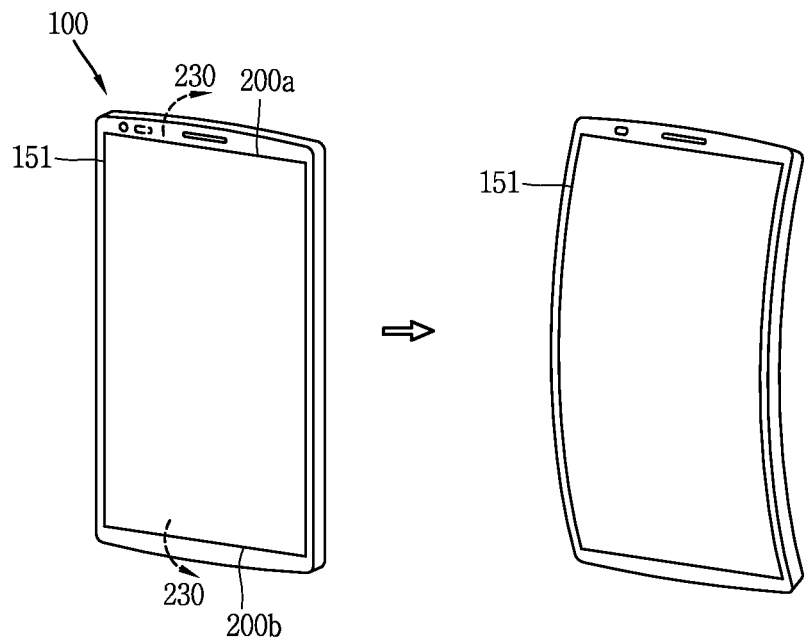
Figure 4:
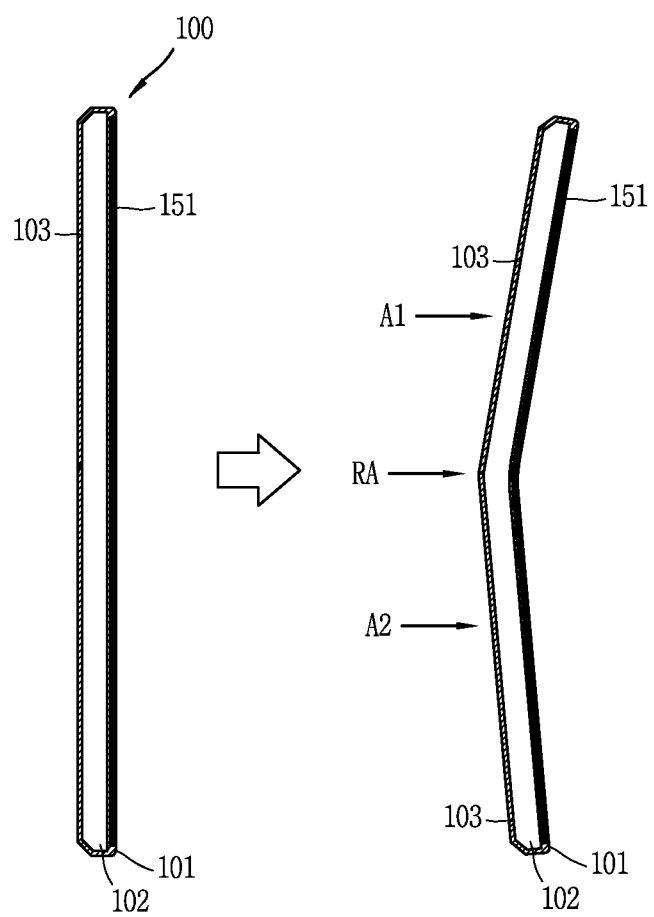

FIGS. 3A, 3B and 4 are conceptual views for explaining a modified form of a mobile terminal according to an embodiment of the present disclosure.

The present disclosure may include a deformable display unit 151 illustrated in FIGS. 1A through 2. The display unit 151 may be configured to operate in either a first configuration or a second configuration having different radii of curvature. In other words, the display unit 151 may be configured to operate in one of a first configuration and a second configuration having different radii of curvature.

Specifically, the display unit 151 may be operated in a first configuration (flat configuration) having an infinite radius of curvature and a second configuration (bent configuration) having a finite radius of curvature.

The second configuration, namely, a bent configuration, should be understood to include a flexed configuration, a folded configuration, a twisted configuration, a rolled configuration, or the like. In other words, at least part of the display unit 151 of the present disclosure may be bent, and the bending of at least part of the display unit 151 should be understood to have the same meaning as that of the flexing, folding, twisting or rolling of at least part of the display unit. Accordingly, according to the present disclosure, any expression may be applicable if it means that part of the display unit 151 is deformed from a flat configuration (for example, first configuration) to a non-flat configuration (for example, second configuration). Hereinafter, for the sake of convenience of explanation, the expression of "flexing" will be mainly used.

For example, as illustrated in the first drawing of FIG. 3A, the display unit 151 of the present disclosure may be in a first configuration (flat configuration). The display unit 151 may be bent due to an external force or the control of the controller 180. Here, the display unit 151 may be bent in the direction 222 that at least one of one end 200a of the display unit 151 and the other end 200b located in a direction opposite to the one end covers a front surface of the display unit 151 as illustrated in the first drawing of FIG. 3A. In this case, the display unit 151 may be deformed from a first configuration to a second configuration in which at least part of a front surface of the display unit 151 is concave as illustrated in the second drawing of FIG. 3A.

For another example, the display unit 151 of the present disclosure may be deformed from a first configuration to a second configuration in which at least part of a front surface of the display unit 151 is convex due to an external force or the control of the controller 180 as illustrated in the first and the second drawing of FIG. 3B. Specifically, the display unit 151 in a first configuration may be bent in the direction 230 that at least one of one end 200a and the other end 200b of the display unit 151 covers a rear surface of the display unit 151. In this case, the display unit 151 may have a configuration that at least part of a front surface of the display unit 151 is convex as illustrated in the second drawing of FIG. 3B.

Here, as illustrated in the second drawing of FIG. 3A and the second drawing of FIG. 3B, at least part of the display unit 151 may be bent in a concave or convex manner to have a finite radius of curvature. Here, the finite radius of curvature (or the extent of bending) may be determined by a structural characteristics of the display unit or the control of the controller.

Furthermore, as illustrated in FIGS. 3A and 3B, the display unit 151 of the present disclosure may be bent such that the entire region of the display unit 151 is formed in a concave or convex manner.

On the other hand, it is illustrated in FIGS. 3A and 3B that one end 200a and the other end 200b of the display unit 151 are ends corresponding to the width direction of the display unit 151, but the one end 200a and the other end 200b of the display unit 151 may be ends corresponding to the length direction of the display unit 151.

Furthermore, the display unit 151 of the present disclosure may be bent on a partial region of the display unit 151 other than the entire region thereof. In other words, a partial region of the display unit 151 may be bent such that at least part of a front surface of the display unit is formed in a concave or convex manner. Even in this case, according to the present disclosure, it may be understood that at least one of one end 200a and the other end 200b of the display unit 151 is bent in the direction 220 of covering a front surface of the display unit 151 or in the direction 230 of covering a rear surface of the display unit 151.

For example, as illustrated in FIG. 4, the body portion may be divided into a first and a second region (A1, A2) around a reference region (reference axis) (a partial region of the display unit 151). The body portion may be bent around the reference region (RA) by an external force or the control of the controller. For example, when the display unit 151 is disposed on a front surface of the body portion and the cover 103 is disposed on a rear surface thereof, the cover 103 may be deformed to be convex. In this case, the center of the curvature may be located at a front surface of the body portion (namely, the direction of the display unit 151).

In FIG. 4, it is illustrated that the body portion has one reference region (RA), but present disclosure may not be necessarily limited to this, and thus the body portion may be bent around a plurality of reference regions. Furthermore, the body portion may be bent in such a manner that the center of the curvature is located on the cover 103 (in other words, the display unit 151 is convex).

In FIG. 4, the reference region (RA) is formed in the width direction of the body portion, but the reference region (RA) may be also formed in the length direction of the body portion.

In addition, though not shown in the drawing, the display unit 151 of the present disclosure may be bent in various ways. In other words, all display units 151 being deformed from a first configuration (flat configuration) having an infinite radius of curvature to a second configuration having a finite radius of curvature (including a case of folding or twisting) fall within the scope of the present disclosure.

As illustrated in FIGS. 3A through 4, the display unit 151 of the present disclosure may be deformed from a first configuration to a second configuration due to an external force or the controller.

Here, external force may denote a force for deforming the shape of the display unit 151, for example, a force applied from a user.

When the external force is applied, the display unit 151 may be bent. Here, a mobile terminal according to an embodiment of the present disclosure may sense the extent of bending according to the bending of the display unit 151. More specifically, the extent of bending may be the extent of an average bending between the bending of an outer surface and the bending of an inner surface of the flexible display unit 151.

Here, the controller 180 may change the display status of screen information displayed on the display unit 151 according to the extent of bending of the display unit 151. The display status may denote a display state visually changed by bending such as a display size, a display location, a display shape or the like.

Furthermore, the controller 180 may perform a preset function according to the bending of the display unit 151. As a function carried out according to the bending of the display unit 151, the preset function may vary according to at least one of the extent of bending of the display unit 151, the function carried out in the mobile terminal and the status of the mobile terminal.

On the other hand, according to the present disclosure, the display unit 151 may be bent due to the control of the controller. Specifically, the controller 180 may control at least part of the display unit 151 to be bent based on screen information displayed on the display unit or a function carried out in the mobile terminal 100 even without applying an additional external force. For example, the controller 180 may control an electrical signal supplied to at least part of the display unit 151 to allow at least part of the display unit 151 to be bent or unfolded. For another example, the controller 180 may control a deformation control module provided in the mobile terminal 100 to deform the display unit 151 even without applying an additional external force.

Furthermore, when screen information displayed on the display unit 151 satisfies a preset condition or at least one of a function carried out in the mobile terminal 100 or a control command received from the outside satisfies a preset condition, the controller 180 may allow part of the display unit 151 to be bent. The preset condition may be a condition allowing the display unit 151 to be bent from a flat configuration or unfolded from a bent configuration to a flat configuration or changing the extent of bending.

Furthermore, it should be clearly understood that the present disclosure can restore a bent configuration of the display unit 151 to a flat configuration again due to an external force or the controller.

The present disclosure may include a deformation control module for controlling the deformation of the mobile terminal 100 (display unit 151). Specifically, the present disclosure may deform the display unit 151 using the deformation control module. The deformation control module may be controlled due to an external force applied from the user or due to the controller. When the deformation control module is controlled by the controller, the present disclosure may further include a motor for driving the deformation control module. In other words, the controller 180 may control a motor for driving the deformation control module without applying an additional external force, thereby deforming the display unit 151.

Hereinafter, a deformation control module according to an embodiment of the present disclosure will be described in more detail with reference to the accompanying drawings. FIGS. 5A, 5B, 5C and 5D are conceptual views for explaining a structure for controlling a display unit according to an embodiment of the present disclosure to be bent.

Figure 5A:
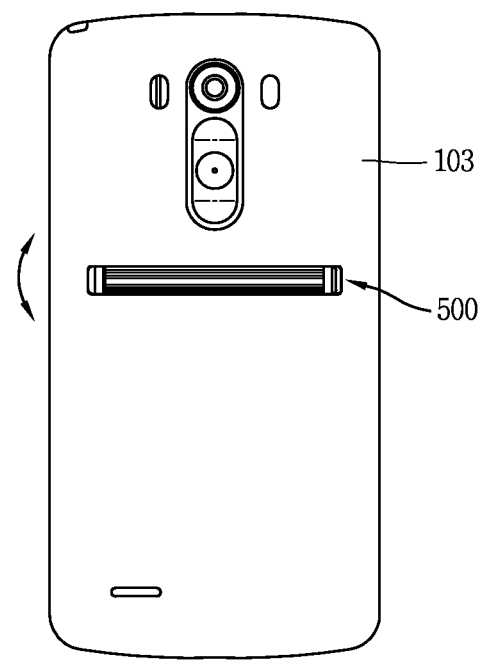
FIGS. 5A, 5B, 5C and 5D are conceptual views for explaining a structure for controlling a display unit according to an embodiment of the present disclosure to be bent.
Figure 5B:
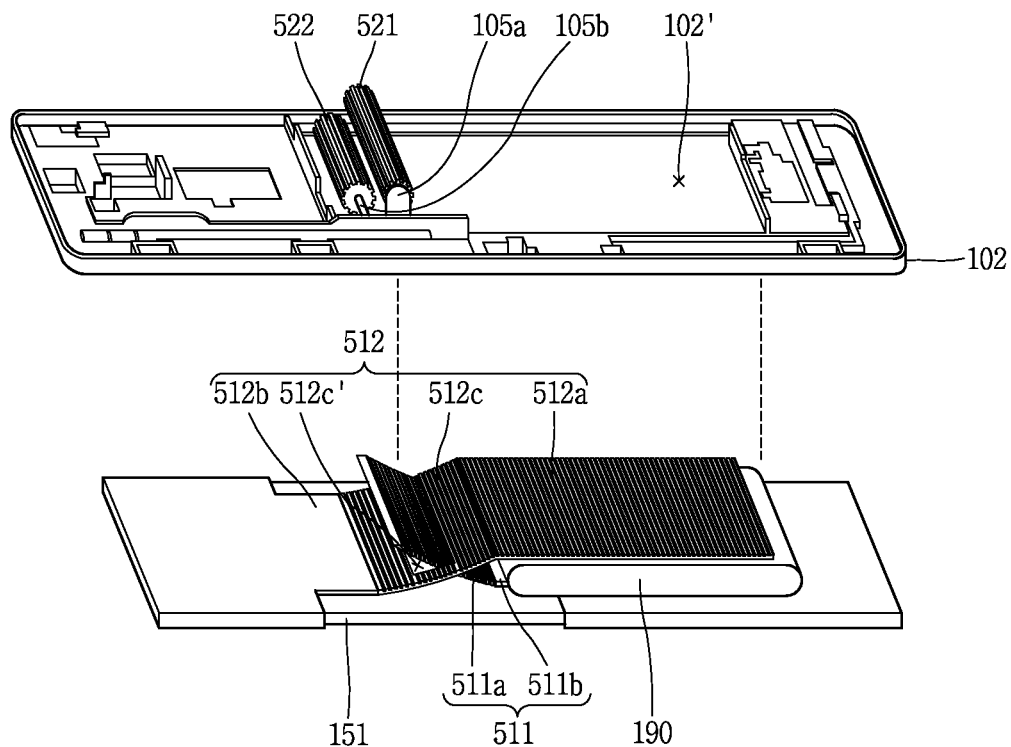
Figure 5C:
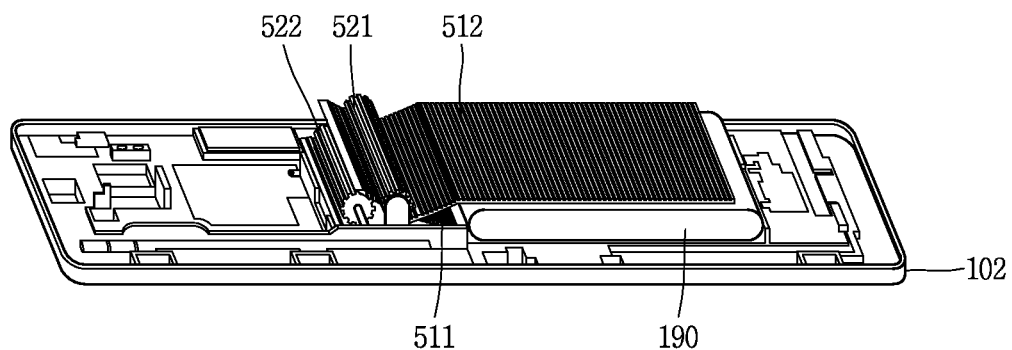
Figure 5D:
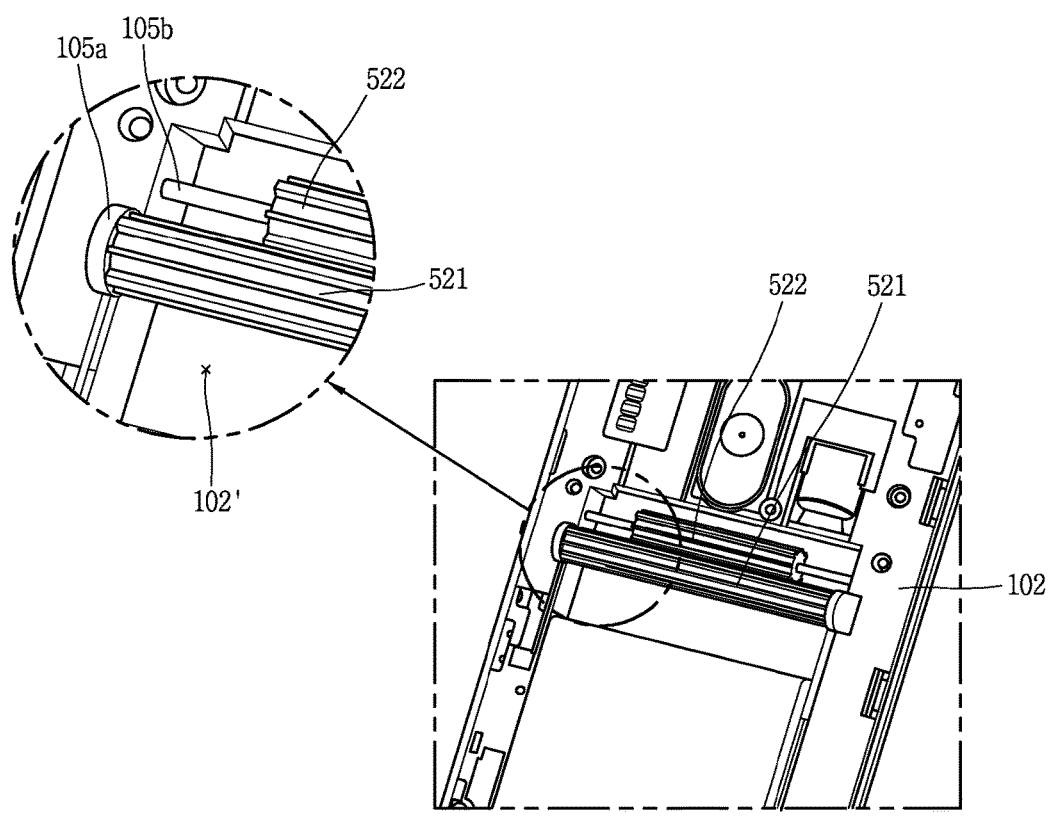

Specifically, FIG. 5A is a view in which a mobile terminal including a deformation control module according to an embodiment is seen form one direction, and FIG. 5B is a conceptual view illustrating a configuration in which the deformation control module is separated from the rear case. FIG. 5C is a conceptual view illustrating a configuration in which the device management command is mounted on the rear case. FIG. 5D is a conceptual view illustrating a configuration in which a gear portion of the deformation control module is mounted on the rear case.

Referring to FIGS. 5A and 5B, part of the deformation control module 500 according to an embodiment is exposed by the cover 103 to allow the user to control the deformation of the body portion. Specifically, the deformation control module 500 may include a first manipulation unit 511 and a second manipulation unit 512 relatively moving with respect to the first manipulation unit 511. The deformation control module 500 may relatively move the first and the second manipulation unit 511, 512 to each other, and may include a first and a second gear 521, 522 disposed between the first and the second manipulation unit 511, 512, respectively.

The cross-section of the first and the second gear 521, 522 has a preset diameter, and extends in the width direction of the body portion of the mobile terminal 100, and has protrusions (gear teeth) having a predetermined distance therebetween on the external appearance. The cover 103 may include an opening region, and part of the first gear 521 is exposed through the opening region. The first gear 521 may serve as a knob applying an external force to deform the body portion.

Accordingly, the user may rotate the first gear 521 exposed to the outside in one direction to deform the mobile terminal.

The first and the second manipulation unit 511, 512 are formed such that one end thereof is fixed to the first and the second region (A1, A2) of the body portion, respectively, and the other end thereof is free.

The first and the second manipulation unit 511, 512 are formed in a plate shape, and a tooth structure is formed on at least part of the plate shape. The first and the second manipulation unit 511, 512 are mounted on the rear case 102, and the rear case 102 may include an opening portion 102' through which part of the first and the second manipulation unit 511, 512 passes.

The first manipulation unit 511 may include a first frame 511a formed with a tooth structure and a second frame 511b in a flat plate shape. The second frame 511b of the first manipulation unit 511 is fixed to an end of the rear case 102 corresponding to the second region (A2, refer to FIG. 1D). When a surface disposed with the rear case portion 190 of the rear case 102 is defined as a rear surface and the other surface thereof is defined as a front surface, the second frame 511b is fixed to a front surface of the rear case 102 while covering part of the opening portion 102'.

The first frame 511a bent and extended from the second frame 511b at a preset angle is disposed on a front surface of the rear case 102 through the opening portion 102'. The rear case portion 190 may be disposed on the second frame 511b. The rear case portion 190 may be fixed to the second frame 511b, but the present disclosure may not be necessarily limited to this. In other words, a mobile terminal according to the present disclosure may be implemented as a rear case integrated or rear case detachable terminal.

The second manipulation unit 512 may include a first frame 512a including a tooth structure, a second frame 512b having a flat plate shape, and a third frame 512c connecting between the first and the second frame 512a, 512b. The third frame 512c may include a tooth structure, and an opening region 512c' through which the first frame 511a of the first manipulation unit 511 passes.

The second frame 512b may be fixed to the other end of the rear case 102 corresponding to the first region (A1), and the second frame 512b may be mounted on a front surface of the rear case 102.

The first frame 512a of the second manipulation unit 512 may be disposed to face the second frame 511b of the first manipulation unit 511. In other words, the second frame 511b of the first manipulation unit 511 and the first frame 512a of the second manipulation unit 512 may be disposed substantially in parallel to each other by interposing the rear case portion 190 therebetween.

The first frame 511a of the first manipulation unit 511 and the third frame 512c of the second manipulation unit 512 are extended in directions crossed with each other. The first and the second manipulation unit 511, 512 may relatively move through the opening region 512c'.

The first and the second manipulation unit 511, 512 move by the tooth structure formed on the first and the second manipulation unit 511, 512 and the rotation of the first and the second gear 521, 522. Referring to FIG. 5C, the first and the second gear 521, 522 are mounted on a region in which the first frame 511a of the first manipulation unit 511 and the third frame 512c of the second manipulation unit 512 are crossed with each other.

The first and the second gear 521, 522 rotate with respect to a rotational shaft extended in the width direction of the body portion. The first and the second gear 521, 522 are fixed to the rear case 102. Both ends of the first gear 521 are fixed by a first fixing portion 105a protruded on a front surface of the rear case 102. The second gear 522 is fixed by a second fixing portion 105b formed on a surface forming the opening portion 102' of the rear case 102. In other words, the rotational shaft of the second gear 522 is accommodated into the opening portion 102'. Accordingly, the first gear 521 may be exposed by the opening region of the cover 103, and the second gear 522 may be accommodated by the cover 103.

The second gear 522 may rotate together by a rotational force applied to the first gear 521 exposed by the opening region of the cover 103, and thus the relative movement between the first and the second manipulation unit 511, 512 is carried out.

Through the configuration, the present disclosure may control the body portion (body) (or display unit 151) to be bent or unfolded based on an external force applied to the first gear 521.

On the other hand, though not shown in the drawing, the present disclosure may further include a motor connected to at least one of the first and the second gear 521, 522. In this case, the controller 180 may control the motor to drive the first and the second gear 521, 522, thereby deforming the display unit 151 without applying an additional external force.

At least one deformation control module 500 may be provided in the body portion (body), and when provided with a plurality of the deformation control modules 500, a motor driven by the control of the controller 180 may be connected to each deformation control module 500.

Through the foregoing configuration, the present disclosure may deform the display unit 151 from a first configuration to a second configuration due to an external force or the control of the controller, and for an example, deform the display unit 151 from a flat first configuration to a bent second configuration or from a bent second configuration to a flat first configuration.

On the other hand, the structure illustrated in FIGS. 5A through 5D may correspond to an embodiment of the present disclosure, and therefore, may not be necessarily limited to this. Specifically, the present disclosure may include various structures for deforming the display unit 151, and may include the structures of allowing the display unit 151 to be bent on the basis of a reference region formed in parallel to either one of the length and width direction as well as to be bent (twisted) on the basis of a reference region that is not formed in parallel (inclined) to either one of the length and width direction.

The mobile terminal 100 including at least one of the foregoing constituent elements according to an embodiment of the present disclosure may deform the display unit 151 from a first configuration to a second configuration or from a second configuration to a first configuration based on a function carried out in the mobile terminal.

Furthermore, the mobile terminal 100 according to an embodiment of the present disclosure may perform a preset function based on the display unit 151 being deformed from a first configuration to a second configuration or from a second configuration to a first configuration due to an external force.

Hereinafter, a method of deforming the display unit 151 from a first configuration to a second configuration or from a second configuration to a first configuration based on a function carried out in the mobile terminal will be described in more detail with reference to the accompanying drawings.

Figure 6:
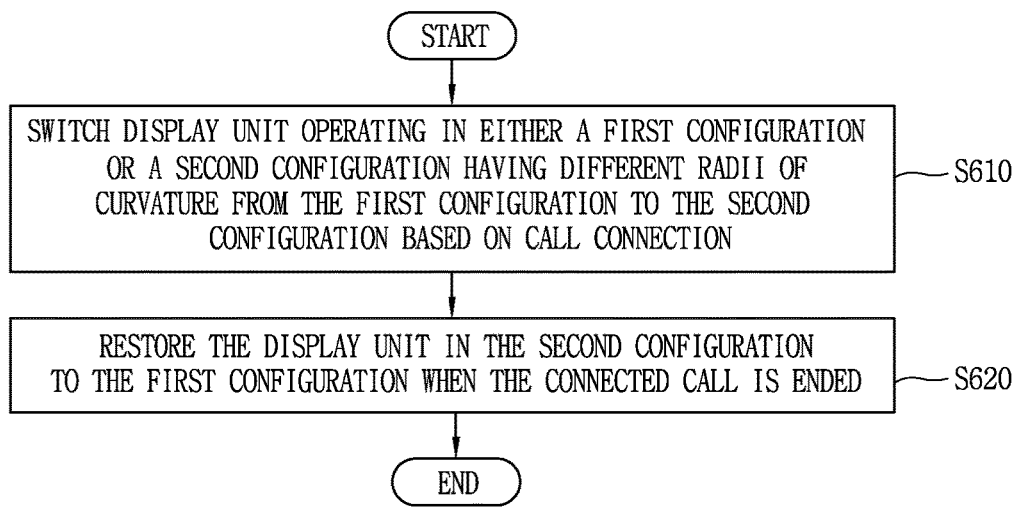
FIG. 6 is a flow chart representatively illustrating a control method of the present disclosure.
Figure 7:
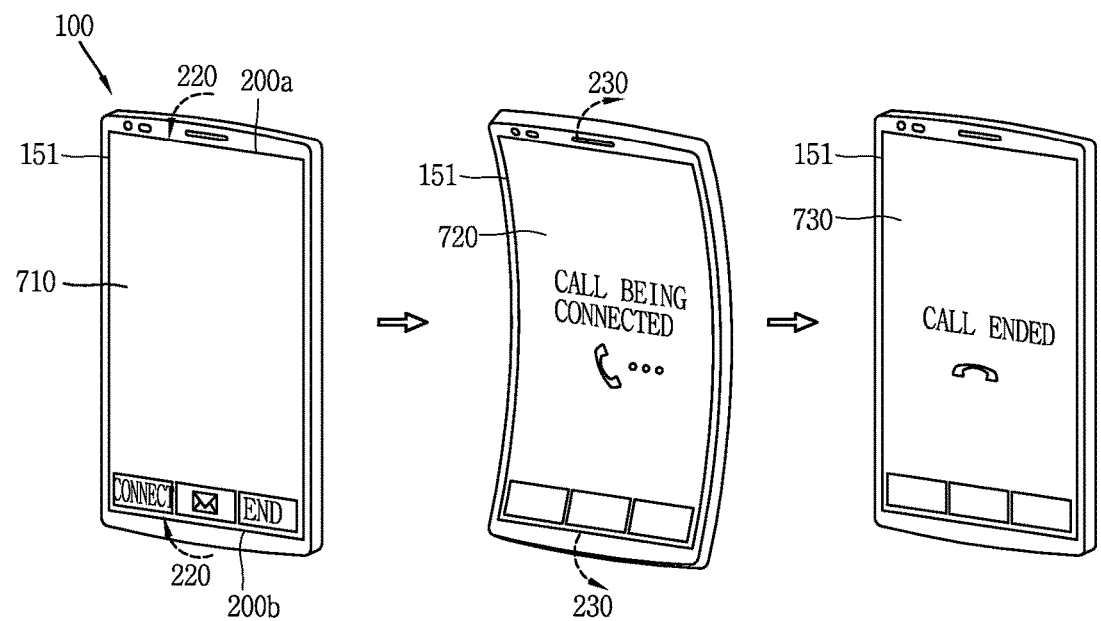
FIG. 7 is a conceptual view for explaining the control method illustrated in FIG. 6.

FIG. 6 is a flow chart representatively illustrating a control method of the present disclosure, and FIG. 7 is a conceptual view for explaining the control method illustrated in FIG. 6.

The display unit 151 provided in the mobile terminal 100 of the present disclosure may operate in either a first configuration or a second configuration having different radii of curvature. According to a mobile terminal of the present disclosure, the process of switching (changing) the display unit 151 from a first configuration to a second configuration based on a call being connected is carried out (S610).

Here, the call being connected may denote being connected in a call-enabled state in response to a call signal being received from another terminal or being connected in a call-enabled state based on an outgoing signal transmitted to another terminal and a response generated from the another terminal. The call connection may be carried out through the wireless communication unit 110, for example.

In other words, the call being connected may denote entering a call-enabled state, and should be understood to be different from receiving a call signal (incoming signal) from another terminal or transmitting an outgoing signal to another terminal.

A method of connecting a call between the mobile terminal 100 and another terminal is a typical technology, and thus the detailed description thereof will be omitted.

Furthermore, for an example, the first configuration may denote a flat configuration in which the display unit 151 has an infinite radius of curvature, and the second configuration may denote a bent configuration in which the display unit 151 is a finite radius of curvature.

Furthermore, a mobile terminal according to the present disclosure may include a first output unit 152*a* for outputting a voice received from another terminal in the periphery of one end 200*a* of the display unit 151 and a microphone 122 for receiving a user's voice in the periphery of the other end 200*b* of the display unit 151 as illustrated in FIG. 1B. In this case, the second configuration may be a configuration in which at least one of the one end 200*a* and the other end 200*b* of the display unit 151 is bent in the direction 220 of covering a front surface of the display unit 151. Due to this, the display unit 151 of the present disclosure may be bent in such a manner that at least part of a front surface of the display unit 151 is in a concave shape.

Here, the controller 180 may determine the extent of bending of the display unit 151 based on a user's face shape performing a phone call. Specifically, the controller 180 may sense a pressure applied from a user's face performing a phone call using the sensing unit 140, and deform the display unit 151 to correspond to the user's face shape using the pressure.

Then, according to the present disclosure, when the connected call is ended in a second configuration in which the display unit 151 is bent, the process of restoring the display unit 151 in a second configuration to a first configuration is carried out (S620).

Specifically, when the call connection is ended, namely, when the call connection is ended according to a control command applied to the mobile terminal 100 or the call connection is ended by the user of another terminal, the controller 180 may unfold the display unit 151 from a second configuration in which a front surface of the display unit 151 is bent in a concave shape to a flat configuration.

The foregoing description will be more clearly understood with reference to FIG. 7.

Referring to the first drawing of FIG. 7, when a call signal is received from another terminal, the controller 180 may switch the display unit 151 from an inactive state (OFF state) to an active state (ON), and display screen information 710 indicating that a call signal is received on the display unit 151. Here, the display unit 151 may be in a first configuration (flat configuration) having an infinite radius of curvature.

In this case, when a call is connected in response to the reception of the call signal, the controller 180 may switch the display unit 151 in a first configuration to a second configuration (bent configuration) having an finite radius of curvature. Here, the second configuration may be a configuration in which at least part of the display unit 151 is bent in a concave shape according to at least one of one end 200*a* and the other end 200*b* of the display unit 151 being bent in the direction 220 of covering the display unit 151 as illustrated in the first and the second drawing of FIG. 7. Here, screen information 720 indicating that the call has been connected (screen information indicating that the line is busy) may be displayed on the display unit 151.

Then, when the connected call is ended, the controller 180 may restore the display unit 151 in a second configuration to a first configuration as illustrated in the second and the third drawing of FIG. 7. Restoring the display unit 151 to the first configuration may denote deforming the display unit 151 in a bent configuration to a flat configuration again. Furthermore, restoring the display unit 151 to the first configuration may denote bending the display unit 151 from a configuration in which at least one of the one end 200*a* and the other end 200*b* of the display unit 151 is bent in the direction of covering a front surface of the display unit 151 to a configuration in which at least one of the one end 200*a* and the other end 200*b* of the display unit 151 is bent in the direction 230 of covering a rear surface of the display unit 151. When the connected call is ended, screen information 730 indicating that the call has been ended (or home screen page or screen information being displayed prior to performing a call connection) may be displayed on the display unit 151.

Through the foregoing configuration, the present disclosure may provide a mobile terminal for controlling the display unit 151 in such a manner that a front surface of the display unit 151 is bent in a concave shape, thereby enhancing the quality of a voice received or transmitted during phone call in terms of hardware.

Furthermore, the present disclosure may control the display unit 151 to be bent when a call is connected, and control the display unit 151 to be unfolded when a call is ended, thereby allowing the user to know whether or not a call has been connected in terms of hardware.

Hereinafter, a method of deforming the display unit based on various inputs generated during call connection according to the present disclosure will be described in more detail with reference to the accompanying drawings.

FIGS. 8A, 8B, 8C and 8D are conceptual view for explaining a method of switching a display unit according to an embodiment of the present disclosure from a flat configuration to a bent configuration based on a control command that satisfies a preset condition being received during call connection.

FIGS. 9A, 9B, 9C and 9D are conceptual view for explaining a method of controlling a display unit according to an embodiment of the present disclosure to be further bent from a bent configuration based on a control command that satisfies a preset condition being received during call connection.

Figure 10A:
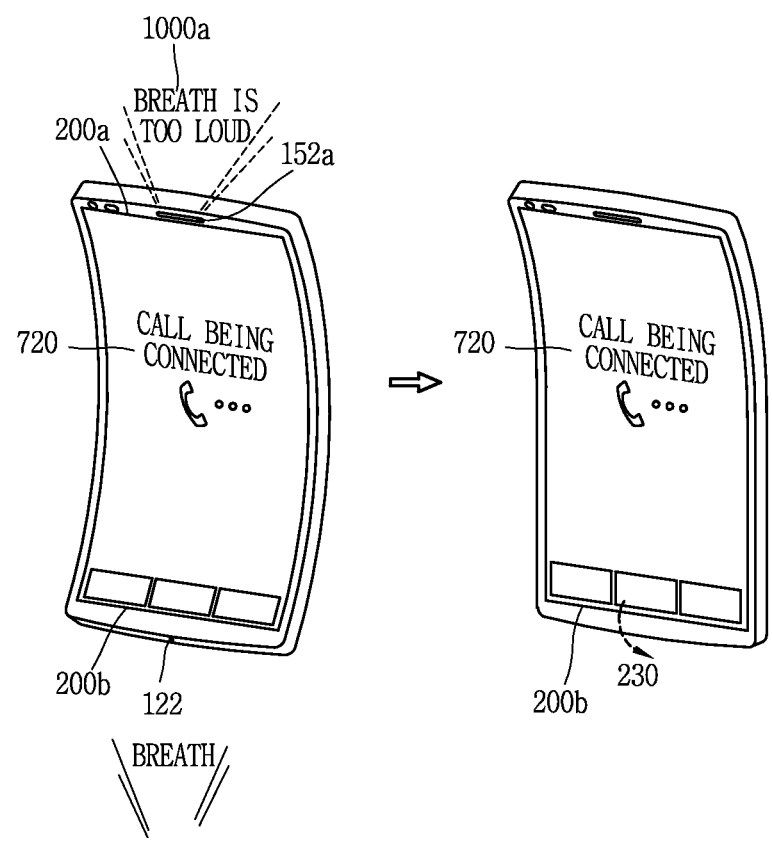

FIGS. 10A and 10B are conceptual views for explaining a method of controlling only part of the display unit to be bent during call connection.

The controller 180 may be configured to maintain the display unit 151 in a first configuration when the call is connected in the first configuration. In other words, The controller 180 may maintain the display unit 151 in a first configuration even when a call is connected in a first configuration in which the display unit 151 is in a flat configuration.

Then, the controller 180 may switch the display unit 151 from the first configuration to a second configuration in which at least part of a front surface of the display unit 151 has a concave shape based on a control command that satisfies a preset condition being received during call connection. In other words, the controller 180 may be configured to switch the display unit 151 from the first configuration to the second configuration based on an input corresponding to a preset condition being received during call connection.

For example, as illustrated in the first drawing of FIG. 8A, the controller 180 may maintain the display unit 151 in a first configuration even when a call is connected in the first configuration which is a flat configuration.

Then, the controller 180 may be configured to switch the display unit 151 from a first configuration to a second configuration during the call connection based on at least one of a movement of the mobile terminal 100 sensed by a sensing unit 140 or an input to increase audio volume received by a manipulation unit 123b.

Also, the controller 180 may switch the display unit 151 from a first configuration to a second configuration during the call connection as illustrated in the third drawing of FIG. 8A, based on at least one of the mobile terminal being moved to correspond to a preset movement 810 or a control command (an input) for increasing the volume of audio (voice) being received through the manipulation unit 123b as illustrated in the second drawing of FIG. 8A.

To this end, the present disclosure may further include a sensing unit 140 for sensing the movement of the mobile terminal and a manipulation unit 123b for receiving a control command (an input) for audio volume control.

The sensing unit 140 may sense the movement of the mobile terminal through at least one combination of an acceleration sensor, a G-sensor, a gyroscope sensor and a motion sensor.

The manipulation unit 123b may be configured with a touch key or push key (mechanical key) or a combination of the touch key and the push key. The manipulation unit 123b may receive an audio volume control command (an input) output from the first and the second audio output unit 152a, 152b.

As a movement for allowing the user to locate at a position corresponding to his or her ear, the preset movement 810 may be a movement allowing the mobile terminal 100 to repetitively move in the left or right direction to have a preset distance by a preset number of times.

In other words, even when a call is connected, the controller 180 may maintain the display unit 151 in a flat configuration. Furthermore, the controller 180 may sense the mobile terminal 100 being moved, the mobile terminal 100 being moved to correspond to a preset movement 810 or a control command (an input) for increasing the volume of audio (voice) being received from another terminal during call connection through the manipulation unit 123b. Then, the controller 180 may control the display unit 151 in such a manner that at least one of ends (i.e. one end 200a and the other end 200b) of the display unit 151 is bent in the direction 220 of covering a front surface of the display unit 151.

Here, the audio output unit 152a may be provided in the periphery of one end 200a of the display unit 151, and the microphone 122 may be provided in the periphery of the other end 200b of the display unit 151.

For another example, the controller 180 may be configured to maintain the display unit in a first configuration when the call is connected in the first configuration. In other words, the controller 180 may maintain the display unit 151 in a first configuration even when a call is connected in the first configuration which is a flat configuration as illustrated in the first drawing of FIG. 8B.

Figure 8B:
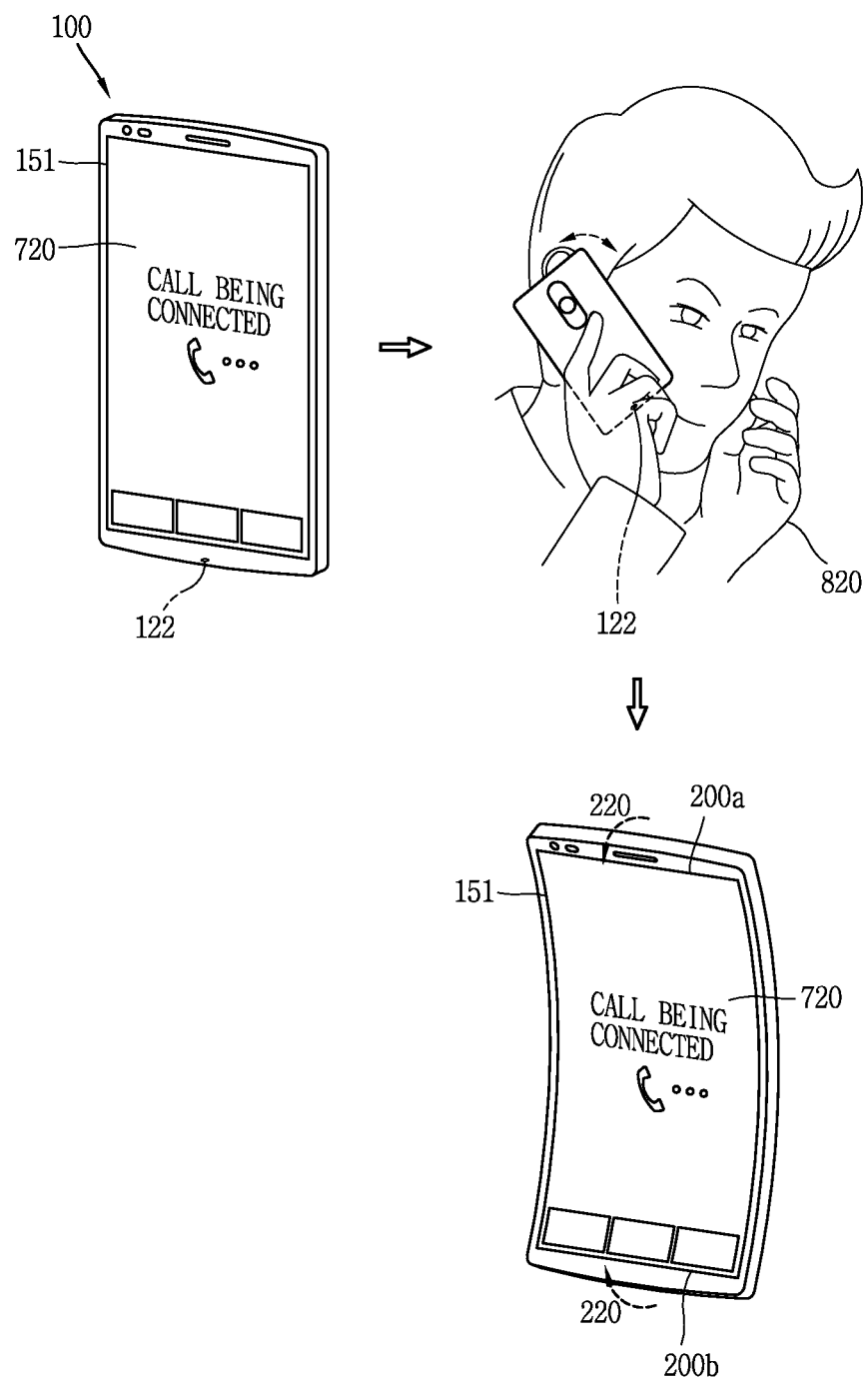

Subsequently, the controller 180 may switch the display unit 151 from a first configuration to a second configuration during the call connection as illustrated in the third drawing of FIG. 8B, based on an object approaching the proximity of the microphone 122 and an increase of a volume (a voice volume, a volume of a voice) received through the microphone 122 as illustrated in the second drawing of FIG. 8B. The microphone 122 may be disposed around an end of the display unit. For example, The microphone 122 may be disposed in the periphery of any one of one end 200a and the other end 200b of the display unit 151. Furthermore, the sensing unit 140 of the present disclosure may sense an object approaching the proximity of the microphone 122 using the proximity sensor or the like.

The object may be a user's hand, for example. In other words, the user may place his or her hand in the proximity of the microphone 122 to input his or her own voice to the microphone 122 in a better way during phone call, thereby increasing the user's voice volume being input to the microphone 122.

In other words, the controller 180 may sense an object approaching the proximity of the microphone 122 and an increase of a volume (a voice volume, a volume of a voice) received from the microphone 122 during call connection. Then, the controller 180 may control the display unit 151 in a first configuration such that at least one of ends (one end 200a and the other end 200b) of the display unit 151 is bent in the direction 220 of covering a front surface of the display unit 151 in response to the sensing.

Here, according to an embodiment, when the microphone 122 is disposed in the periphery of the other end 200b of the display unit 151, the controller 180 may allow a partial region adjacent to the other end 200b of the display unit 151 to be bent such that the other end 200b of the display unit 151 is bent in the direction 220 of covering a front surface of the display unit 151.

On the other hand, the controller 180 may control the display unit 151 to be bent on the basis of a different reference region based on the movement of the mobile terminal. Specifically, the controller 180 may control the display unit 151 such that the display unit 151 is bent on the basis of a different reference region based on the movement of the mobile terminal being sensed within a reference time period subsequent to connecting a call in response to call signal reception 710.

For example, the display unit 151 may be bent on the basis of a first reference region based on the mobile terminal being rotated in a first direction subsequent to the call connection, and bent on the basis of a second reference region different from the first reference region based on the mobile terminal being rotated in a second direction different from the first direction subsequent to the call connection.

Figure 8C:
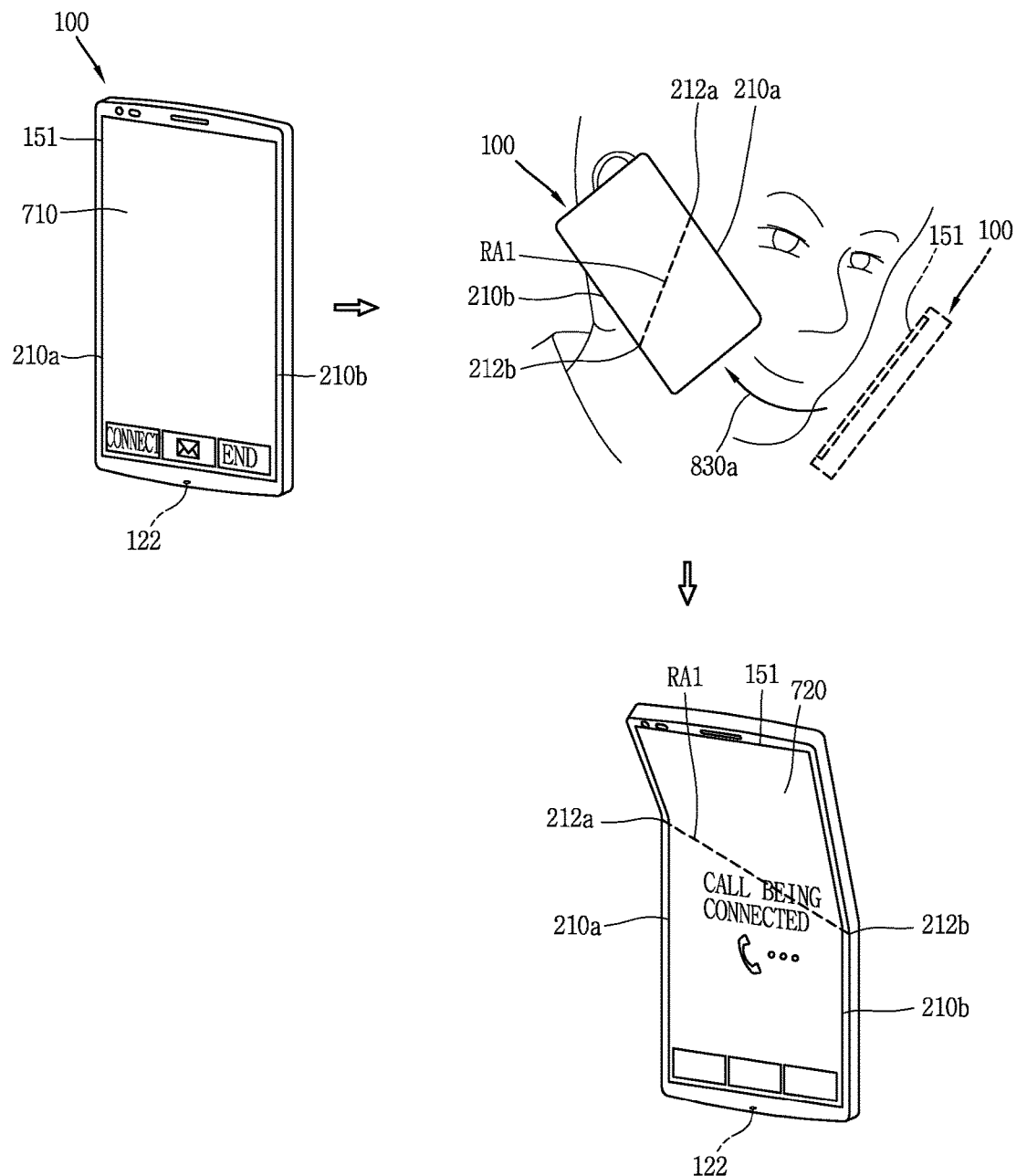

For example, subsequent to connecting a call in response to a call signal being received from another terminal as illustrated in the first drawing of FIG. 8C, the mobile terminal 100 may be rotated in a first direction 830a by the user as illustrated in the second drawing of FIG. 8C. Here, the first direction 830a may denote a direction of moving a front surface of the display unit 151 to the user's right ear in a state that a front surface of the display unit 151 faces the user's face, which is a clockwise direction when seen from the above.

Here, the first reference region (RA1) may be formed in an inclined manner other than in parallel to the width direction of the display unit 151 as illustrated in the third drawing of FIG. 8C. Specifically, the first reference region (RA1) may be formed to connect between one position 212a of the left end 210a and one position 212b of the right end 210b on the display unit 151, and the one position 212a of the left end 210a may be located closer to an upper end side of the display unit 151 than the one position 212b of the right end 210b.

Furthermore, though not shown in the drawing, the first reference region (RA1) may be formed to connect between one position 212a of the left end 210a and one position of the lower end, and the one position of the lower end may be located in the proximity of an intersection at which the right end 210b and the lower end are crossed. Here, the proximity of the intersection may denote a region (position) within a reference distance with respect to the intersection, and the reference distance may be set by the user. For example, the reference distance may be shorter than a half of the lower end length of the display unit.

On the other hand, the controller 180 may control the display unit 151 to be bent on the basis of a second reference region (RA2) different from the first reference region (RA1) based on the mobile terminal being rotated in a second direction 830b different from the first direction 830a subsequent to call connection.

Figure 8D:
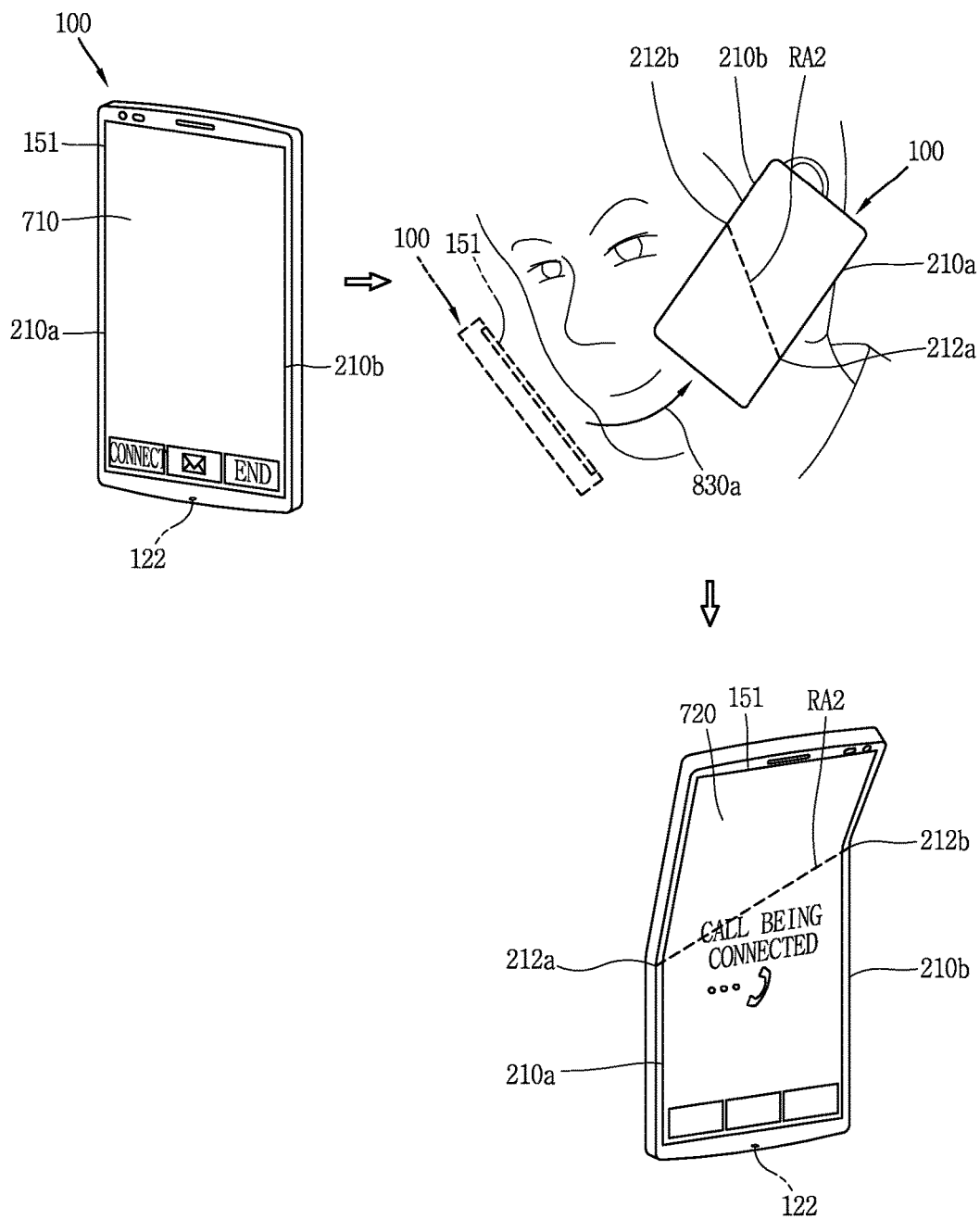

For example, subsequent to connecting a call in response to a call signal being received from another terminal as illustrated in the first drawing of FIG. 8D, the mobile terminal 100 may be rotated in a second direction 830b by the user as illustrated in the second drawing of FIG. 8D. Here, the second direction 830b may denote a direction of moving a front surface of the display unit 151 to the user's left ear in a state that a front surface of the display unit 151 faces the user's face, which is a counter-clockwise direction when seen from the above.

Here, the second reference region (RA2) may be formed in an inclined manner other than in parallel to the width direction of the display unit 151 as illustrated in the third drawing of FIG. 8D. Specifically, the second reference region (RA2) may be formed to connect between one position 212a of the left end 210a and one position 212b of the right end 210b on the display unit 151, and the one position 212b of the right end 210b may be located closer to an upper end side of the display unit 151 than the one position 212a of the left end 210a.

Furthermore, though not shown in the drawing, the second reference region (RA2) may be formed to connect between one position 212b of the right end 210b and one position of the lower end, and the one position of the lower end may be located in the proximity of an intersection at which the left end 210a and the lower end are crossed.

On the other hand, the controller 180 may connect a call based on the sensing of a preset movement (for example, movement rotated in either one of a first and a second direction) in a state that a call signal is received as illustrated in the first drawing of FIGS. 8C and 8D. Then, the controller 180 may control the display unit 151 to be bent on the basis of either one of the first and the second reference region (RA1, RA2) as illustrated in the drawing of FIGS. 8C and 8D based on the movement of the mobile terminal that has been moved prior to connecting the call.

In this case, the display unit 151 may be bent to have a twisted shape, and the microphone 122 is disposed in the periphery of a lower end of the display unit 151, the microphone 122 may be closer to the user's mouth. Furthermore, the display unit 151 may be twisted to have a different shape based on a position at which a call is carried out (left or right ear). In other words, the present disclosure may control the display unit 151 to be bent in a twisted shape based on a preset movement being sensed subsequent to call connection, thereby allowing the display unit 151 to be bent in a shape optimized for the user's face. Due to this, the present disclosure may provide a mobile terminal capable of more effectively receiving a user's voice generated during a phone call as well as more conveniently performing a phone call for the user in terms of hardware.

Though not shown in the drawing, when a call is connected, and a speaker mode is activated based on a user request, the controller 180 may control the display unit 151 in a flat configuration such that at least one of ends (end 200a and the other end 200b) of the display unit 151 is bent in the direction 230 of covering a rear surface of the display unit 151. In this case, a front surface of the display unit 151 may be bent in a convex manner. (The detailed description of a speaker mode will be described later.

On the other hand, as described above, the controller 180 may switch the display unit 151 in a first configuration to a second configuration based on a call being connected. Here, the display unit 151 in the second configuration may be further bent than the second configuration from based on a control command that satisfies a preset condition being received during the call connection. In other words, the controller 180 may be configured to switch the display unit 151 from the second configuration to a third configuration based on an input corresponding to a preset condition being received during the call connection in the second configuration. Here, the third configuration is further bent than the second configuration.

Specifically, the controller 180 may maintain the display unit 151 in a flat configuration prior to call connection, and control at least one of ends (one end 200a and the other end 200b) of the display unit 151 to be bent in the direction 220 of covering a front surface of the display unit 151.

Then, when a control command that satisfies a preset condition is received in a state that a call is connected when the display unit 151 is in a second configuration, the controller 180 may control the display unit 151 such that the display unit 151 bent in the second configuration is further bent. In other words, when an input corresponding to a preset condition is received in a state that a call is connected when the display unit 151 is in a second configuration, the controller 180 may switch the display unit 151 from the second configuration to a third configuration being further bent than the second configuration.

The preset condition may be at least one of a case where a volume of a sound corresponding to a noise received from the microphone is higher than a reference volume, a case where a preset voice is received at at least one of the microphone and speaker, a case where a control command (an input) for increasing an audio volume is received while the audio volume is in the maximum state, or a case where an object approaches the proximity of the microphone and a volume (a voice volume, a volume of a voice) received through the microphone increases.

Figure 9A:
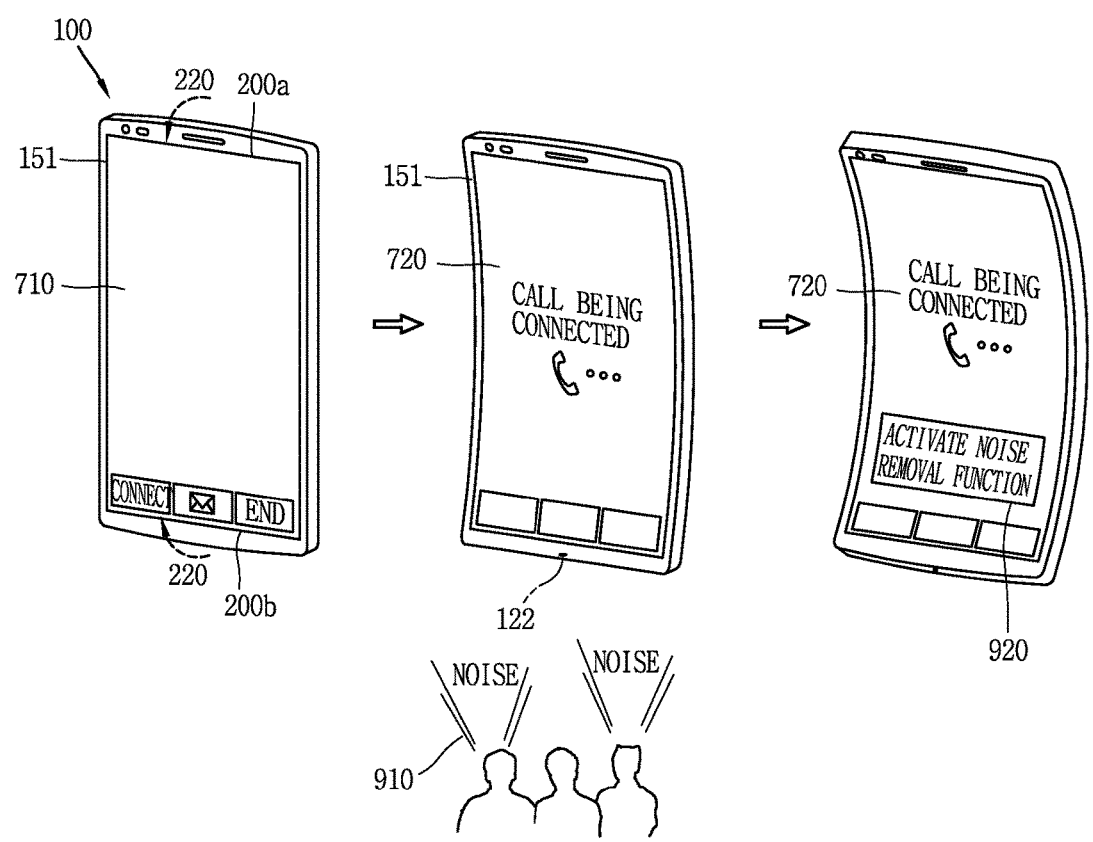
FIGS. 9A, 9B, 9C and 9D are conceptual view for explaining a method of controlling a display unit according to an embodiment of the present disclosure to be further bent from a bent configuration based on a control command that satisfies a preset condition being received during call connection.

For example, when a call is connected as illustrated in the second drawing of FIG. 9A in response to call signal reception 710 as illustrated in the first drawing of FIG. 9A (720), the controller 180 may switch the display unit 151 in a first configuration to a second configuration. Here, switching the display unit 151 to a second configuration may include a case where a call is connect due to another terminal subsequent to transmitting an outgoing signal as well as connecting a call in response to call signal reception 710. (It will be applicable to the following in a similar manner).

Here, when a sound corresponding to a noise 910 received through the microphone 122 during a phone call is higher than a reference volume as illustrated in the second drawing of FIG. 9A, the controller 180 may control the display unit 151 in the second configuration to be further bent as illustrated in the third drawing of FIG. 9A. Here, allowing the display unit 151 to be further bent may denote allowing the display unit 151 in a configuration having a first radius of curvature to be bent to have a second radius of curvature shorter than the first radius of curvature. If a second configuration has the first radius of curvature, a third configuration may have a second radius of curvature shorter than the first radius of curvature.

Furthermore, the controller 180 may determine whether or not a sound received through the microphone 122 is a user's voice or noise 910 using an algorithm for determining a sound corresponding to the noise 910. A method of determining a sound corresponding to the noise 910 is a general technology, and thus the detailed description thereof will be omitted.

On the other hand, when the display unit 151 in a second configuration is further bent than the second configuration, the controller 180 may activate a function 920 associated with a phone call. The function 920 associated with a phone call may denote a function of more clearly recognizing a voice received through the microphone 122, for example, and may be a function of removing a sound corresponding to a noise or more clearly processing the user's voice.

A method of removing a sound corresponding to a noise or more clearly processing the user's voice is a general technology, and thus the detailed description thereof will be omitted.

Figure 9B:
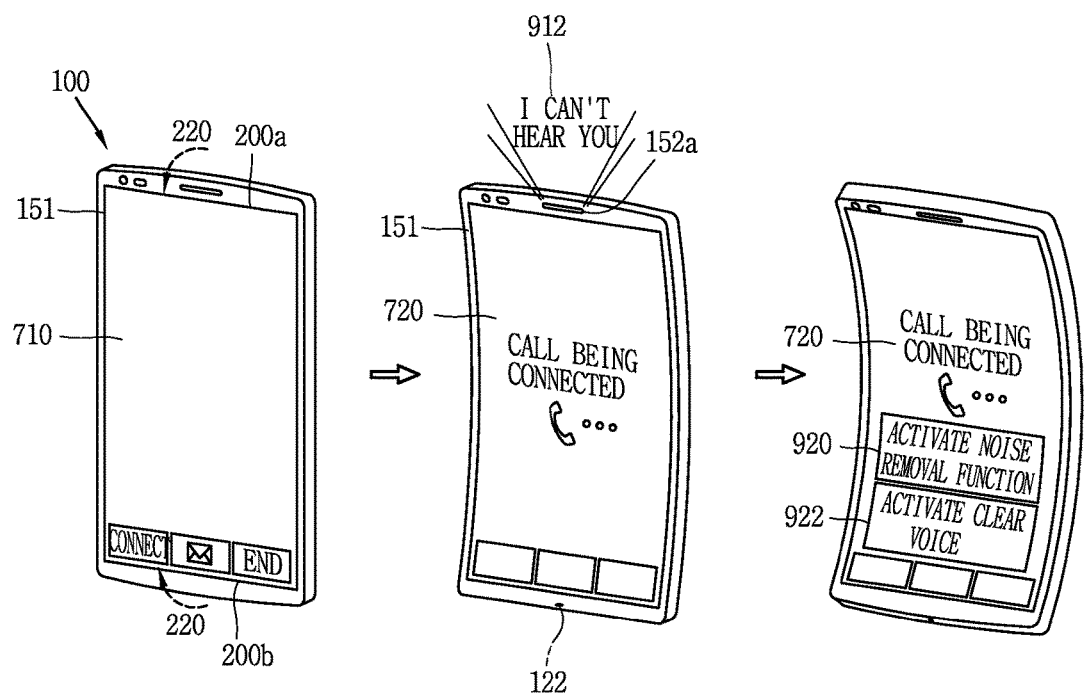

For another example, when a call is connected as illustrated in the second drawing of FIG. 9B in response to call signal reception 710 as illustrated in the first drawing of FIG. 9B (720), the controller 180 may switch the display unit 151 to a second configuration.

Here, when a preset voice is received at at least one of the microphone 122 and speaker 152a as illustrated in the second drawing of FIG. 9B, the controller 180 may control the display unit 151 in the second configuration to be further bent as illustrated in the third drawing of FIG. 9B.

Here, the preset voice may be a keyword determined by user setting, and for an example, when a voice "I can't hear you" is recognized from at least one of the microphone 122 and speaker 152a in a state that the preset voice is set to a keyword "I can't hear you", the controller 180 may control the display unit 151 in the second configuration to be further bent.

Similarly, when the display unit 151 in a second configuration is further bent from the second configuration, a function 920, 922 associated with a phone call may be activated. The function 920 associated with a phone call may denote a function of more clearly recognizing a voice received through the microphone 122, for example, and may be a function of removing a sound corresponding to a noise (920) or more clearly processing the user's voice (922).

Figure 9C:
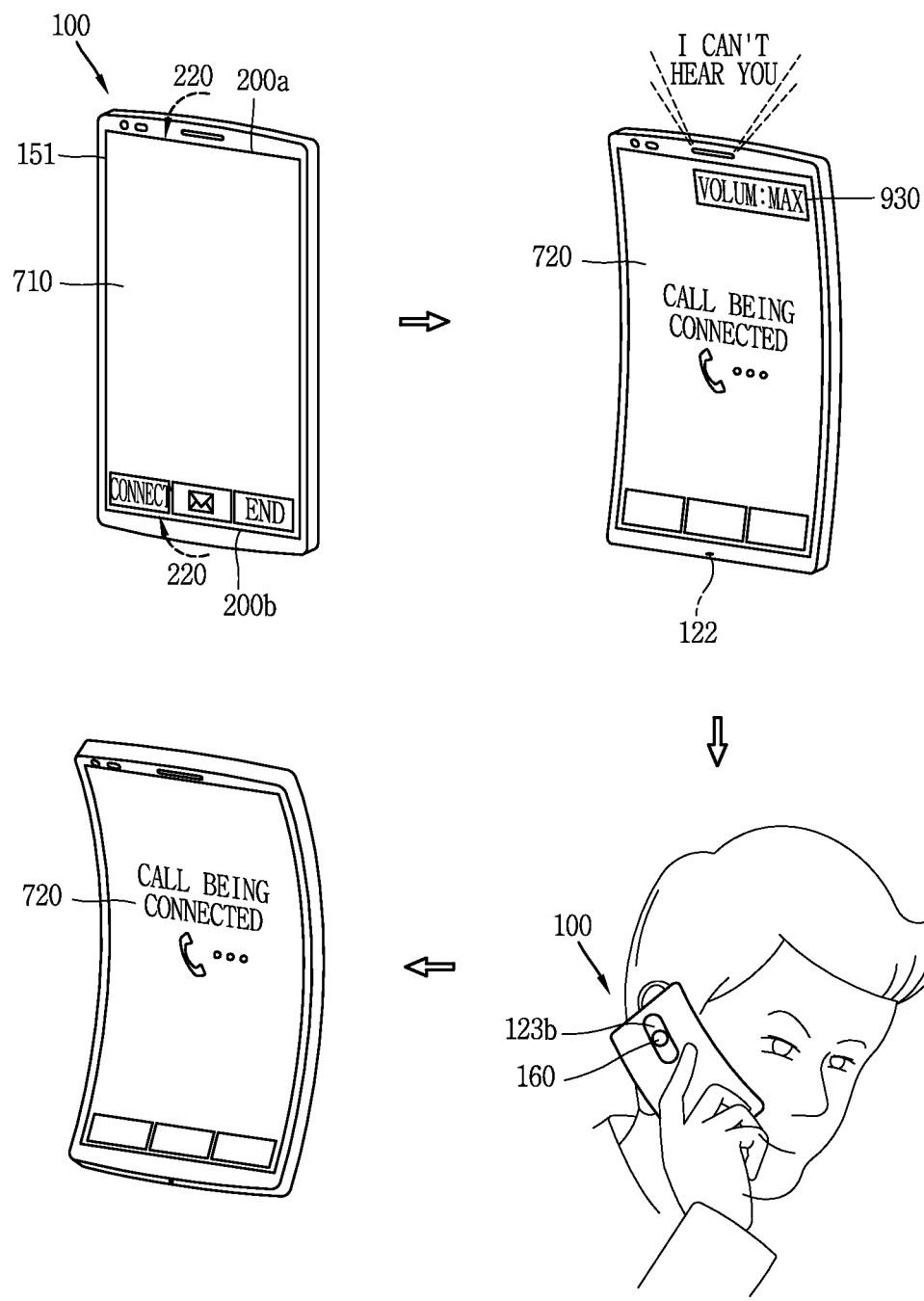

For another example, when a call is connected (720) as illustrated in the second drawing of FIG. 9C in response to call signal reception 710 as illustrated in the first drawing of FIG. 9C, the controller 180 may switch the display unit 151 in a first configuration to a second configuration.

Here, when a control command for increasing the volume of audio is received through the manipulation unit 123b as illustrated in the third drawing of FIG. 9C while the volume of audio is in the maximum state 930 as illustrated in the second drawing of FIG. 9C, the controller 180 may control the display unit 151 to be further bent in the second configuration as illustrated in the fourth drawing of FIG. 9C.

Figure 9D:
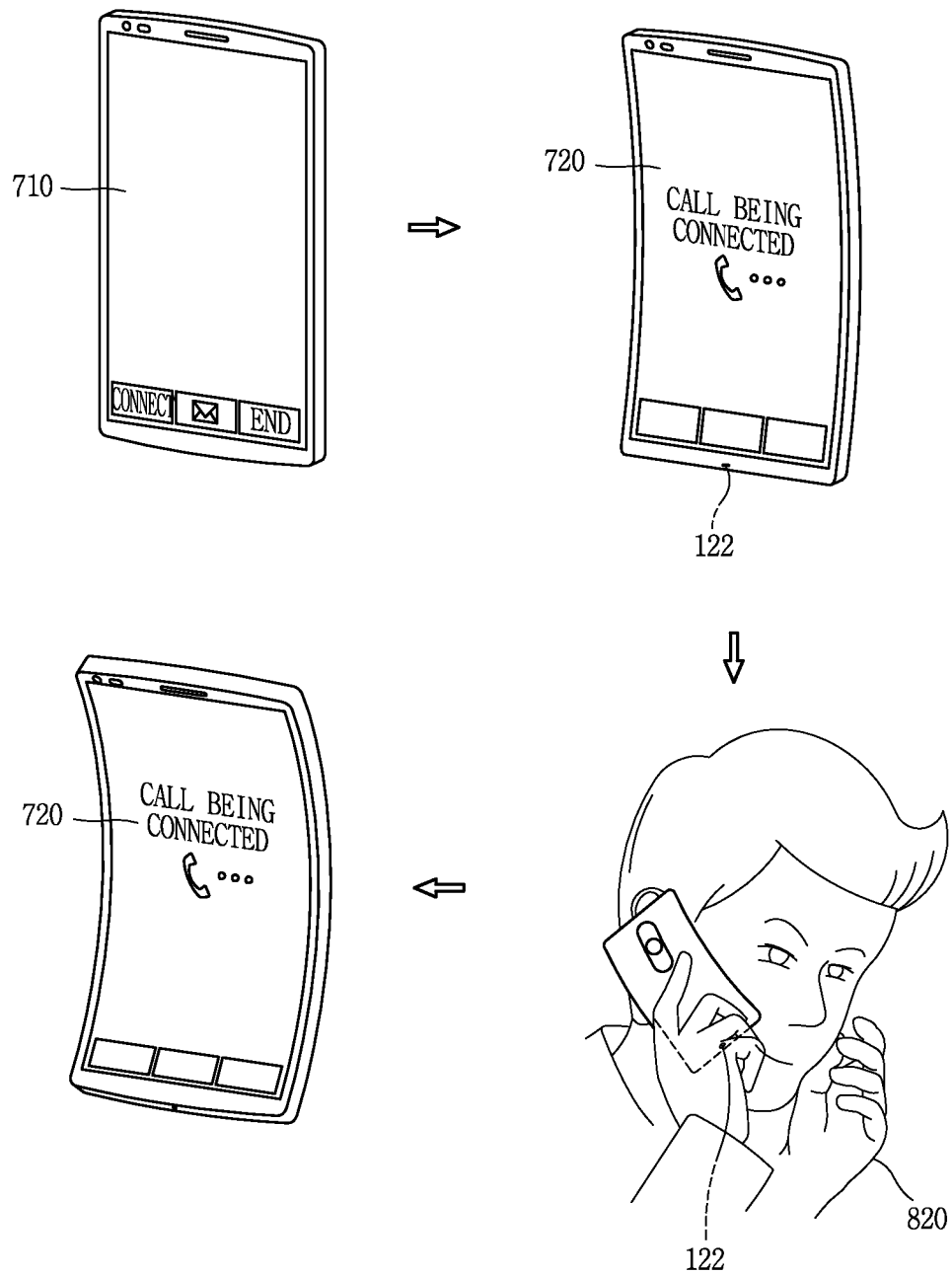

For another example, when a call is connected (720) as illustrated in the second drawing of FIG. 9D in response to call signal reception 710 as illustrated in the first drawing of FIG. 9D, the controller 180 may switch the display unit 151 in a first configuration to a second configuration.

Then, when an object (for example, a user's hand) approaches the proximity of the microphone 122 and the volume of a voice received through the microphone 122 increases during call connection as illustrated in the third drawing of FIG. 9D, the controller 180 may control the display unit 151 in a second configuration to be further bent as illustrated in the fourth drawing of FIG. 9D.

Through the foregoing configuration, the present disclosure may allow the display unit 151 to be further bent to have a second radius of curvature shorter than a first radius of curvature in response to the user's needs for enhancing call quality even when a phone call is carried out in a state that the display unit 151 is bent to have the first radius of curvature. Furthermore, in terms of hardware, the present disclosure may further minimize drawbacks that have not overcome in terms of software.

On the other hand, the controller 180 may control only a partial portion of the display unit during call connection to be bent based on a control command (an input) that satisfies a preset condition being received.

For example, as illustrated in the first drawing of FIG. 10A, the display unit 151 may be switched from a first configuration to a second configuration based on a call being connected. In this state, the microphone 122 may be disposed in the periphery of either one of the one end 200a and the other end 200b of the display unit 151.

Here, the display unit 151 may be in a second configuration, namely, a configuration in which one end 200a and the other end 200b of the display unit 151 is bent in the direction of covering a front surface of the display unit 151 (a configuration in which a front surface of the whole of the display unit 151 is bent in a concave shape).

Then, the controller 180 may sense at least one of a preset voice (for example, "breath" or "loud") being received (output) through the speaker 152a and a sound 1000b corresponding to a breath received through the microphone 122 being received to be higher than a reference volume during call connection.

In this case, the controller 180 may unfold a region adjacent to either one end (for example, 200a) disposed with the microphone 122 on the display unit from a bent configuration to a flat configuration in response to the sensing. Here, a region adjacent to an end (for example, 200b) opposite to the either one end may be maintained in a bent configuration or unfolded.

On the other hand, the microphone 122a, 122b may be provided in the periphery of one end 200a and the other end 200b of the display unit 151, respectively, as illustrated in the first drawing of FIG. 10B. Furthermore, when a phone call is carried out in a speaker mode in a state that the call has been connected, the controller 180 may determine a partial portion on which the display unit 151 is bent based on the direction of receiving a voice 1010a, 1010b. Here, the speaker mode may denote a mode in which a call is carried out in a state that the mobile terminal is separated from the user by a predetermined distance. In the speaker mode, the volume of audio output through at least one of the first and the second audio output unit 152a, 152b and a sensitivity at which a voice is received through the microphone 122 may be increased than the call connection (general mode) described in FIGS. 6 through 10A.

For example, when the user's voice 1010a is received in a louder volume through the first microphone 122a of the first and the second microphone 122a, 122b as illustrated in the second drawing of FIG. 10B, the controller 180 may control the display unit 151 such that one end 200a of the display unit adjacent to the first microphone 122a is bent in the direction 220 of covering a front surface of the display unit 151.

Furthermore, when the user's voice 1010b is received in a louder volume through the second microphone 122b of the first and the second microphone 122a, 122b as illustrated in the third drawing of FIG. 10B, the controller 180 may control the display unit 151 such that the other end 200b of the display unit adjacent to the second microphone 122b is bent in the direction 220 of covering a front surface of the display unit 151.

As described above, the present disclosure may control only a partial portion of the display unit 151 to be bent, thereby providing a mobile terminal having an optimized shape in terms of hardware in more various situations occurs during a phone call.

On the other hand, according to the present disclosure, the display unit 151 may be deformed due to an external force, and various functions may be carried out based on the deformation of the display unit 151. Hereinafter, a method of performing various functions based on the display unit 151 being deformed from a flat first configuration to a bent second configuration or from a bent second configuration to a flat first configuration due to an external force will be described in more detail with reference to the accompanying drawings.

FIGS. 11A, 11B, 11C, 11D and 11E are conceptual views for explaining a method of performing a function associated with a call based on the bending of the display unit due to an external force.

The sensing unit 140 of the present disclosure may sense the bending of the display unit 151. Specifically, the controller 180 may determine whether or not the display unit 151 is bent due to an external force through the sensing unit 140.

The controller 180 may perform a function associated with a call based on the bending of the display unit 151, for an example.

Figure 11A:
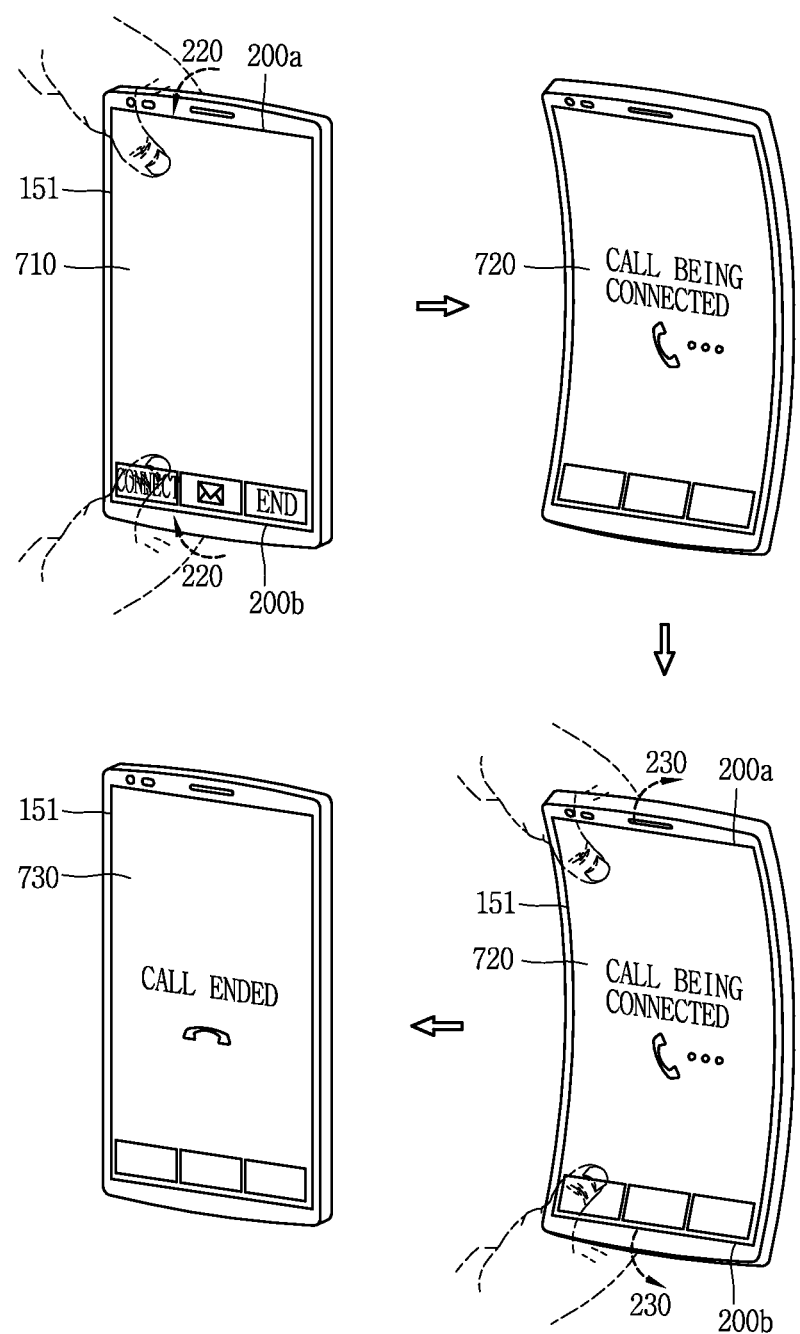
FIGS. 11A, 11B, 11C, 11D and 11E are conceptual views for explaining a method of performing a function associated with a call based on the bending of the display unit due to an external force.
Figure 11B:
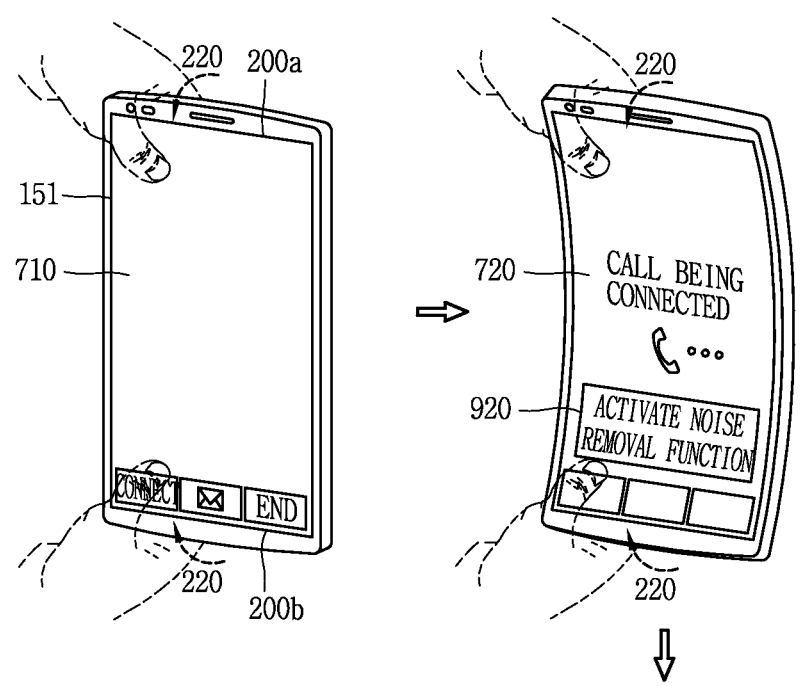

For example, when the display unit 151 in a first configuration (flat configuration) is bent to a second configuration while receiving a call (call signal reception 710) as illustrated in the first drawing of FIG. 11A, the controller 180 may connect a call (720) as illustrated in the second drawing of FIG. 11A. Specifically, when at least one of one end 200a and the other end 200b of the display unit 151 is bent in the direction 220 of covering a front surface of the display unit 151 (when switched to a second configuration) due to an external force in a state that the display unit 151 is flat, the controller 180 may connect a call in response to a call signal being received.

Then, when the display unit 151 in a second configuration is switched to a first configuration due to an external force as illustrated in the third drawing of FIG. 11A, the controller 180 may end the connected call (730) as illustrated in the fourth drawing of FIG. 11A.

Here, switching the display unit 151 in the second configuration to a first configuration due to an external force may denote unfolding one end 200a and the other end 200b of the display unit 151 from a concave configuration (second configuration) of the front surface of the display unit 151 to a flat configuration according to the bending in the direction 230 of covering a rear surface of the display unit 151 due to an external force as illustrated in the third drawing of FIG. 11A.

On the other hand, the controller 180 may perform a different function based on the extent of bending of the display unit 151. For example, as illustrated in the first and the second drawing of FIG. 11B, when the display unit 151 is bent to have a first radius of curvature, the controller 180 may activate a first function (for example, noise removal function) associated with a phone call. Furthermore, as illustrated in the second and the third drawing of FIG. 11B, when the display unit 151 is bent (further bent) to have a second radius of curvature shorter than the first radius of curvature due to an external force, the controller 180 may activate a second function (for example, clear voice function) 922 associated with another phone call different from the first function associated with the phone call.

Here, the controller 180 may additionally activate the second function 922 in a state that the first function 920 is activated or activate the second function 922 and then switch the first function 911 to an inactive state. The operation may be determined due to a user's setting or the control of the controller.

Furthermore, the description of the noise removal function and clear voice function will be substituted by the description of FIGS. 9A and 9B.

Figure 11C:
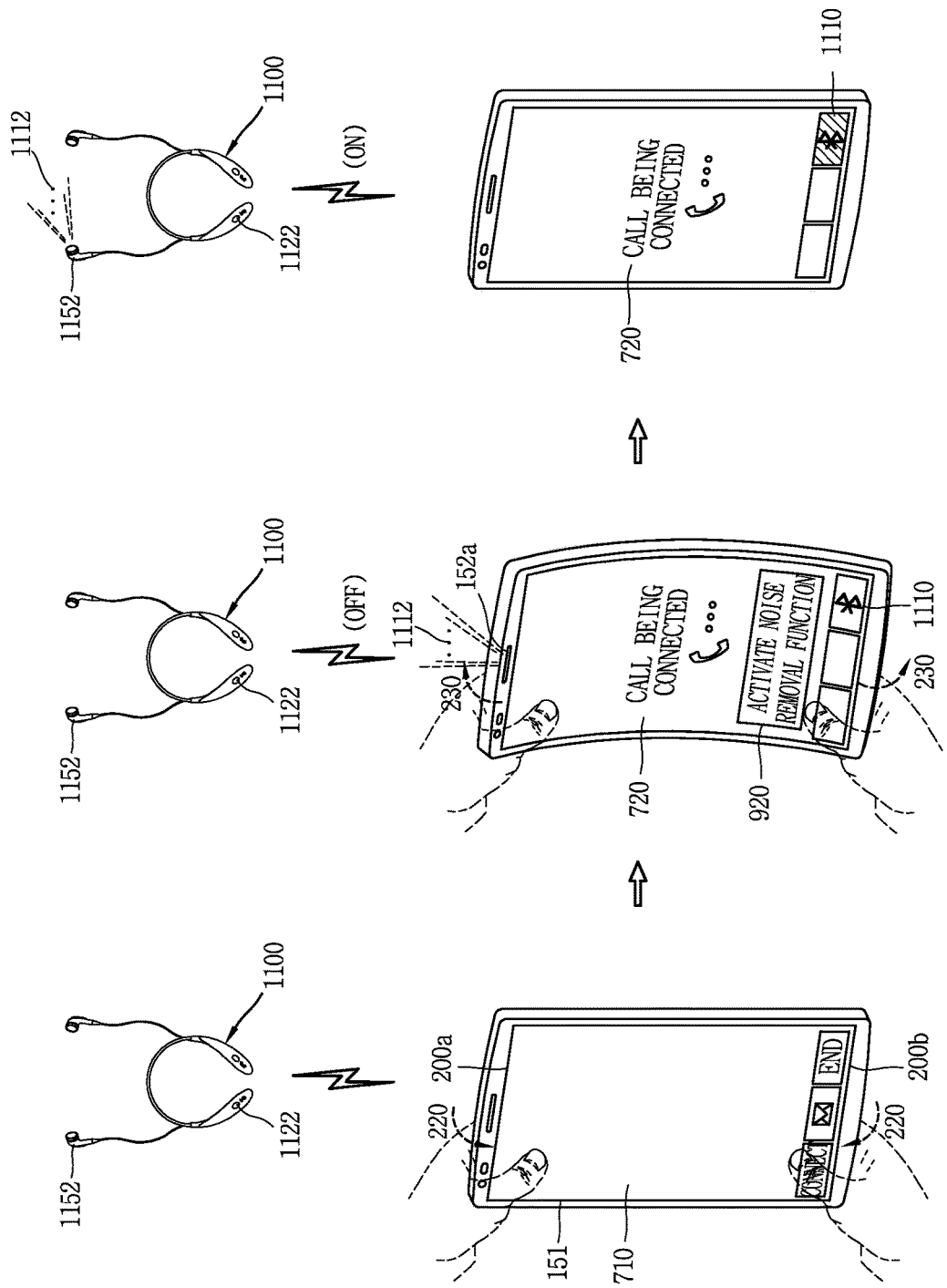

On the other hand, as illustrated in FIG. 11C, the mobile terminal of the present disclosure may communicate with an external device 1100 provided with a speaker 1152 and a microphone 1122 in a wired and wireless manner, and in this case, perform a phone call through the external device 1100.

Here, when a call is connected in response to call signal reception while being connected with the external device 1100, the controller 180 may output a voice 1112 received from another terminal through the speaker 1152 provided in the external device 1100, and transmit a user's voice received through the microphone 1122 to another terminal.

On the other hand, as illustrated in the first drawing of FIG. 11C, when the display unit 151 is switched from a first configuration to a second configuration due to an external force in response to call signal reception 710, the controller 180 may perform a phone call through the mobile terminal 100 other than the external device 1100. In other words, as illustrated in the second drawing of FIG. 11C, when at least one of one end 200a and the other end 200b of the display unit 151 is bent in the direction 220 of covering a front surface of the display unit 151 due to an external force, the controller 180 may deactivate a connection 1110 to the external device 1100, and perform a phone call through the speaker 152a and microphone 122 provided in the mobile terminal 100.

Here, when the display unit 151 is restored from a second configuration to a first configuration due to an external force during call connection (one end 200a and the other end 200b of the display unit 151 bent in a concave shape becomes a flat configuration according to the bending in the direction 230 of covering a rear surface of the display unit 151), the controller 180 may switch the connection 1110 to the external device 1100 from an inactive state to an active state while connecting the call (720) as illustrated in the third drawing of FIG. 11C. In this case, the user may perform a phone call through the external device 1100.

Figure 11D:
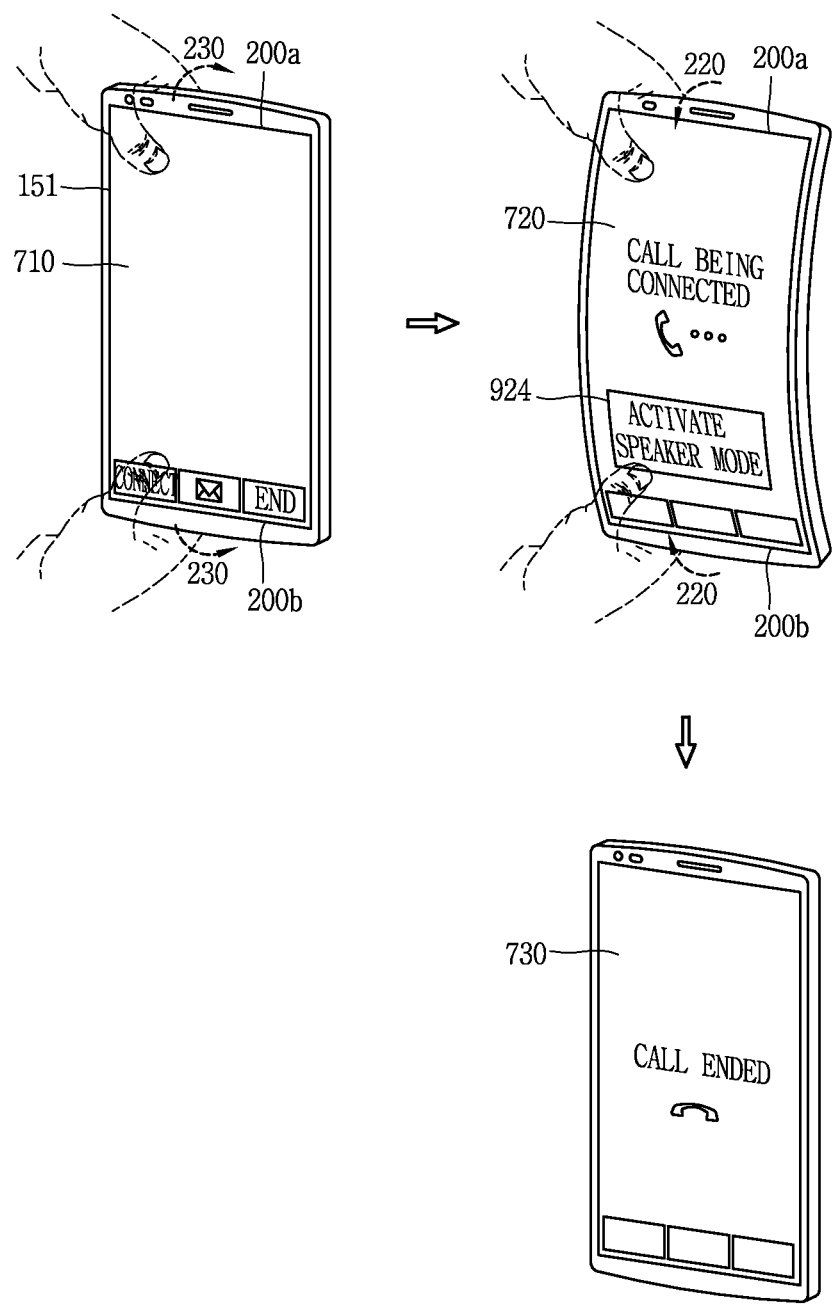

On the other hand, when a front surface of the display unit 151 in a flat configuration is bent to have a convex shape due to an external force during call signal reception 710 (at least one end 200a and the other end 200b of the display unit 151 is bent in the direction of covering a rear surface of the display unit 151 due to an external force) as illustrated in the first drawing of FIG. 11D, the controller 180 may connect a call (720) to activate a speaker mode 924 as illustrated in the second drawing of FIG. 11D.

Then, when the display unit 151 is restored from a second configuration in which a front surface of the display unit is bent in a convex shape to a first configuration due to an external force, the controller 180 may end the connected call (730) as illustrated in the third drawing of FIG. 11D.

Figure 11E:
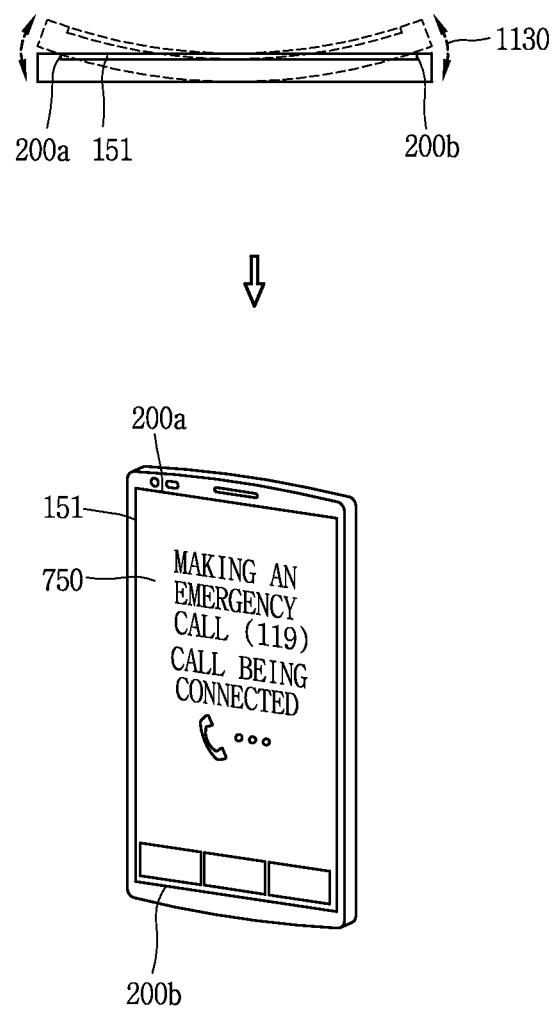

On the other hand, when the display unit 151 being switched from a flat first configuration to a second configuration and then the display unit 151 in the second configuration being restored to the first configuration again (1130) is sensed a predetermined number of times as illustrated in the first drawing of FIG. 11E, the controller 180 may transmit an outgoing signal to a preset number (for example, emergency phone number) as illustrated in the second drawing of FIG. 11E.

As described above, the present disclosure may perform various functions associated with a call based on the display unit 151 being deformed due to an external force, thereby providing a mobile terminal with an enhanced usability to the user.

Hereinafter, a method of controlling various functions available in a mobile terminal based on the display unit 151 being deformed due to an external force and a method of controlling the display unit 151 to deform the display unit 151 based on various functions carried out in the mobile terminal will be described in more detail with reference to the accompanying drawings.

Figure 12A:
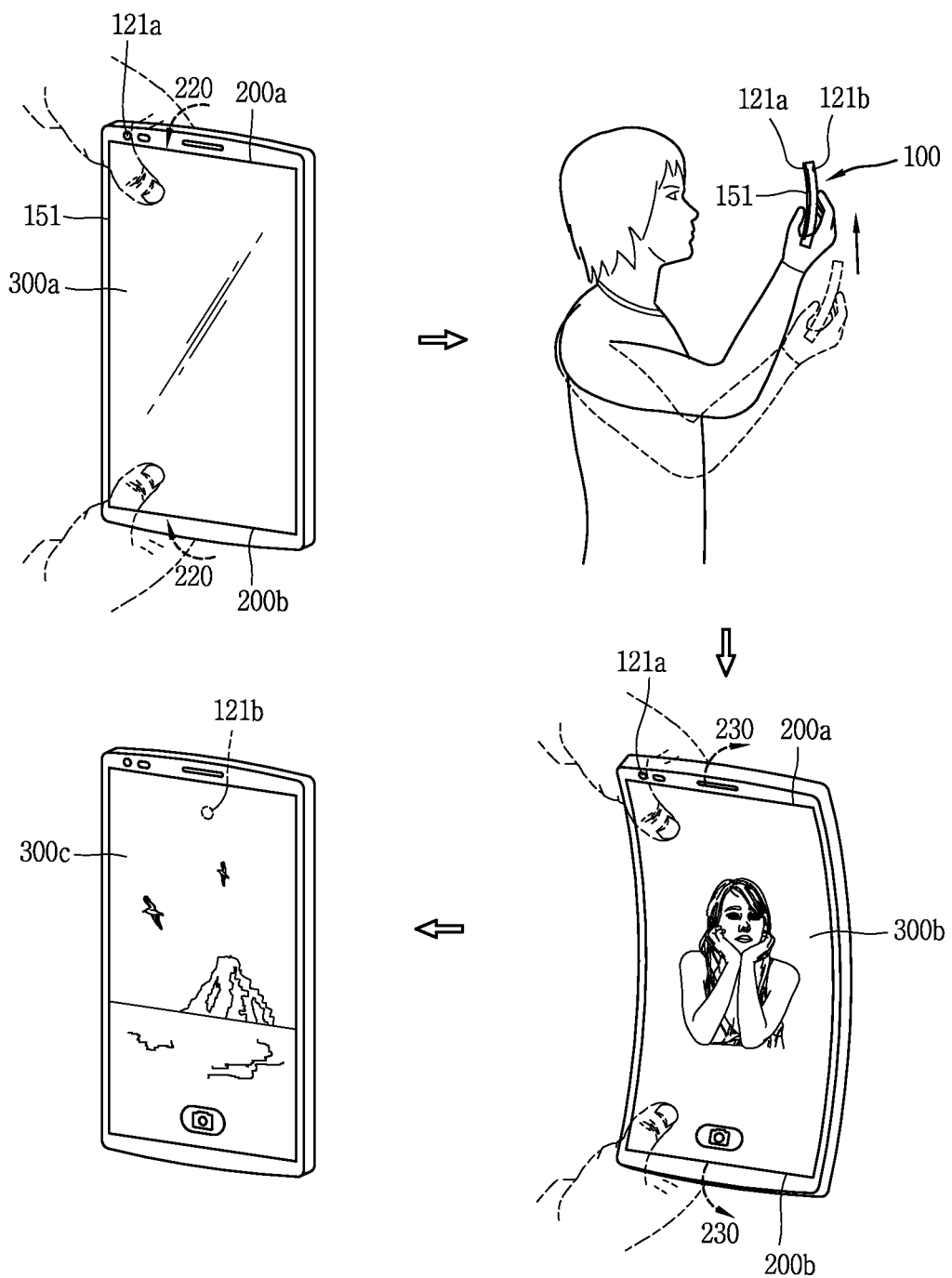
Figure 12C:
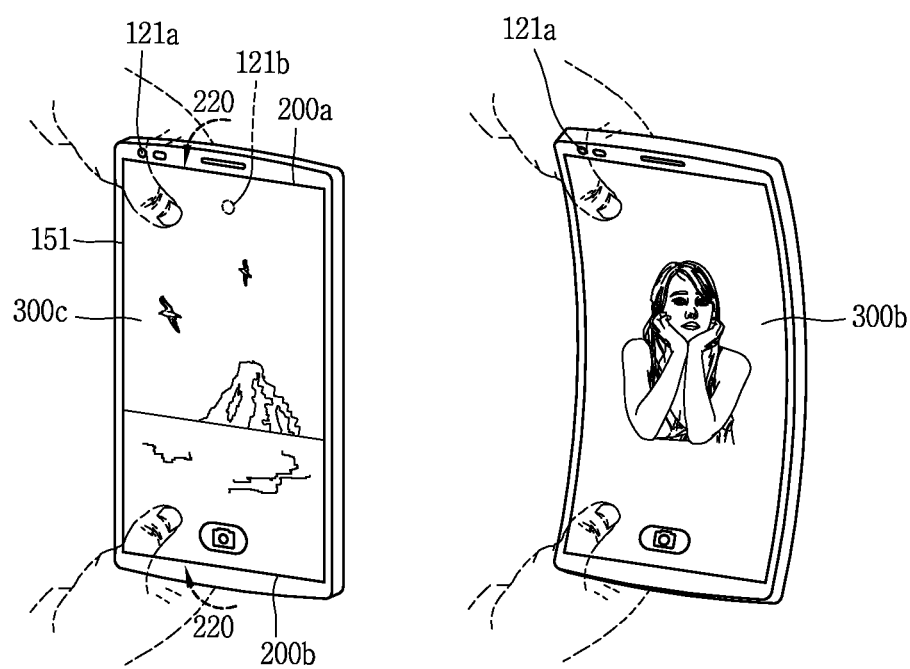

FIGS. 12A, 12B and 12C are conceptual views for explaining a method of performing a function associated with a camera based on the bending of the display unit due to an external force.

First, the display unit 151 described in FIGS. 1A through 11E may be provided on a front surface of a body portion of the mobile terminal 100 according to an embodiment of the present disclosure.

Furthermore, a front camera 121a may be disposed (provided) on a front surface of the body, and a rear camera 121b may be disposed on a rear surface of the body.

The controller 180 may be configured to perform a function associated with a camera 121a, 121b based on the display unit 151 being switched between a first configuration and the second configuration in a state that a call is not received. In other words, The controller 180 may perform a function associated with a different camera 121a, 121b based on the display unit 151 being changed from either one of the first and the second configuration to another configuration while a call is not received.

For example, when the display unit 151 in a first configuration being in an inactive state (300a) is switched to a second configuration due to an external force and then the display unit 151 is activated as illustrated in the first drawing of FIG. 12A, the controller 180 may activate the front camera 121a, and display an image 300b received through the front camera 121a on the display unit 151 as illustrated in the third drawing of FIG. 12A. In other words, when the display unit 151 is switched from a first configuration (flat configuration) and an inactive state to a second configuration (bent configuration) and an active state, the controller 180 may be configured to activate the front camera 121a, and display a preview image 300b received through the front camera 121a on the display unit.

Here, an image received through the front or rear camera may be referred to as a preview image. Furthermore, the second configuration may denote a configuration in which one end 200a and the other end 200b of the display unit 151 is bent in the direction 220 of covering a front surface of the display unit 151.

At this time, when the display unit 151 is in an inactive state (OFF state), the controller 180 may activate the display unit 151 based on the display unit 151 in a flat configuration (first configuration) being switched to a configuration in which a front surface of the display unit 151 is bent in a concave shape (second configuration). Furthermore, the controller 180 may switch the display unit 151 in an inactive state to an active state based on a push being applied to the power button 160. Furthermore, as illustrated in the second drawing of FIG. 12A, the controller 180 may switch the display unit 151 in an inactive state 300a to an active state based on the sensing of a preset movement of the display unit 151 in a bent second configuration (for example, a movement of moving the mobile terminal from the bottom to the top) as illustrated in the second drawing of FIG. 12A)

On the other hand, the controller 180 may control the display unit 151 to switch the display unit 151 from a first configuration to a second configuration due to an external force in a state that an image 300c received through the rear camera 121b is displayed on the display unit 151 according to a user request (for example, selecting an icon of an application associated with a camera function) or display an image 300b received through the front camera 121a based on the sensing of a preset movement in a second configuration.

As illustrated in the third and the fourth drawing of FIG. 12A, when the display unit 151 is switched from a second configuration to a first configuration, the controller 180 may be configured to display an image 300c received through the rear camera 121b on the display unit 151. In other words, when the display unit 151 is switched (restored) from a second configuration to a first configuration due to an external force in a state that an image 300b received through the front camera 121a is displayed on the display unit 151 in a second configuration, the controller 180 may display an image 300c received through the rear camera 121b instead of an image 300b received through the front camera 121a.

On the other hand, the sensing unit 140 of the present disclosure may sense the posture of the body (or display unit 151). Here, the posture of the body may denote a configuration in which the mobile terminal 100 is placed, and for an example, may include a horizontally placed configuration, a vertically placed configuration placed, a diagonally inclined configuration, or the like.

When the display unit 151 in a first configuration is switched to a second configuration, the controller 180 may perform a different function according to a posture in which the body is placed.

For example, when the display unit 151 is in a first configuration in a state in which the body is horizontally placed as illustrated in the first drawing of FIG. 12B, the controller 180 may execute (activate) a first mode (for example, a mode in which a preview image received through the rear camera 121b is captured in a general mode) associated with the rear camera 121b.

Furthermore, when the display unit 151 is switched from a first configuration to a second configuration in a state that the body is horizontally placed, the controller 180 may execute (activate) a second mode (for example, panorama mode) associated with the rear camera 121b as illustrated in the second drawing of FIG. 12B. Specifically, when the display unit in the first configuration is changed to the second configuration in a state that the body is horizontally placed, the controller 180 may execute (activate) a second mode associated with the rear camera instead of a first mode associated with the rear camera.

On the other hand, when a preview image received through the front camera 121a is displayed on the display unit 151 in a first configuration in a state that the body is horizontally placed, the controller 180 may activate either one of a first mode and a second mode associated with the rear camera 121b based on the display unit 151 in the first configuration being switched to a second configuration due to an external force.

On the other hand, when the display unit 151 in a first configuration on which an image 300c received through the rear camera 121b is displayed is switched to a second configuration in a state that the body is vertically placed as illustrated in the first drawing of FIG. 12C, the controller 180 may display an image 300b received through the front camera 121a on the display unit 151 as illustrated in the second drawing of FIG. 12C.

Through the foregoing configuration, the present disclosure may provide a mobile terminal allowing a user to conveniently use his or her desired optimal camera function through the deformation of the display unit.

Hereinafter, for various functions available in the mobile terminal, a method of controlling the various functions based on the deformation of the display unit 151 and a method of deforming the display unit 151 in an optimal shape based on the execution of the various functions will be described in more detail with reference to the accompanying drawings.

FIGS. 13, 14A, 14B, 15, 16, 17A, 17B, 17C, 18, 19 and 20 are conceptual views for explaining a method of performing various functions when the display unit according to an embodiment of the present disclosure is bent according to various functions carried out in the mobile terminal or the display unit is bent due to an external force.

Figure 13:
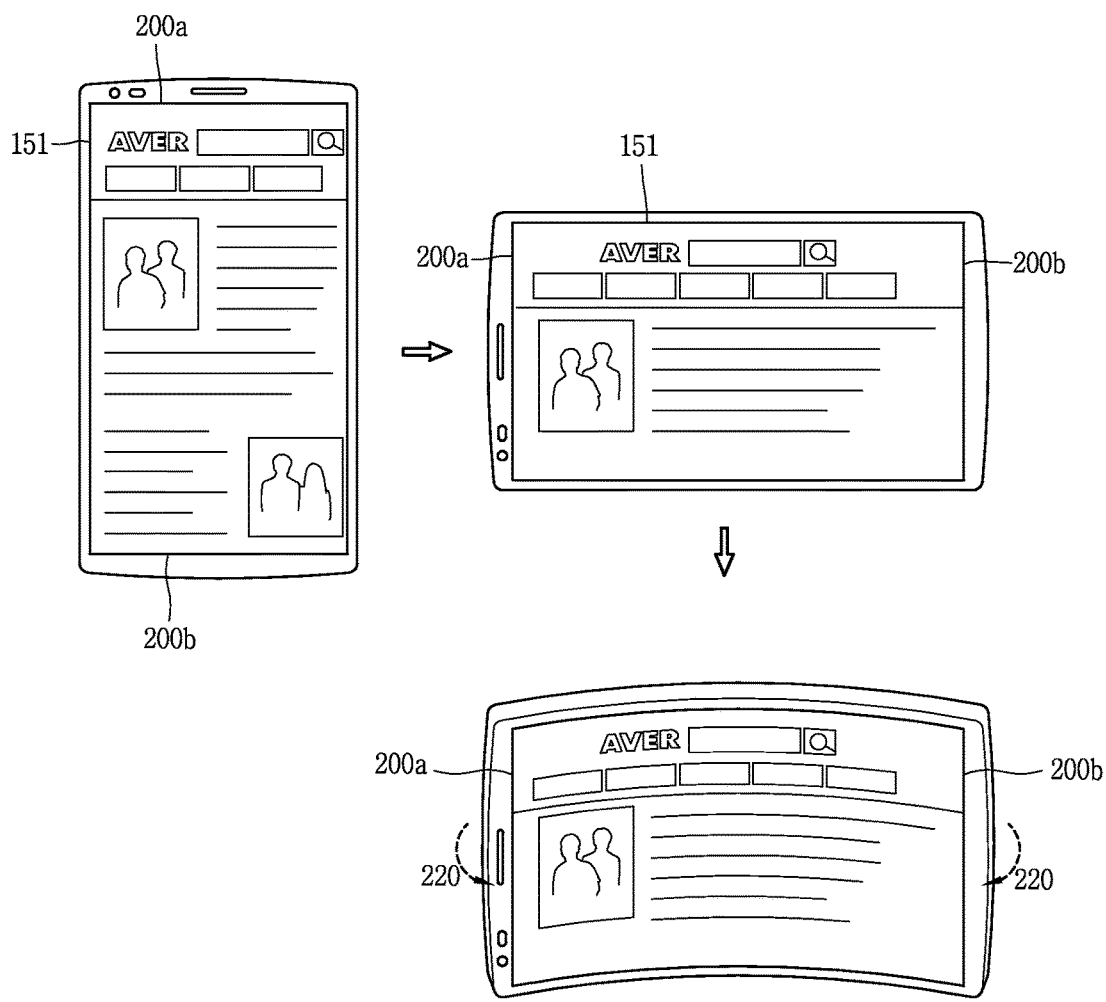

FIG. 13 is a view for explaining an embodiment in which the display unit 151 is deformed according to the posture of the body.

Referring to the first drawing of the FIG. 13, the controller 180 may maintain the display unit 151 in a first configuration in a state that the body is vertically placed. Then, when switched to a state that the body is horizontally placed as illustrated in the second drawing of FIG. 13, the controller 180 may switch the display unit to a second configuration in which at least part of a front surface of the display unit 151 is bent in a concave shape as illustrated in the third drawing of FIG. 13.

On the other hand, the controller 180 may switch the display unit 151 to a second configuration in which at least part of a front surface of the display unit 151 is bent in a convex shape based on the switching of the body from a vertically placed configuration to a horizontally placed configuration.

Furthermore, the controller 180 may maintain the display unit 151 in a first configuration in a state that the body is horizontally placed and switch the display unit 151 to a second configuration in which a front surface of the display unit 151 is bent in either one of a concave or convex shape in a state that the body is vertically placed.

On the other hand, when the display unit 151 in the second configuration is switched to a first configuration due to an external force, the controller 180 may perform a capture function for capturing screen information displayed on the display unit 151. Furthermore, when the display unit 151 in a second configuration is switched to a first configuration in a state that a preset type of touch (for example, long touch) is maintained on the display unit 151 in a state that part of page is displayed on the display unit 151, the controller 180 may perform a capture function for capturing the entire page.

Figure 14A:
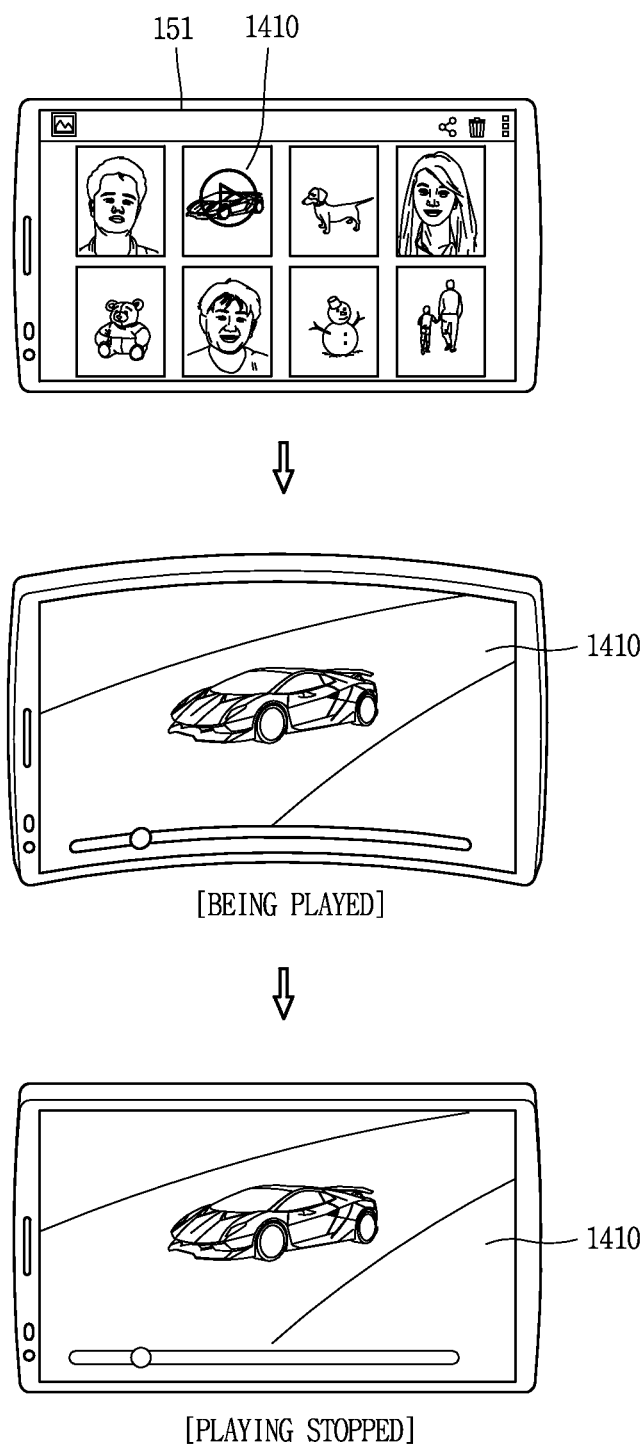
Figure 14B:
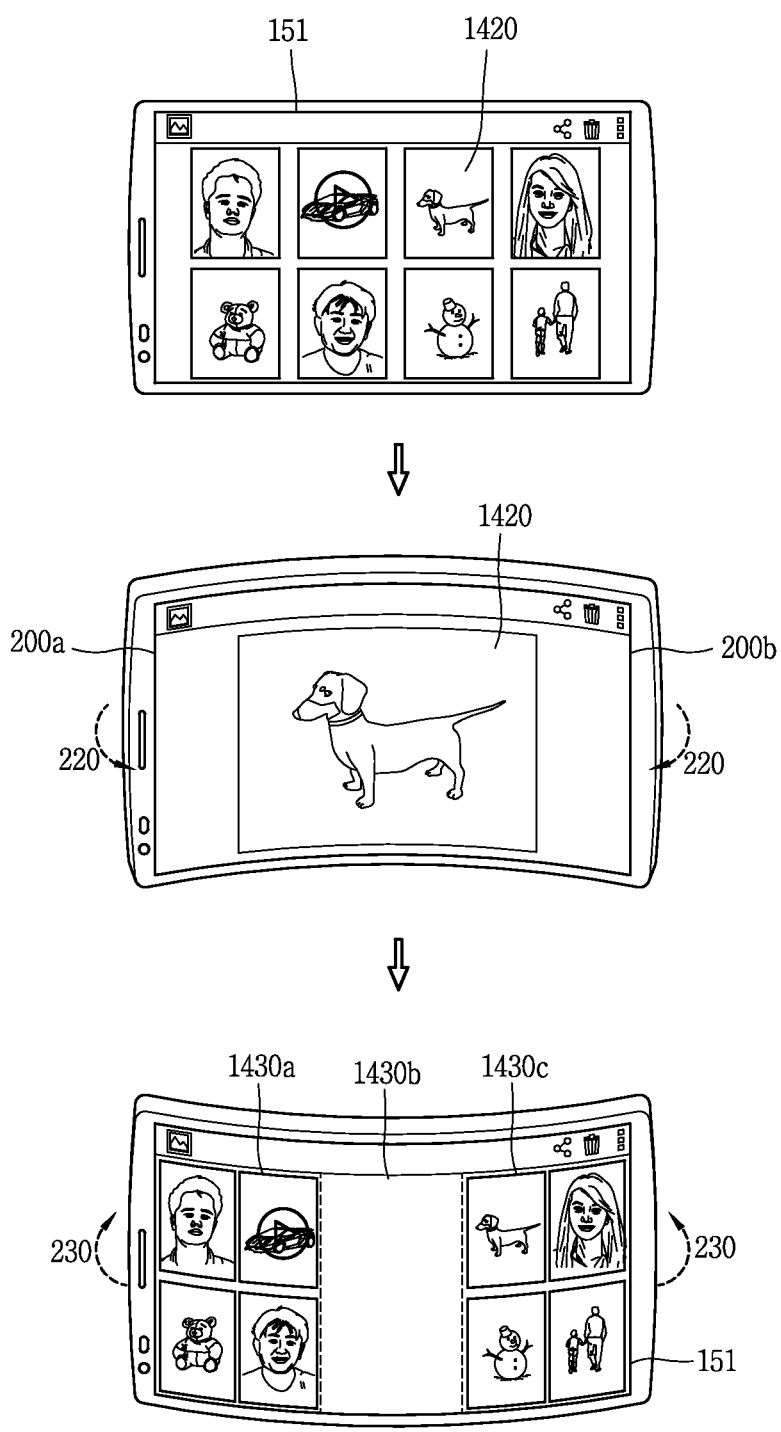

FIGS. 14A and 14B are views for explaining a method of controlling the deformation of the display unit 151 when data (for example, image or video) stored in the memory 170 of the present disclosure is displayed.

As illustrated in the first drawing of FIG. 14A, a screen including a thumbnails of images or videos stored in the memory 170 may be displayed on the display unit 151 based on a user request. Here, when a touch is sensed on the thumbnail of any one video 1410, the controller 180 may play a video 1410 corresponding to the thumbnail on which the touch is sensed as illustrated in the second drawing of FIG. 14A. In this case, the controller 180 may switch the display unit 151 to a second configuration in which at least part of a front surface of the display unit 151 is bent in a concave shape based on the playing of the video 1410.

Then, when the playing of the video is temporarily suspended or stopped based on a user request, the controller 180 may restore the display unit 151 in a second configuration to a first configuration as illustrated in the third drawing of FIG. 14A.

Furthermore, when the display unit 151 in a second configuration is deformed to a first configuration due to an external force, the controller 180 may temporarily suspend or stop the video 1410 being played.

Similarly, as illustrated in the first drawing of FIG. 14B, a screen including the thumbnails of images or videos stored in the memory 170 may be displayed on the display unit 151 based on a user request.

At this time, when a touch is sensed on the thumbnail of any one image 1420, the controller 180 may enlarge and display an image 1420 corresponding to the thumbnail on which the touch is sensed as illustrated in the second drawing of FIG. 14B. In this case, the controller 180 may switch the display unit 151 in a first configuration to a second configuration in which at least part of the display unit 151 is bent in a concave shape based on the enlargement and displaying of the image 1420.

On the other hand, when the display unit 151 in a first configuration is deformed to a second configuration in which at least part of a front surface of the display unit 151 is bent in a convex shape due to an external force in a state that a screen including the thumbnails of images or videos stored in the memory 170 is displayed on the display unit 151, the controller 180 may divide the display unit 151 into at least two regions 1430*a*, 1430*b*, 1430*c*. The thumbnails of images or videos are displayed in at least one region 1430*a*, 1430*c* of the at least two regions, and any one image or video selected based on a user request may be displayed on a region 1430 in which the thumbnails of images or videos are not displayed among the at least two regions.

FIG. 15 is a conceptual view for explaining a method of entering a different mode according to the shape of the display unit 151 when the display unit 151 in an inactive state is switched to an active state.

When the display unit 151 in an inactive state is switched to an active state, the controller 180 may control the display unit 151 to enter a different mode according to a shape of the display unit 151, namely, a bent configuration of the display unit 151.

The different mode may include a first through a third mode which are available in a different manner in the mobile terminal, and the first through the third mode may include a general mode 1502, a secret mode 1503 and a guest mode 1504, for example. The general mode 1502 may be a default setting mode when the product is released on the market. The secret mode 1503 may denote a mode in which a preset application (for example, bank related application) can be used by a user. The guest mode 1504 may be a mode in which the use of a preset application (for example, a function associated with the display of data (images or videos) stored in the memory 170) is limited by a user.

As illustrated in the first drawing of FIG. 15, when the display unit 151 in a first configuration is switched from an inactive state as illustrated in the first drawing of FIG. 15 to an active state based on a user request while maintaining the first configuration as illustrated in the second drawing of FIG. 15, the controller 180 may enter a first mode (for example, general mode 1502).

Furthermore, as illustrated in the third drawing of FIG. 15, when the display unit 151 in a first configuration is activated in a second configuration in which a front surface of the display unit 151 is bent in a concave shape due to an external force, the controller 180 may enter a second mode (for example, secret mode 1503) different from a first mode.

Furthermore, as illustrated in the fourth drawing of FIG. 15, when the display unit 151 in a first configuration is activated in a second configuration in which a front surface of the display unit 151 is bent in a convex shape due to an external force, the controller 180 may enter a third mode (for example, guest mode 1504) different from a first mode.

Figure 16:
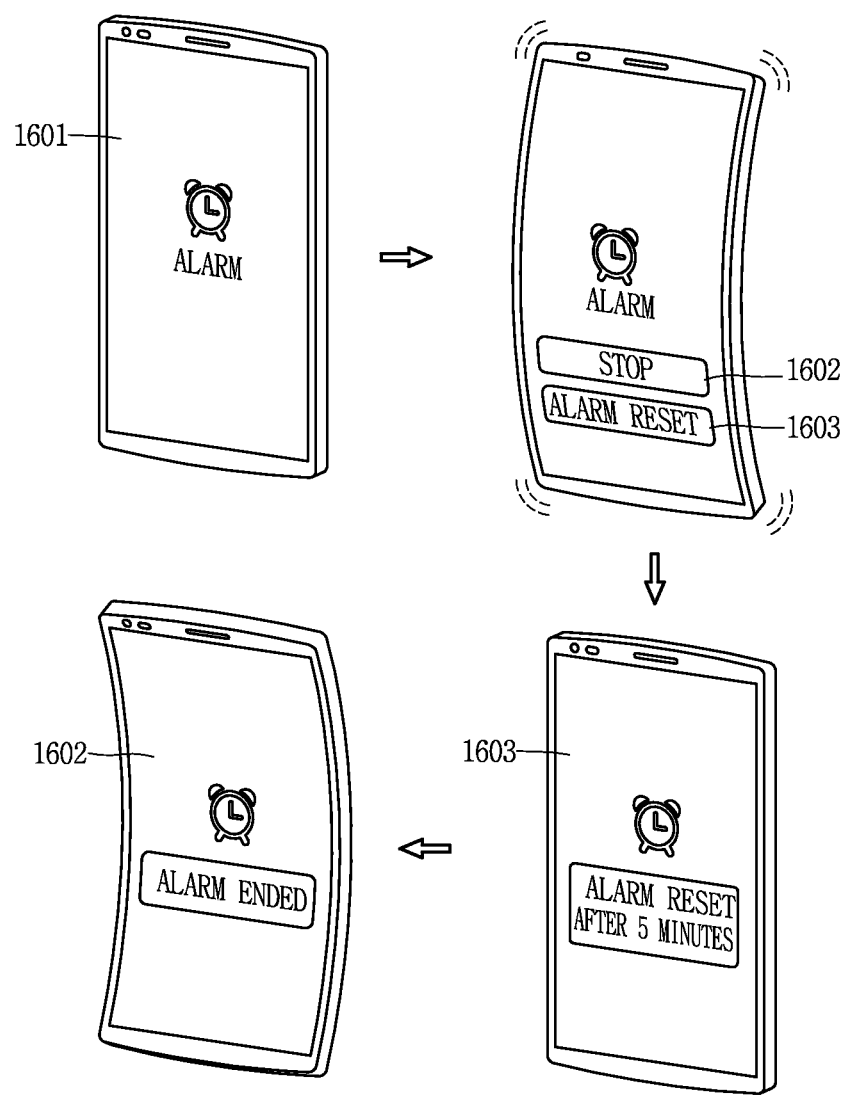

FIG. 16 is a conceptual view for explaining a method of deforming the display unit 151 when an alarm function is carried out and a method of controlling an alarm function when the display unit 151 is deformed due to an external force.

The alarm function denotes a function of outputting a preset sound through the audio output unit 152*a*, 152*b* or vibrating the mobile terminal using the haptic module based on the arrival of a time set by the user.

Here, when an alarm function 1601 is carried out as illustrated in the first and the second drawing of FIG. 16, the controller 180 may deform the display unit 151 in a first configuration to a second configuration. Here, the second configuration may be a configuration in which at least part of a front surface of the display unit 151 is in a concave shape or in a convex shape as illustrated in the second drawing of FIG. 16.

In this configuration, the controller 180 may perform a different function included in an alarm function based on the display unit 151 in a second configuration being deformed due to an external force or the display unit 151 being switched from a second configuration in which the display unit 151 is bent in a concave shape to a first configuration in which the display unit 151 is bent in a convex shape (including the opposite case).

For example, when the display unit 151 in a second configuration is deformed to a first configuration due to an external force as illustrated in the third drawing of FIG. 16, the controller 180 may perform a first function 1603 included in the alarm function. Here, the first function 1603 may be a function of stopping the alarm and resetting an alarm time subsequent to a preset time.

For another example, as illustrated in the fourth drawing of FIG. 16, when the display unit is switched from a second configuration in which a front surface of the display unit 151 is bent in a concave shape to a second configuration in which the front surface of the display unit 151 is bent in a convex shape, the controller 180 may perform a second function 1602 different from the first function. The second function 1602 may be a function of stopping an alarm function, for example.

Figure 17A:
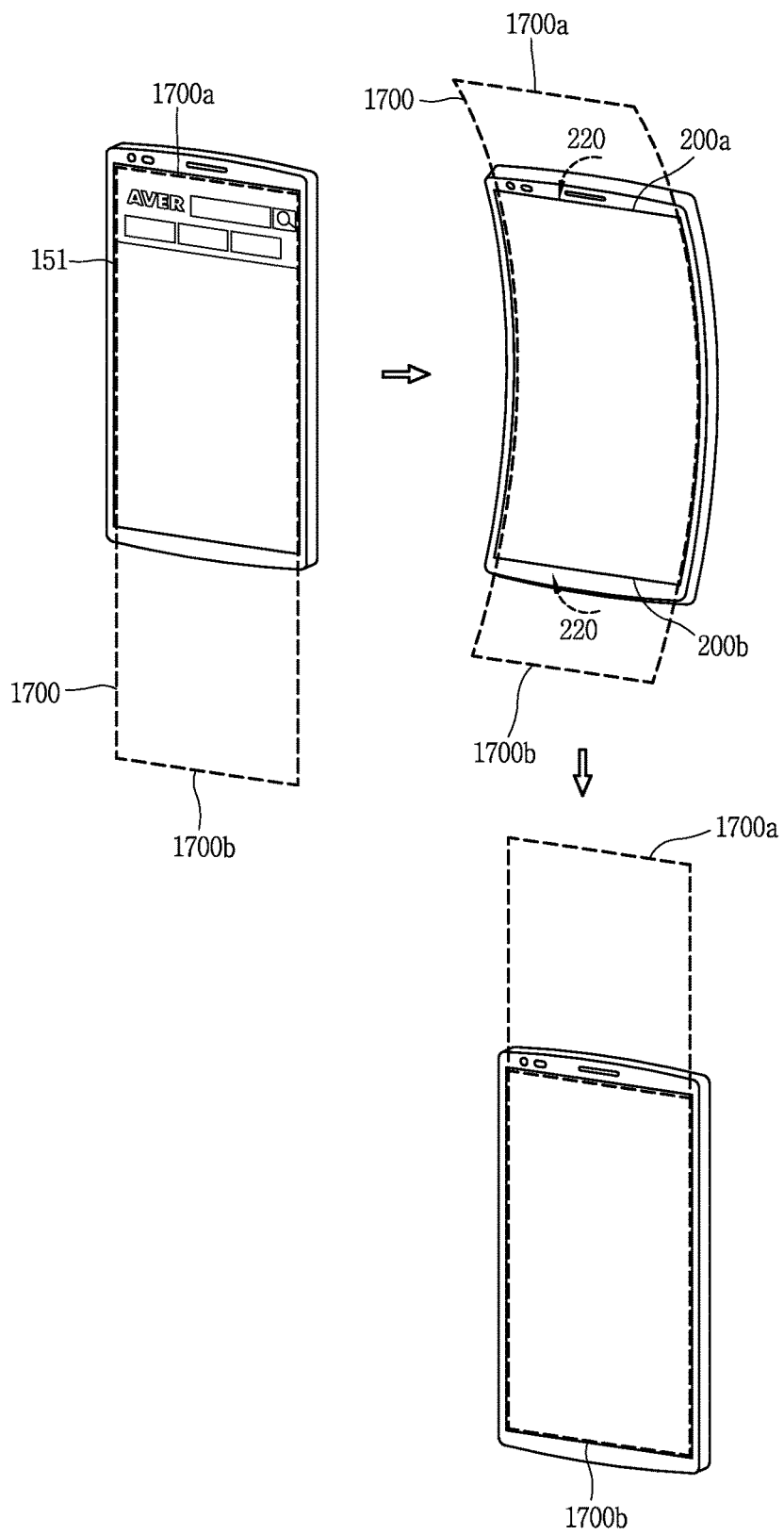
Figure 17B:
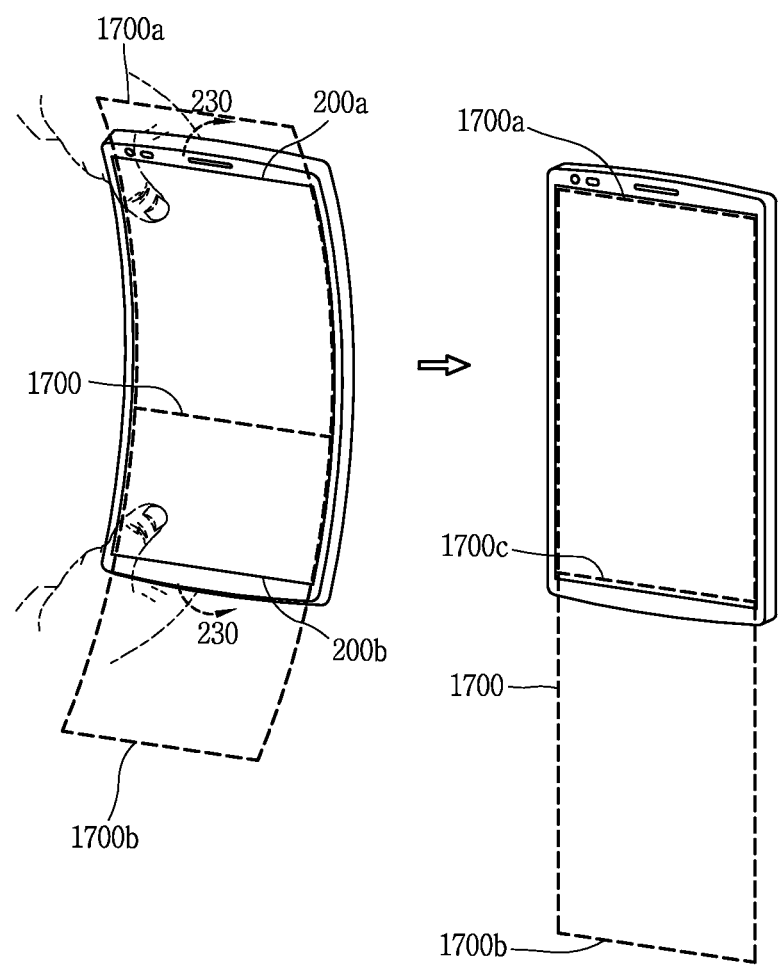
Figure 17C:
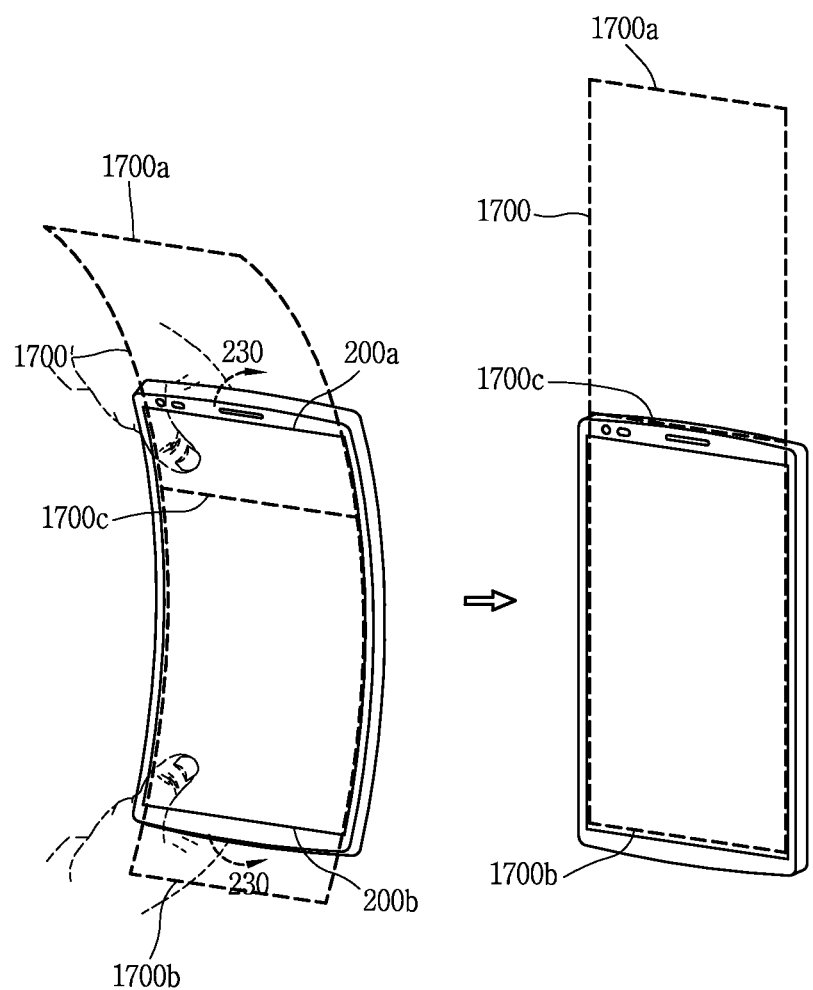

FIGS. 17A through 17C are conceptual views for explaining a method of deforming the display unit 151 with regard to a scroll function or performing a scroll function based on the deformation of the display unit 151.

As illustrated in the first drawing of FIG. 17A, at least part of page 1700 (or list or electronic document) having a size exceeding the display region of the display unit may be displayed on the display unit 151.

Then, as illustrated in the drawing of FIG. 17A, the controller 180 may scroll the page 1700 based on a touch input (for example, drag touch or flick touch) for scrolling the page 1700.

At this time, the controller 180 may switch the display unit 151 in a first configuration to a second configuration. For example, as illustrated in the second drawing of FIG. 17A, the controller 180 may bend the display unit 151 in a first configuration such that at least one of one end 200*a* and the other end 200*b* of the display unit 151 is bent in the direction of covering a front surface of the display unit 151.

Here, when either one of one end 1700*a* and the other end 1700*b* of the page 1700 is not displayed on the display unit 151, the controller 180 may maintain the display unit 151 in a second configuration.

Then, as illustrated in the third drawing of FIG. 17A, when either one of one end 1700*a* and the other end 1700*b* of the page 1700 is displayed on the display unit 151, the controller 180 may restore the display unit 151 in a second configuration to a first configuration.

Through the foregoing configuration, the present disclosure may deform the display unit 151 to notify the user that scrolling is being carried out, and control a front surface of the display unit 151 to be bent in a concave shape, thereby providing a mobile terminal capable of more conveniently performing a scroll function.

On the other hand, according to the present disclosure, when one end 1700*a* and the other end 1700*b* of the page 1700 is not displayed on the display unit 151, the display unit 151 may be maintained in a second configuration. In this state, when the display unit 151 in a second configuration is deformed to a first configuration due to an external force, the controller 180 may move the page 1700 to display either one of one end 1700*a* and the other end 1700*b* of the page 1700.

When the display unit 151 in a second configuration is deformed to a first configuration due to an external force, whether or not display which one of the one end 1700*a* and the other end 1700b of the page 1700 may be determined based on a region of the page 1700.

For example, as illustrated in the first drawing of FIG. 17B, a region located at an upper end may be further displayed on the basis of a central portion 1700c of the page 1700 on the display unit 151. In this case, when the display unit 151 in a second configuration is deformed to a first configuration due to an external force, the controller 180 may move the page 1700 to display one end (upper end) 1700a of the page 1700c as illustrated in the second drawing of FIG. 17B.

For another example, as illustrated in the first drawing of FIG. 17C, a region located at a lower end may be further displayed on the basis of a central portion 1700c of the page 1700 on the display unit 151. In this case, when the display unit 151 in a second configuration is deformed to a first configuration due to an external force, the controller 180 may move the page 1700 to display the other end (lower end) 1700b of the page 1700c as illustrated in the second drawing of FIG. 17C.

Through the foregoing configuration, the present disclosure may provide a mobile terminal capable of deforming the display unit in a bent configuration to a flat configuration to more quickly display either one of one end and the other end of a page.

Figure 18:
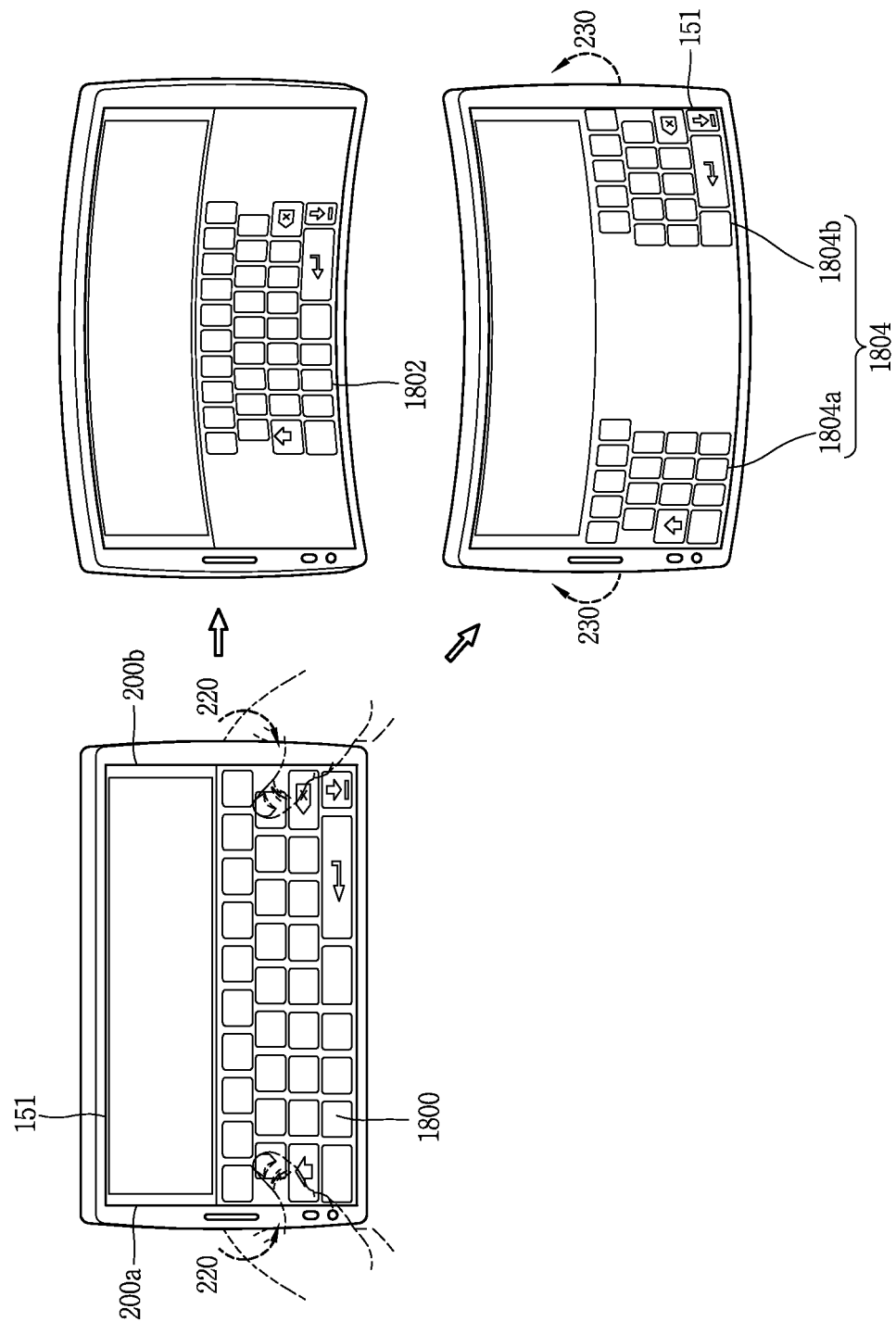

FIG. 18 is a conceptual view for explaining a method of changing a keypad displayed on the display unit 151 based on the deformation of the display unit 151.

As illustrated in the first drawing of FIG. 18, a keypad having a first layout 1800 may be displayed on the display unit 151 in a first configuration. Here, when the display unit 151 in a first configuration is changed to a second configuration due to an external force, a keypad having a second layout 1802 different from the first layout instead of the keypad having the first layout 1800.

For example, as illustrated in the second drawing of FIG. 18, when the display unit 151 in a first configuration is deformed to a second configuration in which at least part of a front surface of the display unit 151 is bent in a concave shape due to an external force, the controller 180 may display a keypad having a second layout 1802 reduced in size from the first layout.

For another example, as illustrated in the third drawing of FIG. 18, when the display unit 151 in a first configuration is deformed to a second configuration in which at least part of a front surface of the display unit 151 is bent in a convex shape due to an external force, the controller 180 may display a keypad in a third layout 1804 displayed with at least two divided regions 1804a, 1804b.

Through the foregoing configuration, the present disclosure may display an optimized keypad according to the bent configuration of the display unit 151.

Figure 19:
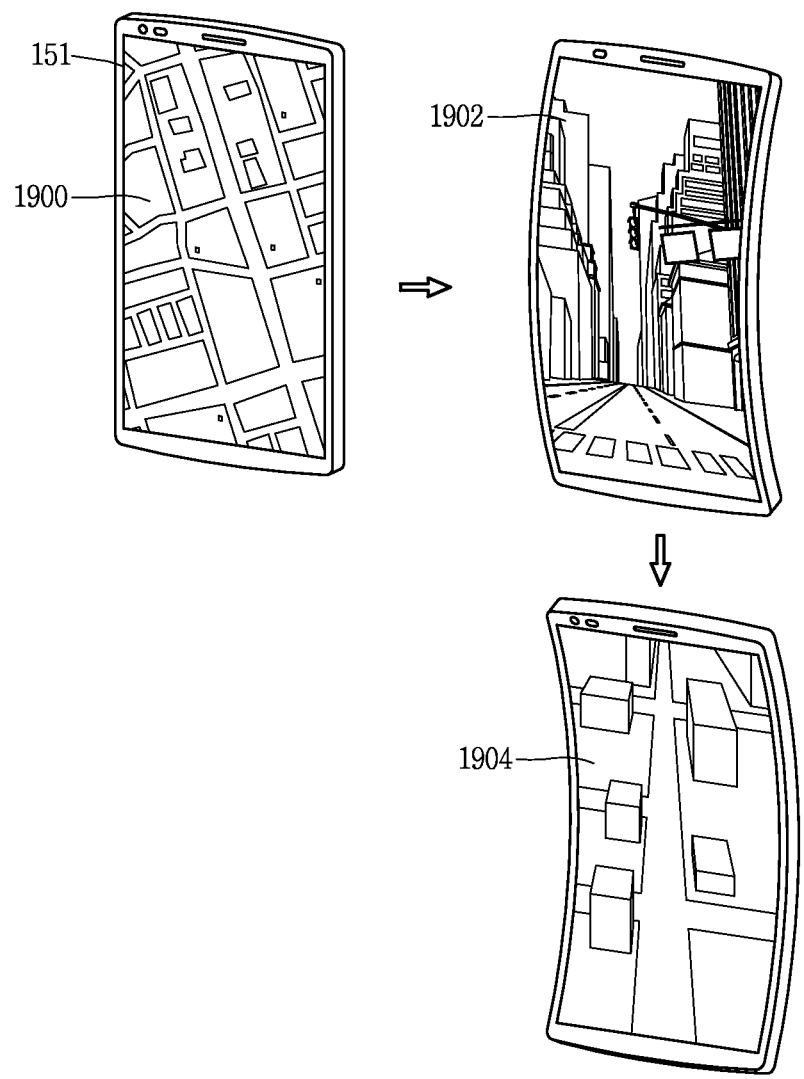

FIG. 19 is a conceptual view for explaining a method of display map information in a different mode according to the bent configuration of the display unit 151 associated with a map related application.

The controller 180 may display map information in a different mode according to the bent configuration of the display unit 151. The different mode may include a first through a third different mode, which are available in a map related application, and the first mode 1900, the second mode 1902 and the third mode 1904 may be a 2D mode, an image mode and a 3D mode, respectively. The first through the third mode may be set in various ways according to user setting.

For example, as illustrated in the first drawing of FIG. 19, when a map related application is carried out in a first configuration, the controller 180 may display map information set in a first mode (for example, 2D mode) 1900 on the display unit 151.

For another example, as illustrated in the second drawing of FIG. 19, when the map related application is carried out in a second configuration in which at least part of a front surface of the display unit 151 is bent in a convex shape, the controller 180 may display map information set in a second mode (for example, an image mode) 1902 on the display unit 151. Here, the image mode may denote a mode in which map information is displayed using an image captured by an automobile, aircraft or satellite.

For another example, as illustrated in the third drawing of FIG. 19, when the map related application is carried out in a second configuration in which at least part of a front surface of the display unit 151 is bent in a concave shape, the controller 180 may display map information set in a third mode (for example, 3D mode) 1904 on the display unit 151.

Figure 20:
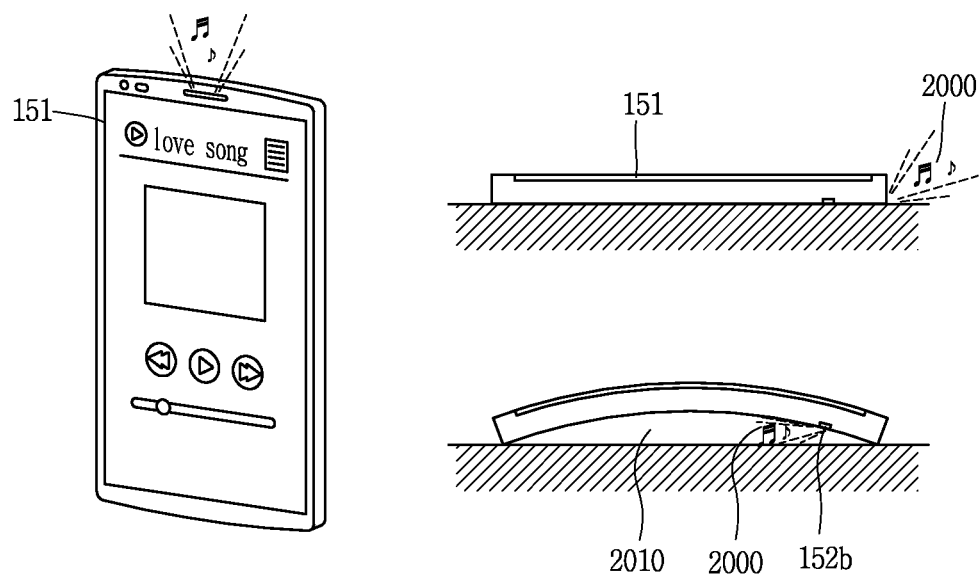

FIG. 20 is a conceptual view for explaining a method of deforming the display unit 151 based on the execution of a music related application.

The controller 180 may output a music 2000 through the audio output unit 152a, 152b based on a user request as illustrated in the first drawing of FIG. 20. At this time, when the display unit 151 in a first configuration being placed on a flat object is sensed while the music 2000 is output, the controller 180 may switch the display unit to a second configuration. At this time, the controller 180 may determine whether to deform the display unit 151 to a second configuration bent in a concave shape or a second configuration bent in a convex shape based on the placement location of the audio output unit 152a, 152b.

For example, as illustrated in the third drawing of FIG. 20, when the audio output unit 152b for outputting a music 2000 is disposed on a rear surface of the body (a rear surface of the display unit 151), the controller 180 may deform the display unit 151 to be bent in a second configuration in which a front surface of the display unit 151 is bent in a convex shape (a rear surface of the display unit 151 is bent in a concave shape). In this case, a space from which the music 2000 is output may be secured to display the music 2000 in an optimized state.

As described above, the present disclosure may control the display unit to be bent based on a function carried out in a mobile terminal, thereby providing a mobile terminal deformed in an optimized shape for the user according to the executed function.

The present disclosure may provide a method of controlling various functions available in a mobile terminal according to the bent characteristics of the display unit. Through this, the user may more conveniently use a display unit with an enhanced usability.

The present disclosure may control the display unit allowed be bent to perform a function associated with a call. Through this, the present disclosure may control the display unit to be bent, thereby providing a mobile terminal more optimized for a phone call.

The foregoing present invention may be implemented as codes readable by a computer on a medium written by the program. The computer-readable media may include all kinds of recording devices in which data readable by a computer system is stored. Examples of the computer-readable media may include hard disk drive (HDD), solid state disk (SSD), ROM, RAM, CD-ROM, magnetic tape, floppy disk, and optical data storage device, and the like, and also include a device implemented in the form of a carrier wave (for example, transmission via the Internet). In addition, the computer may include the controller 180 of the terminal. Accordingly, the detailed description thereof should not be construed as restrictive in all aspects but considered as illustrative. The scope of the invention should be determined by reasonable interpretation of the appended claims and all changes that come within the equivalent scope of the invention are included in the scope of the invention.

What is claimed is:

1. A mobile terminal, comprising:
   a wireless communication unit;
   a display unit configured to operate in either a first configuration or a second configuration, the display unit having different radii of curvature in the first configuration and the second configuration, wherein the first configuration is a flat configuration and the second configuration is a bent configuration in which the display unit is bent; and
   a controller configured to:
      receive a call signal from another terminal via the wireless communication unit, the call signal received while the display unit is in the first configuration;
      cause the display unit to change from the first configuration to the second configuration based on a call connection with the another terminal that is performed in response to reception of the call signal such that the changing of the display unit from the first configuration to the second configuration is performed while or after the call connection is performed; and
      cause at least partial unbending of a part of the display unit that is in the second configuration based on a preset voice received from the another terminal during the call connection.

2. The mobile terminal of claim 1, further comprising a speaker located adjacent to a first end of the mobile terminal and configured to output the preset voice, wherein:
   the part of the display unit that is unbent is where the speaker is located;
   a part of the display unit that is adjacent to a second end portion of the mobile terminal that is opposite to the first end portion remains in the bent configuration in response to the preset voice;
   the display unit has an infinite radius of curvature in the flat configuration; and
   the display unit has a finite radius of curvature in the bent configuration.

3. The mobile terminal of claim 2, wherein the second configuration is a configuration in which at least one of the first and second ends of the display unit is bent in a direction to which a front surface of the display unit faces.

4. The mobile terminal of claim 3, wherein the controller is further configured to maintain the display unit in the first configuration when the call is connected while the display unit is in the first configuration, and cause the display unit to change from the first configuration to the second configuration based on an input corresponding to a preset condition being received during the call connection.

5. The mobile terminal of claim 4, further comprising:
   a sensing unit configured to sense a movement of the mobile terminal; and
   a manipulation unit configured to receive an input for audio volume adjustment,
   wherein the controller is further configured to cause the display unit to change from the first configuration to the second configuration during the call connection based on at least one of the movement of the mobile terminal sensed by the sensing unit or an input to increase an audio volume received via the manipulation unit.

6. The mobile terminal of claim 4, further comprising:
   a microphone disposed around an end of the display unit; and
   a sensing unit configured to sense an object approaching near the microphone,
   wherein the controller is further configured to cause the display unit to change from the first configuration to the second configuration during the call connection based on at least one of the sensed object approaching near the microphone or an increase of a volume of sound received via the microphone.

7. The mobile terminal of claim 4, further comprising:
   a sensing unit configured to sense a movement of the mobile terminal,
   wherein the controller is further configured to cause the display unit to bend on the basis of a different reference region based on the movement of the mobile terminal.

8. The mobile terminal of claim 7, wherein the controller is further configured to cause the display unit to:
   bend on the basis of a first reference region based on the mobile terminal being rotated in a first direction after the call connection; and
   bend on the basis of a second reference region that is different from the first reference region based on the mobile terminal being rotated in a second direction that is different from the first direction.

9. The mobile terminal of claim 3, wherein:
   the controller is further configured to cause the display unit to change from the second configuration to a third configuration based on an input corresponding to a preset condition being received during the call connection, the input received while the display unit is in the second configuration;
   the display unit in the third configuration is bent less than the display unit in the second configuration; and
   a bending direction is same for the second configuration and the third configuration while a degree of bending is different between the second configuration and the third configuration.

10. The mobile terminal of claim 9, further comprising a microphone, wherein the preset condition is at least one of:
   a case where a volume of a sound corresponding to a noise received via the microphone is higher than a reference volume,
   a case where the preset voice is received via at least one of the microphone or the speaker,
   a case where an input for increasing an audio volume is received while the audio volume is in a maximum state, or
   a case where an object approaches near the microphone and a volume of sound received via the microphone increases.

11. The mobile terminal of claim 3, further comprising:
   a microphone disposed around an end of the display unit,
   wherein, in a state that the end of the display unit is bent in a direction to which the front surface of the display unit faces, the controller is further configured to unfold a region adjacent to the end of the display unit from the bent configuration to the flat configuration based on a volume of a sound corresponding to a breath received via the microphone when the volume is higher than a reference volume.

12. The mobile terminal of claim 1, further comprising:
   a sensing unit configured to sense bending of the display unit, wherein the controller is further configured to perform a function associated with a call based on the bending of the display unit.

13. The mobile terminal of claim 12, wherein the controller is further configured to:
connect the call when the display unit that is in the first configuration is bent to be in the second configuration in a state that the call is received; and
end the connected call when the display unit that is in the second configuration is restored to the first configuration.

14. The mobile terminal of claim 12, wherein the controller is further configured to perform a different function based on a bending degree of the display unit.

15. The mobile terminal of claim 14, wherein the controller is further configured to:
activate a first function associated with a phone call when the display unit is bent to have a first radius of curvature; and
activate a second function associated with a phone call when the display unit is bent to have a second radius of curvature that is shorter than the first radius of curvature, the second function being different from the first function.

16. The mobile terminal of claim 1, wherein the display unit is provided on a front surface of a body of the mobile terminal, and the mobile terminal further comprises:
a front camera disposed on the front surface of the body;
a rear camera disposed on a rear surface of the body; and
a sensing unit configured to sense bending of the display unit,
wherein the controller is further configured to perform a function associated with the first or second camera based on whether the display unit is in the first configuration or the second configuration in a state when no call signal is received.

17. The mobile terminal of claim 16, wherein when the display unit that is in the first configuration and in an inactive state is changed to be in the second configuration and in an active state, the controller is further configured to activate the front camera, and cause the display unit to display a preview image received via the front camera.

18. The mobile terminal of claim 17, wherein when the display unit is changed from the second configuration to the first configuration, the controller is further configured to cause the display unit to display a preview image received via the rear camera.

19. The mobile terminal of claim 16, wherein the sensing unit is further configured to sense an orientation of the body, and the controller is further configured to:
execute a first mode associated with the rear camera when the display unit is in the first configuration in a state that the body is placed in a horizontal orientation; and
execute a second mode associated with the rear camera when the display unit that is in the first configuration is changed to be in the second configuration while the body is in the horizontal orientation.

20. A control method of a mobile terminal, the method comprising:
receiving, via a wireless communication unit of the mobile terminal, a call signal from another terminal, the call signal received while a display unit of the mobile terminal is in a first configuration,
causing, by a controller of the mobile terminal, the display unit to change from the first configuration to a second configuration based on a call connection with the another terminal that is performed in response to reception of the call signal such that the changing of the display unit from the first configuration to the second configuration is performed while or after the call connection is performed, the display unit having different radii of curvature in the first configuration and the second configuration, wherein the first configuration is a flat configuration and the second configuration is a bent configuration in which the display unit is bent; and
causing, by the controller, the display unit that is in the second configuration to revert to the first configuration when the connected call is ended while the display unit is in the second configuration; and
causing, by the controller, at least partial unbending of a part of the display unit that is in the second configuration based on a preset voice received from the another terminal during the call connection.

* * * * *